US009224339B2

(12) United States Patent
Yamazaki et al.

(10) Patent No.: US 9,224,339 B2
(45) Date of Patent: Dec. 29, 2015

(54) LIQUID CRYSTAL DISPLAY DEVICE

(75) Inventors: Shunpei Yamazaki, Setagaya (JP); Jun Koyama, Sagamihara (JP); Hiroyuki Miyake, Atsugi (JP); Kouhei Toyotaka, Atsugi (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 463 days.

(21) Appl. No.: 13/167,019

(22) Filed: Jun. 23, 2011

(65) Prior Publication Data

US 2012/0001954 A1 Jan. 5, 2012

(30) Foreign Application Priority Data

Jul. 2, 2010 (JP) ................................ 2010-152429

(51) Int. Cl.
*G06F 3/041* (2006.01)
*G09G 3/34* (2006.01)
*G09G 3/36* (2006.01)
*G09G 3/20* (2006.01)

(52) U.S. Cl.
CPC ............ *G09G 3/3406* (2013.01); *G09G 3/3607* (2013.01); *G09G 3/2025* (2013.01); *G09G 2300/0456* (2013.01); *G09G 2330/021* (2013.01)
USPC .......................................................... 345/173

(58) Field of Classification Search
None
See application file for complete search history.

(56) References Cited

U.S. PATENT DOCUMENTS 5,070,409 A * 12/1991 Miyadera et al. ............ 348/790
5,731,856 A 3/1998 Kim et al.
5,744,864 A 4/1998 Cillessen et al.
6,294,274 B1 9/2001 Kawazoe et al.
6,448,951 B1 * 9/2002 Sakaguchi et al. .............. 345/88

(Continued)

FOREIGN PATENT DOCUMENTS

CN 101083067 A 12/2007
CN 101290761 A 10/2008

(Continued)

OTHER PUBLICATIONS

Baron et al., "36.4: Can Motion Compensation Eliminate Color Breakup of Moving Objects in Field-Sequential Color Displays?" SID Digest '96: SID International Symposium Digest of Technical Papers, 1996, vol. 27, pp. 843-846.

(Continued)

*Primary Examiner* — Kent Chang
*Assistant Examiner* — Nathan Brittingham
(74) *Attorney, Agent, or Firm* — Eric J. Robinson; Robinson Intellectual Property Law Office, P.C.

(57) ABSTRACT

A liquid crystal display device comprising a backlight and a pixel portion including first to 2n-th scan lines, wherein, in a first case of expressing a color image, first pixels controlled by the first to n-th scan lines are configured to express a first image using at least one of first to third hues supplied in a first rotating order, and second pixels controlled by the (n+1)-th to 2n-th scan lines are configured to express a second image using at least one of the first to third hues supplied in a second rotating order, wherein, in a second case of expressing a monochrome image, the first and second pixels controlled by the first to 2n-th scan lines are configured to express the monochrome image by external light reflected by the reflective pixel electrode, and wherein the first rotating order is different from the second rotating order.

16 Claims, 33 Drawing Sheets

| | 301<br>full-color image display period | 302<br>monochrome moving image display period | 303<br>monochrome still image display period |
|---|---|---|---|
| driver circuit | operation | operation | no operation excluding writing |
| backlight | switching of hues | not emit | not emit |
| number of writing image signals | number of hues | once | once |

(56) References Cited

U.S. PATENT DOCUMENTS

| | | | |
|---|---|---|---|
| 6,563,174 | B2 | 5/2003 | Kawasaki et al. |
| 6,597,348 | B1 | 7/2003 | Yamazaki et al. |
| 6,727,522 | B1 | 4/2004 | Kawasaki et al. |
| 6,744,416 | B2 | 6/2004 | Mizutani et al. |
| 6,806,647 | B2 | 10/2004 | Yamamoto et al. |
| 6,882,012 | B2 | 4/2005 | Yamazaki et al. |
| 6,946,796 | B2 | 9/2005 | Yamamoto et al. |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,145,536 | B1 | 12/2006 | Yamazaki et al. |
| 7,193,593 | B2 | 3/2007 | Koyama et al. |
| 7,211,825 | B2 | 5/2007 | Shih et al |
| 7,224,339 | B2 | 5/2007 | Koyama et al. |
| 7,268,756 | B2 | 9/2007 | Koyama et al. |
| 7,282,782 | B2 | 10/2007 | Hoffman et al. |
| 7,297,977 | B2 | 11/2007 | Hoffman et al. |
| 7,317,438 | B2 | 1/2008 | Yamazaki et al. |
| 7,323,356 | B2 | 1/2008 | Hosono et al. |
| 7,385,224 | B2 | 6/2008 | Ishii et al. |
| 7,385,579 | B2 | 6/2008 | Satake |
| 7,402,506 | B2 | 7/2008 | Levy et al. |
| 7,411,209 | B2 | 8/2008 | Endo et al. |
| 7,425,937 | B2 | 9/2008 | Inukai |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 7,791,074 | B2 | 9/2010 | Iwasaki |
| 7,791,571 | B2 | 9/2010 | Ohtani et al. |
| 7,935,582 | B2 | 5/2011 | Iwasaki |
| 7,947,981 | B2 | 5/2011 | Yamazaki et al. |
| 7,956,361 | B2 | 6/2011 | Iwasaki |
| 8,013,339 | B2 * | 9/2011 | Shih et al. ....................... 257/59 |
| 8,054,279 | B2 | 11/2011 | Umezaki et al. |
| 8,154,024 | B2 | 4/2012 | Iwasaki |
| 8,154,493 | B2 | 4/2012 | Kimura et al. |
| 8,743,044 | B2 | 6/2014 | Umezaki et al. |
| 8,902,145 | B2 | 12/2014 | Umezaki et al. |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager et al. |
| 2004/0038446 | A1 | 2/2004 | Takeda et al. |
| 2004/0127038 | A1 | 7/2004 | Carcia et al. |
| 2005/0012097 | A1 | 1/2005 | Yamazaki |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0082536 | A1 | 4/2006 | Koyama et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0279359 | A1 | 12/2007 | Yoshida et al. |
| 2007/0279374 | A1 | 12/2007 | Kimura et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0074592 | A1 * | 3/2008 | Araki et al. ................... 349/114 |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0259099 | A1 * | 10/2008 | Arai et al. ..................... 345/690 |
| 2008/0296568 | A1 | 12/2008 | Ryu et al. |
| 2009/0045397 | A1 * | 2/2009 | Iwasaki ........................... 257/43 |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0174638 | A1 | 7/2009 | Elliott et al. |
| 2009/0250695 | A1 * | 10/2009 | Tanaka et al. ................... 257/43 |
| 2009/0278122 | A1 | 11/2009 | Hosono et al. |
| 2009/0280600 | A1 | 11/2009 | Hosono et al. |
| 2009/0321737 | A1 | 12/2009 | Isa et al. |
| 2010/0020276 | A1 * | 1/2010 | Jepsen .......................... 349/106 |
| 2010/0065844 | A1 | 3/2010 | Tokunaga |
| 2010/0079366 | A1 * | 4/2010 | Lin et al. ....................... 345/102 |
| 2010/0092800 | A1 | 4/2010 | Itagaki et al. |
| 2010/0109002 | A1 | 5/2010 | Itagaki et al. |
| 2010/0148177 | A1 | 6/2010 | Koyama et al. |
| 2010/0182282 | A1 | 7/2010 | Kurokawa et al. |
| 2011/0102476 | A1 * | 5/2011 | Chang ........................... 345/690 |
| 2011/0148832 | A1 * | 6/2011 | Nie et al. ...................... 345/207 |
| 2011/0157216 | A1 | 6/2011 | Yamazaki et al. |
| 2011/0157253 | A1 | 6/2011 | Yamazaki et al. |
| 2011/0242071 | A1 | 10/2011 | Koyama et al. |
| 2011/0249037 | A1 | 10/2011 | Koyama et al. |
| 2011/0249038 | A1 | 10/2011 | Yamazaki et al. |
| 2011/0285290 | A1 * | 11/2011 | Griffin et al. ................... 315/76 |
| 2012/0001955 | A1 | 1/2012 | Yamazaki et al. |
| 2012/0002127 | A1 | 1/2012 | Yamazaki et al. |
| 2013/0088534 | A1 | 4/2013 | Arai et al. |
| 2015/0137118 | A1 | 5/2015 | Umezaki et al. |

FOREIGN PATENT DOCUMENTS

| | | | |
|---|---|---|---|
| CN | 001758304 | A | 6/2010 |
| EP | 1296357 | A | 3/2003 |
| EP | 1737044 | A | 12/2006 |
| EP | 1906414 | A | 4/2008 |
| EP | 2226847 | A | 9/2010 |
| EP | 2339639 | A | 6/2011 |
| EP | 2816607 | A | 12/2014 |
| JP | 60-198861 | A | 10/1985 |
| JP | 63-210022 | A | 8/1988 |

(56) References Cited

FOREIGN PATENT DOCUMENTS

| | | | |
|---|---|---|---|
| JP | 63-210023 | A | 8/1988 |
| JP | 63-210024 | A | 8/1988 |
| JP | 63-215519 | A | 9/1988 |
| JP | 63-239117 | A | 10/1988 |
| JP | 63-265818 | A | 11/1988 |
| JP | 05-251705 | A | 9/1993 |
| JP | 08-264794 | A | 10/1996 |
| JP | 11-505377 | | 5/1999 |
| JP | 11-337904 | A | 12/1999 |
| JP | 2000-044236 | A | 2/2000 |
| JP | 2000-150900 | A | 5/2000 |
| JP | 2000-180825 | A | 6/2000 |
| JP | 2002-076356 | A | 3/2002 |
| JP | 2002-289859 | A | 10/2002 |
| JP | 2002-303846 | A | 10/2002 |
| JP | 2003-086000 | A | 3/2003 |
| JP | 2003-086808 | A | 3/2003 |
| JP | 2003-178717 | A | 6/2003 |
| JP | 2003-248463 | A | 9/2003 |
| JP | 2003-271112 | A | 9/2003 |
| JP | 2004-103957 | A | 4/2004 |
| JP | 2004-273614 | A | 9/2004 |
| JP | 2004-273732 | A | 9/2004 |
| JP | 2006-220685 | A | 8/2006 |
| JP | 2007-103918 | A | 4/2007 |
| JP | 2007-264211 | A | 10/2007 |
| JP | 2007-264443 | A | 10/2007 |
| JP | 2009-042405 | A | 2/2009 |
| TW | 200836150 | | 9/2008 |
| TW | 200845396 | | 11/2008 |
| WO | WO-2004/114391 | | 12/2004 |
| WO | WO-2007/029844 | | 3/2007 |

OTHER PUBLICATIONS

Kurita et al., "Evaluation and Improvement of Picture Quality for Moving Images on Field-sequential Color Displays," IDW '00: Proceedings of the $17^{th}$ International Display Workshops, 2000, pp. 69-72.

Taira et al., "A15" Field-Sequential Display without Color Break-Up using an AFLC Color Shutter, IDW '00: Proceedings of the $17^{th}$ International Display Workshops, 2000, pp. 73-76.

Jarvenpaa, "7.2: Measuring Color Breakup of Stationary Images in Field-Sequential-Color Displays," SID Digest '04: SID International Symposium Digest of Technical Papers, 2004, vol. 35, pp. 82-85.

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04: SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08: Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08: SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3-Ga2ZnO4-ZnO system at 1350°C,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3-ZnGa2O4-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N. et al., "Crystallization and Reduction of Sol-Gel-Derived Zinc Oxide Films by Irradiation with Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09: SID International Symposium Disgest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA Amoled Driven by the Threshold Voltage Controlled Amorphous GIZO (Ga2O3-In2O3-ZnO) TFT,", SID Digest '08: SID International Symposium Digest of Technical Papers, May 20, 2008, vol. 39, pp. 633-636.

Lee.J et al., "World'S Largest (15-Inch) XGA AMLCD Panel Using IGZO Oxide TFT,", SID Digest '08: SID International Symposium Digest of Technical Papers, May 20, 2008, vol. 39, pp. 625-628.

Nowatari.H et al., "60.2: Intermediate Connector With Suppressed Voltage Loss for White Tandem OLEDS,", SID Digest '09: SID International Symposium Digest of Technical Papers, May 31, 2009, vol. 40, pp. 899-902.

Kanno.H et al., "White Stacked Electrophosphorecent Organic Light-Emitting Devices Employing MoO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA Amoled Display Driven by Indium-Gallium-Zinc Oxide TFTs Array,", SID Digest '08: SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn—Oxide TFTs with Suppressed Variation for 4.0 inch QVGA Amoled Display,", AM-FPD '09 Digest of Technical Papers, Jul. 1, 2009, pp. 227-230, The Japan Society of Applied Physics.

(56) References Cited

OTHER PUBLICATIONS

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.
Cho.D et al., "21.2:Al and Sn-Doped Zinc Indium Oxide Thin Film Transistors for Amoled Back-Plane,", SID Digest '09 : SID International Symposium Digest of Technical Papers, May 31, 2009, pp. 280-283.
Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission Amoled Display on Plastic Film and its Bending Properties,", May 31, 2009, pp. 983-985.
Sakata.J et al., "Development of 4.0-In. Amoled Display With Driver Circuit Using Amorphous In—Ga—Zn—Oxide TFTs,", IDW '09 : Proceedings of the 16th International Display Workshops, 2009, pp. 689-692.
Park.J et al., "Amorphous Indium-Gallium-Zinc Oxide TFTs and Their Application for Large Size Amoled,", AM-FPD '08 Digest of Technical Papers, Jul. 2, 2008, pp. 275-278.
Park.S et al., "Challenge to Future Displays: Transparent AM-OLED Driven by Peald Grown ZnO TFT,", IMID '07 Digest, 2007, pp. 1249-1252.
Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.
Osada.T et al., "Development of Driver-Integrated Panel Using Amorphous In—Ga—Zn—Oxide TFT,", AM-FPD '09 Digest of Technical Papers, Jul. 1, 2009, pp. 33-36.
Hirao.T et al., "Novel Top-Gate Zinc Oxide Thin-Film Transistors (ZnO TFTs) for AMLCDs,", Journal of the SID, 2007, vol. 15, No. 1, pp. 17-22.
Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Characteristics of Amorphous In—Ga—Zn—Oxide TFT,", SID Digest '09 : SID International Symposium Digest of Technical Papers, May 31, 2009, pp. 1110-1112.
Ohara.H et al., "21.3:4.0 In. QVGQ Amoled Display Using In—Ga—Zn—Oxide TFTs With a Novel Passivation Layer,", SID Digest '09 : SID International Symposium Digest of Technical Papers, May 31, 2009, pp. 284-287.
Miyasaka.M, "Suftla Flexible Microelectronics on Their Way to Business,", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.
Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.
Lee.H et al., "Current Status of, Challenges to, and Perspective View of AM-OLED,", IDW '06 : Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.
Nakamura.M et al., "Synthesis of Homologous Compound with New Long-Period Structure,", NIRIM Newsletter, Mar. 1, 1995, vol. 150, pp. 1-4.
Kikuchi.H et al., "Polymer-Stabilized Liquid Crystal Blue Phases,", Nature Materials, Sep. 2, 2002, vol. 1, pp. 64-68.
Kimizuka.N et al., "Spinel, YbFe2O4, and YbFe3O7 Types of Structures for Compounds in the In2O3 and Sc2O3-A2O3-BO Systems [A; Fe, Ga, or Al; B: Mg, Mn, Fe, Ni, Cu, or ZnN] at Temperatures Over 1000°C,", Journal of Solid State Chemistry, 1985, vol. 60, pp. 382-384.
Kitzerow.H et al., "Observation of Blue Phases in Chiral Networks,", Liquid Crystals, 1993, vol. 14, No. 3, pp. 911-916.
Costello.M et al., "Electron Microscopy of a Cholesteric Liquid Crystal and its Blue Phase,", Phys. Rev. A (Physical Review. A), May 1, 1984, vol. 29, No. 5, pp. 2957-2959.
Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.
Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.
Orita.M et al., "Mechanism of Electrical Conductivity of Transparent InGaZnO4,", Phys. Rev. B (Physical Review. B), Jan. 15, 2000, vol. 61, No. 3, pp. 1811-1816.
Nomura.K et al., "Amorphous Oxide Semiconductors for High-Performance Flexible Thin-Film Transistors,", Jpn. J. Appl. Phys. (Japanese Journal of Applied Physics), 2006, vol. 45, No. 5B, pp. 4303-4308.
Janotti.A et al., "Native Point Defects in ZnO,", Phys. Rev. B (Physical Review. B), Oct. 4, 2007, vol. 76, No. 16, pp. 165202-1-165202-22.
Park.J et al., "Electronic Transport Properties of Amorphous Indium—Gallium—Zinc Oxide Semiconductor Upon Exposure to Water,", Appl. Phys. Lett. (Applied Physics Letters), 2008, vol. 92, pp. 072104-1-072104-3.
Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.
Janotti.A et al., "Oxygen Vacancies in ZnO,", Appl. Phys. Lett. (Applied Physics Letters), 2005, vol. 87, pp. 122102-1-122102-3.
Oba.F et al., "Defect energetics in ZnO: A hybrid Hartree-Fock density functional study,", Phys. Rev. B (Physical Review. B), 2008, vol. 77, pp. 245202-1-245202-6.
Orita.M et al., "Amorphous transparent conductive oxide InGaO3(ZnO)m (m<4):a Zn4s conductor,", Philosophical Magazine, 2001, vol. 81, No. 5, pp. 501-515.
Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.
Mo.Y et al., "Amorphous Oxide TFT Backplanes for Large Size AMOLED Displays,", IDW '08 : Proceedings of the 6th International Display Workshops, Dec. 3, 2008, pp. 581-584.
Kim.S et al., "High-Performance oxide thin film transistors passivated by various gas plasmas,", 214th ECS Meeting, 2008, No. 2317, ECS.
Clark.S et al., "First Principles Methods Using CASTEP,", Zeitschrift fur Kristallographie, 2005, vol. 220, pp. 567-570.
Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.
Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.
Ueno.K et al., "Field-Effect Transistor on SrTiO3 with Sputtered Al2O3 Gate Insulator,", Appl. Phys. Lett. (Applied Physics Letters), Sep. 1, 2003, vol. 83, No. 9, pp. 1755-1757.
Taiwanese Office Action (Application No. 100121826) dated Sep. 25, 2015.

* cited by examiner

FIG. 3

| | 301 full-color image display period | 302 monochrome moving image display period | 303 monochrome still image display period |
|---|---|---|---|
| driver circuit | operation | operation | no operation excluding writing |
| backlight | switching of hues | not emit | not emit |
| number of writing image signals | number of hues | once | once |

LIQUID CRYSTAL DISPLAY DEVICE

BACKGROUND OF THE INVENTION

1. Field of the Invention

The present invention relates to an active-matrix liquid crystal display device including a transistor in a pixel.

2. Description of the Related Art

In a transmissive liquid crystal display device, power consumption of a backlight largely affects power consumption of the whole of the liquid crystal display device, and therefore, reduction of light loss inside a panel is important for reduction of power consumption. Light loss inside a panel is caused by light refraction in an interlayer insulating film, light absorption in a color filter, or the like. In particular, the light loss by a color filter is large in principle in the color filter in which light absorption by a pigment is used to extract light having a predetermined range of wavelengths from white light. As a matter of fact, 70% or more of the energy of light from the backlight is absorbed by the color filter. As described above, the color filter hinders reduction in power consumption of the liquid crystal display device.

To avoid the problem of light loss by the color filter, a field sequential driving (FS driving) is effective. The FS driving is a driving method for displaying a color image by sequentially lighting a plurality of light sources whose hues are different from each other. It is not necessary to use a color filter in the FS driving, which leads to reduction in light loss inside a panel, so that the transmittivity of the panel can be improved. Accordingly, the use efficiency of light from the backlight can be improved and power consumption of the whole of the liquid crystal display device can be reduced. Further, according to the FS driving, display of each color can be performed per pixel, so that image display with high definition can be performed.

Disclosed in Patent Document 1 is a liquid crystal display device in which the displaying mode is switched between a color-image display using a field sequential displaying mode in the normal case and a monochrome display in the case where the image is a text or the like.

REFERENCE

Patent Document

Patent Document 1: Japanese Published Patent Application No. 2003-248463

SUMMARY OF THE INVENTION

However, separate perception of images for respective colors without synthesizing them, a so-called color break-up is likely to occur in the FS driving. In particular, the color break-up tends to occur remarkably in displaying a moving image.

Further, according to the field sequential driving, power consumption of a liquid crystal display device can be lower than that of a liquid crystal display device using a color filter. However, along with the spread of mobile electronic devices, the degree of demand for lower power consumption of a liquid crystal display device is getting higher and more and more reduction in power consumption is being demanded.

In view of the foregoing, an object of an embodiment of the present invention is to provide a liquid crystal display device in which deterioration of image quality can be prevented, and a driving method thereof. Another object of an embodiment of the present invention is to provide a liquid crystal display device in which power consumption can be reduced, and a driving method thereof.

An object of an embodiment of the present invention is to provide a liquid crystal display device capable of image display according to an environment around the liquid crystal display device, e.g., in a bright environment or a dim environment.

Another object is to provide a liquid crystal display device capable of image display in both modes of a reflective mode in which external light is used as a light source and a transmissive mode in which a backlight is used.

A liquid crystal display device according to an embodiment of the present invention includes a backlight including a plurality of light sources emitting lights having different hues. Further, a method for driving the light sources is switched between full-color image display and monochrome image display.

In the case of the full-color image display, a pixel portion is divided into a plurality of regions, and lighting of the light sources is controlled per region. The pixel portion includes a transparent region and a reflective region. Specifically, in an embodiment of the present invention, a pixel portion includes at least a first region and a second region. Through the transparent region of the pixel electrode, a plurality of lights whose hues are different from each other are sequentially supplied to the first region in a first rotating order, and the plurality of lights whose hues are different from each other are also sequentially supplied to the second region in a second rotating order which is different from the first rotating order.

In the case of monochrome image display, supply of light is stopped and external light is reflected by the reflective region included in the pixel electrode, so that an image is displayed. Note that supply of light may be performed on the whole pixel portion or per region so that the visibility of the displayed image is improved.

In an embodiment of the present invention, the driving frequency in the case where the monochrome image is a still image is lower than that in the case where the monochrome image is a moving image. Further, in an embodiment of the present invention, a liquid crystal element and an insulated gate field effect transistor whose off-state current is extremely low (hereinafter referred to simply as a transistor) for controlling holding of a voltage supplied to the liquid crystal element are provided in a pixel portion of a liquid crystal display device in order to lower the driving frequency. With the use of the transistor whose off-state current is extremely low, the period in which a voltage supplied to the liquid crystal element is held can be increased. Accordingly, for example, in the case where image signals each having the same image information are written to a pixel portion for some consecutive frame periods, like a still image, display of an image can be maintained even when the driving frequency is low, in other words, the number of writings of image signals for a certain period is reduced.

In addition, an embodiment of the present invention is a liquid crystal display device which is provided with a reflective region where display is performed with reflection of light (hereinafter referred to as external light) incident on a pixel electrode through a liquid crystal layer and a transmissive region where display is performed with transmission of light from a backlight and can switch the transmissive mode and the reflective mode. In the transmissive mode, image display is performed using light from the backlight; in the reflective mode, image display is performed using external light.

An embodiment of the present invention includes a plurality of light sources emitting lights having different hues and a pixel portion. The pixel portion includes a pixel electrode including a transmissive region and a reflective region, and a transistor electrically connected to the pixel electrode. The pixel portion is divided into a plurality of regions, the lights having different hues are supplied to the plurality of regions by controlling lighting of the light sources, and image signals for full-color image display in accordance with the different hues are input to the pixel electrode through the transistor, so that color image display is performed. Further, the light sources are turned off, an image signal for monochrome display is input to the pixel electrode through the transistor, and external light is reflected by the reflective region, so that monochrome image display is performed.

The above transistor includes, in a channel formation region, a semiconductor material which has a wider bandgap and a lower intrinsic carrier density than a silicon semiconductor. With a channel formation region including a semiconductor material having the above characteristics, a transistor whose off-state current is extremely low can be realized. As an example of such a semiconductor material, an oxide semiconductor having a bandgap which is approximately three times as wide as that of silicon can be given. In contrast to a transistor formed using a normal semiconductor material, such as silicon or germanium, a transistor that has the above structure and is used as a switching element for holding a voltage supplied to a liquid crystal element can effectively prevent leakage of charge from the liquid crystal element.

Specifically, a liquid crystal display device according to an embodiment of the present invention includes a panel provided with a pixel portion which includes a transparent electrode and a reflective electrode as pixel electrodes and a driver circuit for controlling an input of an image signal to the pixel region, and a plurality of light sources for supplying lights having different hues to the pixel portion. The pixel portion includes a display element whose transmittivity is controlled in accordance with a voltage of an image signal to be input and a transistor used for controlling holding of the voltage. A channel formation region of the transistor includes a semiconductor material which has a wider bandgap and a lower intrinsic carrier density than a silicon semiconductor, such as an oxide semiconductor, for example.

Further, specifically, in a driving method of a liquid crystal display device according to an embodiment of the present invention, a pixel portion includes at least a first region and a second region, a plurality of lights whose hues are different from each other are sequentially supplied to the first region in a first rotating order, and the plurality of lights whose hues are different from each other are also sequentially supplied to the second region in a second rotating order which is different from the first rotating order in the case of full-color image display. Image signals for full-color display corresponding to hues of lights to be supplied are input to the regions of the pixel portion. Further, in the case of monochrome image display, image signlas for monochrome display are supplied to the pixel portion. In the case of monochrome display, the number of writings of an image signal in a predetermined period can be switched.

Note that an oxide semiconductor (purified OS) in which oxygen deficiency is reduced by adding oxygen after reducing an impurity serving as an electron donor (donor), such as moisture or hydrogen, is an i-type semiconductor (an intrinsic semiconductor) or a substantially i-type semiconductor. Therefore, a transistor including the oxide semiconductor has a characteristic of an extremely low off-state current. Specifically, the oxide semiconductor has a hydrogen concentration of less than or equal to $5\times10^{19}/cm^3$, preferably less than or equal to $5\times10^{18}/cm^3$, further preferably less than or equal to $5\times10^{17}/cm^3$, still further preferably less than or equal to $1\times10^{16}/cm^3$, when the hydrogen concentration is measured by secondary ion mass spectrometry (SIMS). In addition, the oxide semiconductor film has a carrier density of less than $1\times10^{14}/cm^3$, preferably less than $1\times10^{12}/cm^3$, further preferably less than $1\times10^{11}/cm^3$, when the carrier density is measured by Hall effect measurement. Furthermore, the oxide semiconductor has a bandgap of 2 eV or more, preferably 2.5 eV or more, further preferably 3 eV or more. With the use of the i-type or substantially i-type oxide semiconductor film in which the concentration of an impurity is reduced and further oxygen deficiency is reduced, the off-state current of the transistor can be reduced.

Note that in the case where color image display is performed using a plurality of light sources having different hues, it is necessary to sequentially switch the plurality of light sources when light emission is performed unlike in the case where a light source of a single color and a color filter are used in combination. In addition, a frequency at which the light sources are switched needs to be set higher than a frame frequency in the case of using a single-color light source. For example, when the frame frequency in the case of using the single-color light source is 60 Hz, in the case where FS driving is performed using light sources corresponding to colors of red, green, and blue, the frequency at which the light sources are switched is about three times as high as the frame frequency, i.e., 180 Hz. Accordingly, the driver circuits, which are operated in accordance with the frequency of the light sources, are operated at an extremely high frequency. Therefore, power consumption in the driver circuits tends to be high as compared to the case of using the combination of the single-color light source and the color filter.

However, according to an embodiment of the present invention, the transistor whose off-state current is extremely low is used in the pixel portion, whereby a period in which a voltage supplied to a liquid crystal element is held can be prolonged. Therefore, the driving frequency for displaying a still image can be decreased to a frequency lower than the driving frequency for displaying a moving image.

The analysis of the concentration of hydrogen in the oxide semiconductor film is described here. The concentrations of hydrogen in the oxide semiconductor film and a conductive film are measured by secondary ion mass spectrometry (SIMS). It is known that it is difficult to obtain data in the proximity of a surface of a sample or in the proximity of an interface between stacked films formed using different materials by the SIMS analysis in principle. Thus, in the case where distributions of the hydrogen concentrations of the films in thickness directions are analyzed by SIMS, an average value in a region in the films, the value is not greatly changed, and almost the same value can be obtained is employed as the hydrogen concentration. Further, in the case where the thickness of the film is small, a region where almost the same value can be obtained cannot be found in some cases due to the influence of the hydrogen concentration of the films adjacent to each other. In this case, the maximum value or the minimum value of the hydrogen concentration in a region where the films are provided is employed as the hydrogen concentration in the film. Furthermore, in the case where a mountain-shaped peak having the maximum value and a valley-shaped peak having the minimum value do not exist in the region where the films are provided, the value of the inflection point is employed as the hydrogen concentration.

Specifically, various experiments can prove the low off-state current of the transistor whose active layer is the i-type or substantially i-type oxide semiconductor film. For example, even with an element with a channel width of $1\times10^6$ μm and a channel length of 10 μm, in a range from 1 V to 10 V of voltage (drain voltage) between a source electrode and a drain electrode, it is possible that the off-state current (which is a drain current in the case where a voltage between a gate electrode and the source electrode is 0 V or less) is less than or equal to the measurement limit of a semiconductor parameter analyzer, that is, less than or equal to $1\times10^{-13}$ A. In this case, it can be found that an off-state current density corresponding to a value obtained by dividing the off-state current by the channel width of the transistor is less than or equal to 100 zA/μm. In addition, a capacitor and a transistor were connected to each other and an off-state current density was measured by using a circuit in which electric charge flowing into or from the capacitor was controlled by the transistor. In the measurement, the oxide semiconductor film was used for a channel formation region in the transistor, and the off-state current density of the transistor was measured from change in the amount of electric charge of the capacitor per unit time. As a result, it was found that in the case where the voltage between the source electrode and the drain electrode of the transistor was 3 V, a lower off-state current density of several tens yoctoampere per micrometer (yA/μm) was able to be obtained. Therefore, in a semiconductor device according to an embodiment of the present invention, the off-state current density of the transistor including the oxide semiconductor film as an active layer can be less than or equal to 100 yA/μm, preferably less than or equal to 10 yA/μm, or further preferably less than or equal to 1 yA/μm, depending on the voltage between the source electrode and drain electrode. Accordingly, the transistor including the oxide semiconductor film as an active layer has a much lower off-state current than a transistor including silicon having crystallinity.

Note that as the oxide semiconductor, it is possible to use an indium oxide; a tin oxide; a zinc oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a four-component metal oxide such as an In—Sn—Ga—Zn-based oxide semiconductor, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Note that, for example, an In—Ga—Zn-based oxide means an oxide containing In, Ga, and Zn, and there is no limitation on the composition ratio of In, Ga, and Zn. The In—Ga—Zn-based oxide may contain a metal element other than the In, Ga, and Zn. Alternatively, a material represented by $InMO_3(ZnO)_m$ (m>0 is satisfied, and m is not an integer) may be used as an oxide semiconductor. Note that M represents one or more metal elements selected from Ga, Fe, Mn, and Co. Still alternatively, a material represented by $In_2SnO_5(ZnO)_n$ (n>0 is satisfied, and n is an integer) may be used as an oxide semiconductor.

In a liquid crystal display device according to an embodiment of the present invention, a pixel portion is divided into a plurality of regions, and lights whose hues are different from each other are sequentially supplied per region, whereby a color image is displayed. Therefore, at each time, a hue of a light supplied to a region can be different from a hue of a light supplied to the adjacent region. Consequently, separate perception of images for respective colors without synthesis can be prevented, so that a color break-up, which has been likely to occur in displaying a moving image, can be prevented from occurring.

According to an embodiment of the present invention, it is possible to realize a liquid crystal display device capable of image display using a reflective mode utilizing external light as a light source and a transmissive mode utilizing a backlight according to an environment around the liquid crystal display device, e.g., in a bright environment or a dim environment. For example, a moving image is displayed using a transmissive mode, and a still image is displayed using a reflective mode.

According to an embodiment of the present invention, a transistor whose off-state current is extremely low is used in the pixel portion, whereby a period for holding a voltage applied to a liquid crystal element can be prolonged. Therefore, the driving frequency for displaying a still image can be decreased to a frequency lower than the driving frequency for displaying a moving image. Consequently, a liquid crystal display device whose power consumption is low can be achieved.

BRIEF DESCRIPTION OF THE DRAWINGS

In the accompanying drawings:

FIG. 3 schematically illustrates operations of a liquid crystal display device and a backlight;

FIGS. 23A to 23E2 illustrate cross-sectional views of a method for manufacturing a liquid crystal display device;

DETAILED DESCRIPTION OF THE INVENTION

Hereinafter, embodiments and an example of the present invention will be described in detail with reference to the accompanying drawings. However, the present invention is not limited to the following description and it is easily understood by those skilled in the art that the mode and details can be variously changed without departing from the scope and spirit of the present invention. Accordingly, the invention should not be construed as being limited to the description of the embodiments and the example below.

[Embodiment 1]

<Structure Example of Liquid Crystal Display Device>

Figure 1:
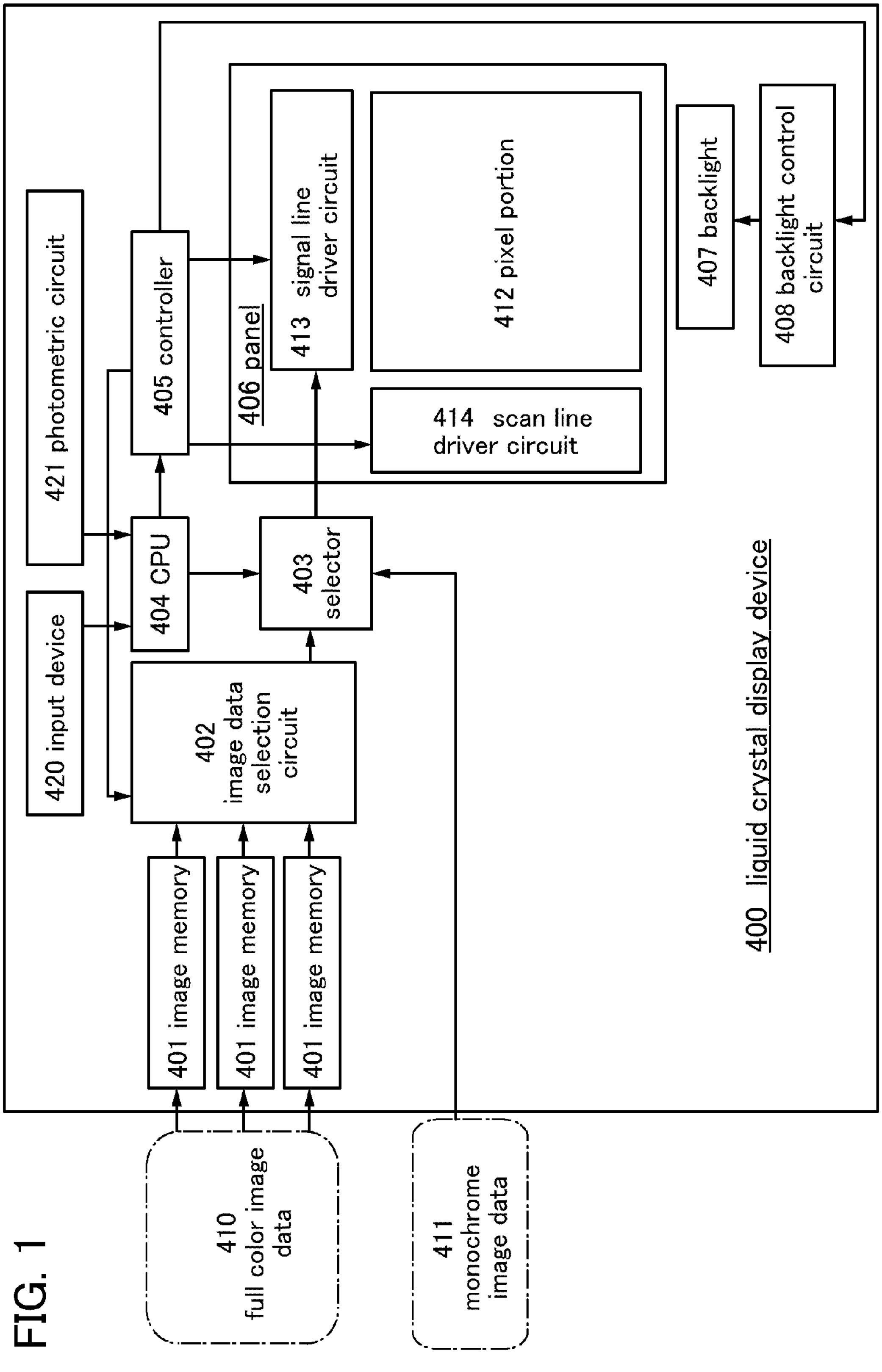
FIG. 1 illustrates a block diagram of a structure of a liquid crystal display device.

A liquid crystal display device 400 illustrated in FIG. 1 includes a plurality of image memories 401, an image data selection circuit 402, a selector 403, a CPU 404, a controller 405, a panel 406, a backlight 407, and a backlight control circuit 408.

Image data corresponding to a full-color image (full-color image data 410), which are input to the liquid crystal display device 400, are stored in the plurality of image memories 401. The full-color image data 410 include image data for their respective hues. The image data for the respective hues are stored in the respective image memories 401.

As the image memories 401, for example, memory circuits such as dynamic random access memories (DRAMs) or static random access memories (SRAMs) can be used.

The image data selection circuit 402 reads the full-color image data for the respective hues, which are stored in the plurality of image memories 401, and sends the full-color image data to the selector 403 according to a command from the controller 405.

In addition, image data corresponding to a monochrome image (monochrome image data 411) are also input to the liquid crystal display device 400. Then, the monochrome image data 411 are input to the selector 403.

Note that a full-color image refers to an image displayed with gradations of a plurality of colors having different hues. In addition, a monochrome image refers to an image displayed with a gradation of a color having a single hue.

Although the structure in which the monochrome image data 411 are directly input to the selector 403 is employed in this embodiment, an embodiment of the present invention is not limited to this structure. The monochrome image data 411 may also be stored in the image memory 401 and then read by the image data selection circuit 402 in a similar manner to the full-color image data 410. In that case, the selector 403 is included in the image data selection circuit 402.

Alternatively, the monochrome image data 411 may be formed by synthesizing the full-color image data 410 in the liquid crystal display device 400.

The CPU 404 controls the selector 403 and the controller 405 so that the operations of the selector 403 and the controller 405 are switched between full-color image display and monochrome image display.

Specifically, in the case of the full-color image display, the selector 403 selects the full-color image data 410 and supplies them to the panel 406 in accordance with a command from the CPU 404. In addition, the controller 405 supplies the panel 406 with a driving signal which is synchronized with the full-color image data 410 and/or a power supply potential which is to be used when the full-color image is displayed, in accordance with a command from the CPU 404.

In the case of the monochrome image display, the selector 403 selects the monochrome image data 411 and supplies them to the panel 406 in accordance with a command from the CPU 404. In addition, the controller 405 supplies the panel 406 with a driving signal which is synchronized with the monochrome image data 411 and/or a power supply potential which is to be used when the monochrome image is displayed, in accordance with a command from the CPU 404.

The panel 406 includes a pixel portion 412 in which each pixel includes a liquid crystal element, and driver circuits such as a signal line driver circuit 413 and a scan line driver circuit 414. The full-color image data 410 or the monochrome image data 411 from the selector 403 are supplied to the signal line driver circuit 413. In addition, the driving signals and/or the power supply potential from the controller 405 are/is supplied to the signal line driver circuit 413 and/or the scan line driver circuit 414.

Note that the driving signals include a signal line driver circuit start pulse signal (SSP) and a signal line driver circuit clock signal (SCK) which control the operation of the signal line driver circuit 413; a scan line driver circuit start pulse signal (GSP) and a scan line driver circuit clock signal (GCK) which control the operation of the scan line driver circuit 414; and the like.

A plurality of light sources emitting lights having different hues are provided in the backlight 407. The controller 405 controls driving of the light sources included in the backlight 407 through the backlight control circuit 408.

Note that switching between full-color image display and monochrome image display can be performed by hand. In that case, an input device 420 may be provided in the liquid crystal display device 400 so that the CPU 404 controls the switching in accordance with a signal from the input device 420.

The liquid crystal display device 400 in this embodiment may include a photometric circuit 421. The photometric circuit 421 measures the brightness of an environment where the liquid crystal display device 400 is used. The CPU 404 may control the switching between full-color image display and monochrome image display in accordance with the brightness detected by the photometric circuit 421.

For example, in the case where the liquid crystal display device 400 in this embodiment is used in a dim environment, the CPU 404 may select full-color image display in accordance with a signal from the photometric circuit 421; in the case where the liquid crystal display device 400 is used in a bright environment, the CPU 404 may select monochrome image display in accordance with a signal from the photometric circuit 421. Note that a threshold value may be set in the photometric circuit 421 so that the backlight 407 is turned on when the brightness of a usage environment becomes less than the threshold value.

<Structure Example of Panel>

Next, an example of a specific structure of the panel of the liquid crystal display device according to an embodiment of the present invention is described.

Figure 2A:
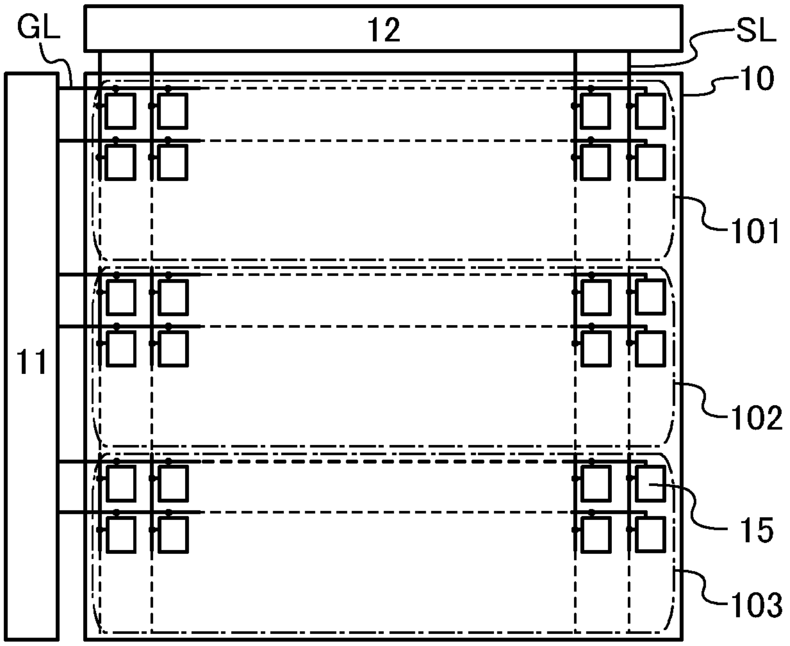
FIGS. 2A and 2B illustrate configurations of a panel and a pixel, respectively.

FIG. 2A illustrates a structural example of a liquid crystal display device. The liquid crystal display device illustrated in FIG. 2A includes a pixel portion 10, a scan line driver circuit 11, and a signal line driver circuit 12. In an embodiment of the present invention, the pixel portion 10 is divided into a plurality of regions. Specifically, the pixel portion 10 is divided into three regions (regions 101 to 103) in FIG. 2A. Each region includes a plurality of pixels 15 arranged in a matrix.

M scan lines GL whose potentials are controlled by the scan line driver circuit 11 and n signal lines SL whose potentials are controlled by the signal line driver circuit 12 are provided for the pixel portion 10. The m scan lines GL are divided into a plurality of groups in accordance with the number of regions of the pixel portion 10. For example, the m scan lines GL are divided into three groups because the pixel portion 10 is divided into three regions in FIG. 2A. The scan lines GL in each group are connected to the plurality of pixels 15 in each corresponding region. Specifically, each scan line GL is connected to n pixels 15 in each corresponding row among the plurality of pixels 15 arranged in matrix in corresponding region.

Regardless of the above regions, each of the signal lines SL is connected to m pixels 15 in each corresponding column among the plurality of pixels 15 arranged in a matrix of m rows by n columns in the pixel portion 10.

Note that the term "connection" in this specification refers to electrical connection and corresponds to the state in which a current, a potential, or a voltage can be supplied or transmitted. Therefore, the state of connection does not always mean a state of direct connection but includes in its category a state of indirect connection through a circuit element such as a wiring, a resistor, a diode, or a transistor, in which a current, a voltage, or a potential can be supplied, or transmitted.

Note that even when a circuit diagram illustrates independent components which are connected to each other, one conductive film may have functions of a plurality of components, such as the case where part of a wiring also functions as an electrode. The term "connection" in this specification also means such a case where one conductive film has functions of a plurality of components.

The names of the "source electrode" and the "drain electrode" included in a transistor interchange with each other depending on the polarity of the transistor or difference between the levels of potentials supplied to the respective electrodes. In general, in an n-channel transistor, an electrode supplied with a lower potential is called a source electrode, and an electrode supplied with a higher potential is called a drain electrode. Further, in a p-channel transistor, an electrode supplied with a lower potential is called a drain electrode, and an electrode supplied with a higher potential is called a source electrode. In this specification, one of a source electrode and a drain electrode is referred to as a first terminal and the other is referred to as a second terminal to describe the connection relation of the transistor.

Figure 2B:
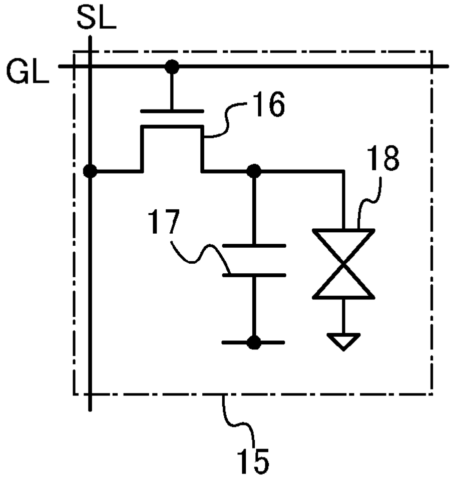

FIG. 2B illustrates an example of a circuit configuration of the pixel 15 included in the liquid crystal display device illustrated in FIG. 2A. The pixel 15 illustrated in FIG. 2B includes a transistor 16 functioning as a switching element, a liquid crystal element 18 whose transmittivity is controlled in accordance with the potential of an image signal supplied through the transistor 16, and a capacitor 17.

The liquid crystal element 18 includes a pixel electrode, a counter electrode, and a liquid crystal layer including liquid crystals to which a voltage between the pixel electrode and the counter electrode is applied. The pixel electrode includes a region which reflects incident light passing through the liquid crystal layer (a reflective region) and a region having a light-transmitting property (a transmissive region). The capacitor 17 has a function of holding the voltage between the pixel electrode and the counter electrode included in the liquid crystal element 18.

As examples of a liquid crystal material used for the liquid crystal layer, the following can be given: a nematic liquid crystal, a cholesteric liquid crystal, a smectic liquid crystal, a discotic liquid crystal, a thermotropic liquid crystal, a lyotropic liquid crystal, a low-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase is only generated within a narrow range of temperature, a chiral agent or an ultraviolet curable resin is added so that the temperature range is improved. The liquid crystal composition which includes a liquid crystal exhibiting a blue phase and a chiral agent is preferable because it has a small response time of greater than or equal to 10 μsec and less than or equal to 100 μsec, has optical isotropy, which makes the alignment process unneeded and has a small viewing angle dependence.

Moreover, the following methods can be used for driving the liquid crystal, for example: a TN (twisted nematic) mode, an STN (super twisted nematic) mode, a VA (vertical alignment) mode, an MVA (multi-domain vertical alignment) mode, an IPS (in-plane-switching) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, and a guest-host mode.

Note that the pixel 15 may further include another circuit element such as a transistor, a diode, a resistor, a capacitor, or an inductor as needed.

Specifically, in FIG. 2B, a gate electrode of the transistor 16 is connected to the scan line GL. A first terminal of the transistor 16 is connected to the signal line SL. A second terminal of the transistor 16 is connected to the pixel electrode of the liquid crystal element 18. One electrode of the capacitor 17 is connected to the pixel electrode of the liquid crystal element 18. The other electrode of the capacitor 17 is connected to a node supplied with a potential. Note that the potential is also supplied to the counter electrode of the liquid crystal element 18. The potential supplied to the counter electrode may be in common with the potential supplied to the other electrode of the capacitor 17.

In an embodiment of the present invention, a channel formation region of the transistor 16 functioning as a switching element may include a semiconductor which has a wider bandgap and a lower intrinsic carrier density than a silicon semiconductor. As examples of the semiconductor, a compound semiconductor such as silicon carbide (SiC) or gallium nitride (GaN), an oxide semiconductor including a metal oxide such as zinc oxide (ZnO), and the like can be given. Among the above, an oxide semiconductor has an advantage of high mass productivity because the oxide semiconductor can be formed by sputtering, a wet process (e.g., a printing method), or the like. In addition, the deposition temperature of an oxide semiconductor is higher than or equal to 300° C. and less than a glass transition temperature whereas the process temperature of silicon carbide and the process temperature of gallium nitride are approximately 1500° C. and approximately 1100° C., respectively. Therefore, an oxide semiconductor can be formed over a glass substrate which is inexpensively available. Further, a larger substrate can be used. Accordingly, among the semiconductors with wide bandgaps, the oxide semiconductor particularly has an advantage of high mass productivity. Further, in the case where an oxide semiconductor with high crystallinity is to be obtained in order to improve the property (e.g., field-effect mobility) of a transistor, the oxide semiconductor with crystallinity can be easily obtained by heat treatment at 450° C. to 800° C.

In the following description, the case where an oxide semiconductor having the above advantages is used as the semiconductor having a wide bandgap is given as an example.

Unless otherwise specified, in the case of an n-channel transistor, an off-state current in this specification is a current which flows between a source electrode and a drain electrode when the potential of the drain electrode is higher than that of the source electrode and that of a gate electrode while the voltage between the gate electrode and the source electrode is less than or equal to zero. Further, in this specification, in the case of a p-channel transistor, an off-state current is current which flows between a source electrode and a drain electrode when the potential of the drain electrode is lower than that of the source electrode or that of a gate electrode while the potential between the gate electrode and the source is greater than or equal to zero.

Although FIG. 2B illustrates the case where one transistor 16 is used as a switching element in the pixel 15, an embodiment of the present invention is not limited to this configuration. A plurality of transistors may be used as a switching element. In the case where a plurality of transistors functions as a switching element, the plurality of transistors may be connected to each other in parallel, in series, or in combination of parallel connection and series connection.

Note that in this specification, the state in which transistors are connected to each other in series means, for example, the state in which only one of a first terminal and a second terminal of a first transistor is connected to only one of a first terminal and a second terminal of a second transistor. Further, the state in which transistors are connected to each other in parallel means a state in which a first terminal of a first transistor is connected to a first terminal of the second transistor and a second terminal of the first transistor is connected to a second terminal of the second transistor.

The semiconductor material having such characteristics is included in the channel formation region, so that the transistor 16 whose off-state current is extremely low and whose withstand voltage is high can be realized. Further, when the transistor 16 having the above-described structure is used as a switching element, leakage of charge accumulated in the liquid crystal element 18 can be prevented effectively as compared to the case of using a transistor including a normal semiconductor material such as silicon or germanium.

The transistor 16 whose off-state current is extremely low is used, whereby a period in which a voltage supplied to the liquid crystal element 18 is held can be prolonged. Accordingly, for example, in the case where image signals each having the same image information are written to the pixel portion 10 for some consecutive frame periods, like in the case of a still image, an image display can be maintained even when driving frequency is low, in other words, the number of writings of image signals to the pixel portion 10 in a certain period is reduced. For example, the transistor 16, in which the above-mentioned i-type or substantially i-type oxide semiconductor film is employed, whereby an interval between writings of image signals can be 10 seconds or more, preferably 30 seconds or more, further preferably 1 minute or more. As the interval between writings of image signals is made longer, power consumption can be further reduced.

When human eyes see an image formed by writing the image signal plural times, the human eyes see images which are switched plural times, which might cause eye strain. With a structure where the number of writings of image signals is reduced as described in this embodiment, eyestrain can be alleviated.

In addition, since the potential of an image signal can be held for a longer period, the quality of the displayed image can be prevented from being lowered even when the capacitor 17 for holding a potential of an image signal is not connected to the liquid crystal element 18. Thus, it is possible to increase the aperture ratio by reducing the size of the capacitor 17 or by not providing the capacitor 17, which leads to reduction in power consumption of the liquid crystal display device.

In addition, by inversion driving in which the polarity of the potential of an image signal is inverted with respect to the potential of the counter electrode, deterioration of a liquid crystal called burn-in can be prevented. However, in the inversion driving, the change in the potential supplied to the signal line is increased at the time of changing the polarity of the image signal; thus, a potential difference between a source electrode and a drain electrode of the transistor 16 functioning as a switching element is increased. Accordingly, deterioration of characteristics of the transistor 16, such as a shift of threshold voltage, is easily caused. In addition, in order to maintain a voltage held in the liquid crystal element 18, a low off-state current is needed even when the potential difference between the source electrode and the drain electrode is large. In an embodiment of the present invention, a semiconductor which has a wider bandgap and a lower intrinsic carrier density than silicon or germanium, such as an oxide semiconductor, is used for the transistor 16; therefore, the withstand voltage of the transistor 16 can be increased and the off-state current can be made considerably low. Therefore, as compared to the case of using a transistor including a normal semiconductor material such as silicon or germanium, deterioration of the transistor 16 can be prevented and the voltage held in the liquid crystal element 18 can be maintained.

<Operation Examples of Panel and Backlight>

Next, an example of the operation of the panel together with the operation of the backlight will be described. FIG. 3 schematically shows the operation of the liquid crystal display device and the operation of the backlight. As shown in FIG. 3, the operation of the liquid crystal display device according to an embodiment of the present invention is roughly divided into a period in which a full-color image is displayed (a full-color image display period 301), a period in which a monochrome moving image is displayed (a monochrome moving image display period 302), and a period in which a monochrome still image is displayed (a monochrome still image display period 303).

In the full-color image display period 301, one frame period is constituted by a plurality of subframe periods. In each of the subframe periods, writing of the image signal to the pixel portion is performed. While an image is being displayed, driving signals are successively supplied to the driver circuits such as the scan line driver circuit and the signal line driver circuit. Therefore, the driver circuits are operated in the full-color image display period 301. In addition, the hue of the light supplied to the pixel portion from the backlight is switched every subframe period in the full-color image display period 301. Image signals corresponding to their respective hues are sequentially written to the pixel portion. Then, the image signals corresponding to all of the hues are written in one frame period, whereby one image is formed. Accordingly, in the full-color image display period 301, the number of writings of the image signal to the pixel portion in one frame period is more than one and is determined by the number of the hues of the lights supplied from the backlight.

In the monochrome moving image display period 302, writing of the image signal to the pixel portion is performed every frame period. While an image is being displayed, the driving signals are successively supplied to the driver circuits such as the scan line driver circuit and the signal line driver circuit. Therefore, the driver circuits are operated in the monochrome moving image display period 302. In addition, in the monochrome moving image display period 302, the backlight is off and the reflective region in the pixel electrode reflects external light, whereby an image is displayed. Therefore, it is not necessary to write image signals corresponding to a plurality of hues to the pixel portion sequentially. One image can be formed by writing an image signal corresponding to one hue to the pixel portion in one frame period. Accordingly, in the monochrome moving image display period 302, the number of writings of the image signal to the pixel portion in one frame period is one.

In the monochrome still image display period 303, wiring of the image signal to the pixel portion is performed every frame period. Note that unlike the full-color image display period 301 and the monochrome moving image display period 302, the driving signals are supplied to the driver circuits during the writing of the image signal to the pixel portion, and after the writing is completed, the supply of the driving signals to the driver circuits is stopped. Therefore, the driver circuits are not operated in the monochrome still image display period 303 except during the writing of the image signal. Further, in the monochrome still image display period 303, the backlight is off and the reflective region in the pixel electrode reflects external light, whereby an image is displayed. Therefore, it is not necessary to write image signals for a plurality of hues to the pixel portion sequentially, and one image can be formed by writing an image signal for one hue to the pixel portion in one frame period. Accordingly, in the monochrome still image display period 303, the number of writings of the image signal to the pixel portion in one frame period is one.

Note that it is preferable that 60 or more frame periods be provided in one second in the monochrome moving image display period 302 in order to prevent a flicker of an image or the like from being perceived. In the monochrome still image display period 303, one frame period can be extremely prolonged to, for example, one minute or longer. When one frame period is long, the period in which the driver circuits are not operated can be long, so that power consumption of the liquid crystal display device can be reduced. In addition, the backlight is not necessary for image display, the power consumption of the liquid crystal display device can be further reduced.

The liquid crystal display device according to an embodiment of the present invention does not need to be provided with a color filter. Therefore, the power consumption can be lower than that of a liquid crystal display device including a color filter.

Note that even in the monochrome moving image display period 302 or the monochrome still image display period 303, the backlight can be turned on in the whole pixel portion or per region as needed so that the visibility of the displayed image is improved.

Figure 4A:
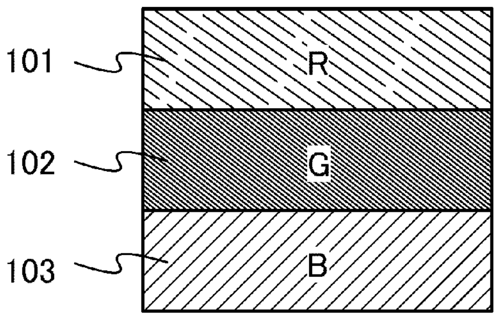
FIGS. 4A to 4C schematically illustrate an example of hues of lights supplied to each region.
Figure 4B:
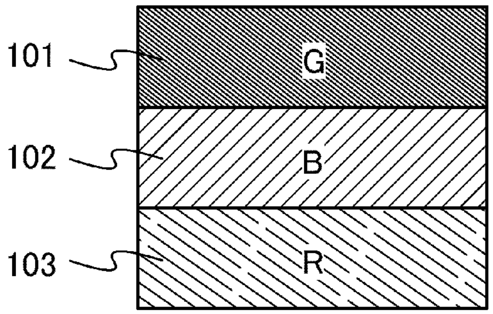
Figure 4C:
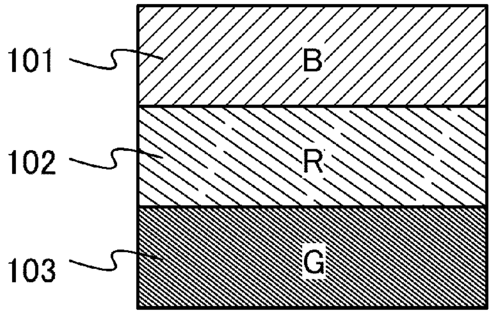

Note that a plurality of lights having different hues are sequentially supplied to each region of the pixel portion in one frame period in the full-color image display period 301. FIGS. 4A to 4C schematically illustrate an example of the hues of lights supplied to the regions. Note that FIGS. 4A to 4C illustrate the case where the pixel portion is divided into three regions as in FIG. 2A. Further, FIGS. 4A to 4C illustrate the case where the backlights supply lights of red (R), blue (B), and green (G) to the pixel portion.

First, FIG. 4A shows the first subframe period in which a light of red (R) is supplied to the region 101, a light of green (G) is supplied to the region 102, and a light of blue (B) is supplied to the region 103. FIG. 4B shows the second subframe period in which a light of green (G) is supplied to the region 101, a light of blue (B) is supplied to the region 102, and a light of red (R) is supplied to the region 103. FIG. 4C shows the third subframe period, in which a light of blue (B) is supplied to the region 101, a light of red (R) is supplied to the region 102, and a light of green (G) is supplied to the region 103.

The completion of the above subframe periods corresponds to the completion of one frame period. In one frame period, each hue of lights supplied to the regions takes a round of the regions, and a full-color image can be displayed. In the regions, the hue of the light supplied to the region 101 is changed in the order of red (R), green (G), and blue (B); the hue of the light supplied to the region 102 is changed in the order of green (G), blue (B), and red (R); and the hue of the light supplied to the region 103 is changed in the order of blue (B), red (R), and green (G). In this manner, the plurality of the lights having different hues are sequentially supplied to each of the regions in accordance with the order that is different between the regions.

Note that FIGS. 4A to 4C illustrate the example in which a light having one hue is supplied to one region in each subframe; however, an embodiment of the present invention is not limited to this structure. For example, the hues of the lights supplied to the regions may be changed in order of completion of the writing of the image signal. In that case, a region supplied with the light of the hue does not necessarily correspond to the region formed by dividing the pixel portion.

Figure 5A:
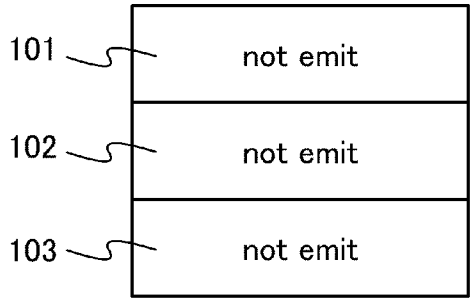
FIGS. 5A to 5C schematically illustrate an example of turning off of lights supplied to regions.

The supply of light is stopped in the monochrome moving image display period 302 and the monochrome still image display period 303. FIG. 5A illustrates the state where the backlights provided for to the region 101, the region 102, and the region 103 are off.

Figure 5B:
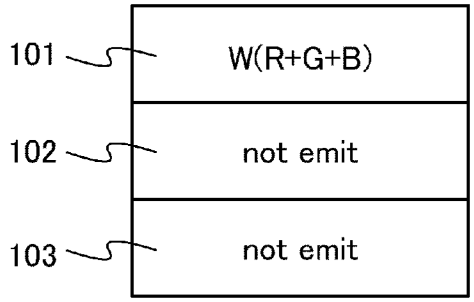

Alternatively, the backlight may be turned on in the whole pixel portion or per region as needed so that the visibility of a displayed image is improved. FIG. 5B illustrates the state where lights of red (R), blue (B), and green (G) are supplied in parallel from the backlight to the region 101. The lights of red (R), blue (B), and green (G) are mixed to supply a light of white (W) to the region 101.

Figure 5C:
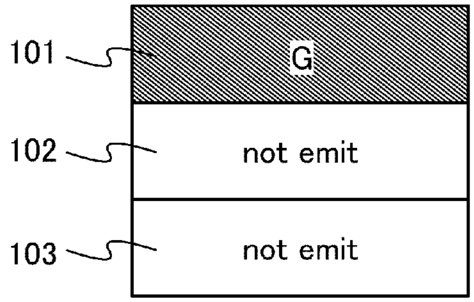

Although FIG. 5B illustrates the example in which the light having one hue is supplied to the pixel portion by mixing the plurality of lights having different hues, a light having one hue may be supplied to the pixel portion. FIG. 5C illustrates the state where a light of green (G) is supplied from the backlight to the region 101.

<Configuration Example of Scan Line Driver Circuit 11>

Figure 6:
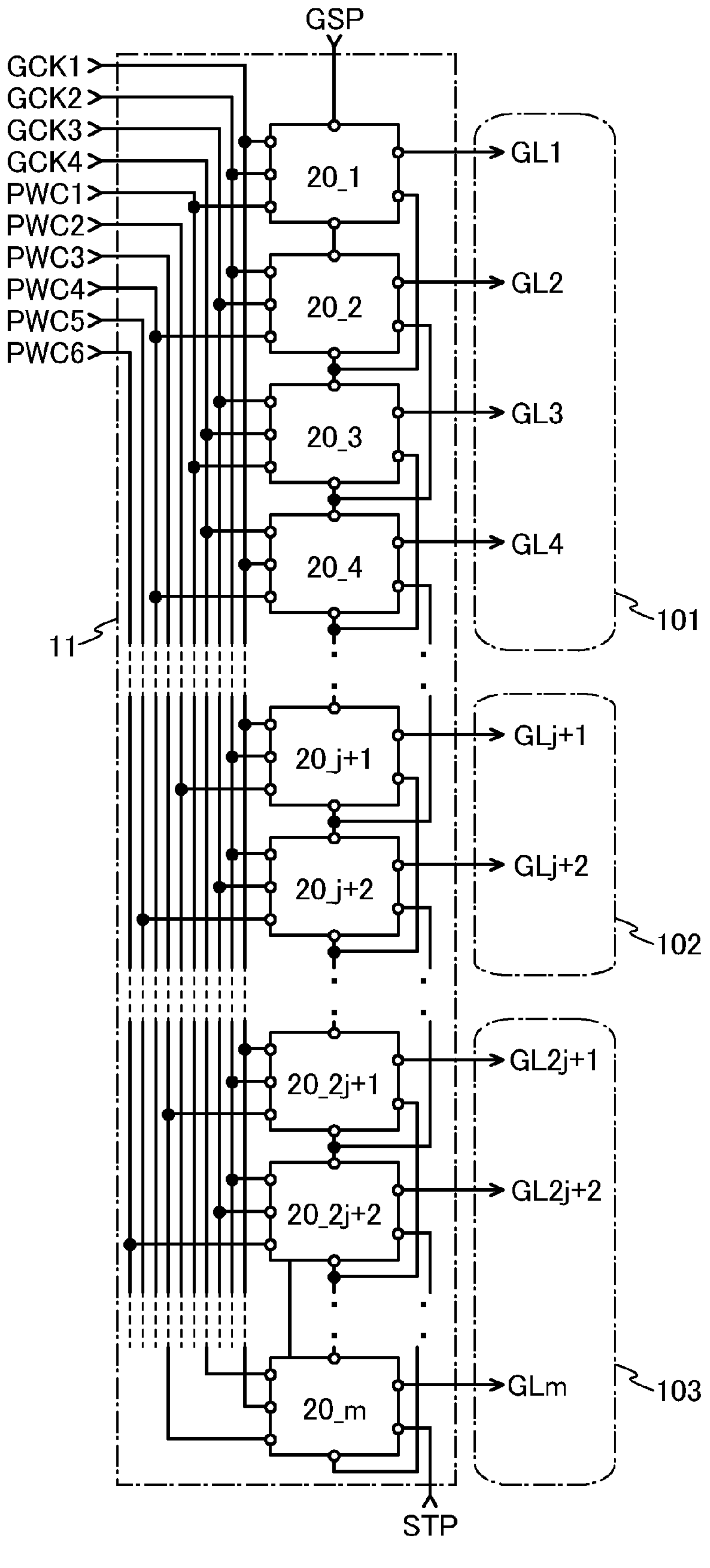
FIG. 6 illustrates a configuration of a scan line driver circuit.

FIG. 6 illustrates a configuration example of the scan line driver circuit 11 illustrated in FIG. 2A. The scan line driver circuit 11 in FIG. 6 includes first to m-th pulse output circuits 20_1 to 20_*m*. Selection signals are output from the first to m-th pulse output circuits 20_1 to 20_*m* and supplied to m scan lines GL (scan lines GL1 to GLm).

First to fourth scan line driver circuit clock signals (GCK1 to GCK4), first to sixth pulse width control signals (PWC1 to PWC6), and the scan line driver circuit start pulse signal (GSP) are supplied as driving signals to the scan line driver circuit 11.

Note that FIG. 6 illustrates the case where the first to j-th pulse output circuits 20_1 to 20_*j* (j is a multiple of 4 and less than m/2) are connected to the scan lines GL1 to GLj provided in the region 101, respectively. Further, the (j+1)-th to 2j-th pulse output circuits 20_*j*+1 to 20_2*j* are connected to the scan lines GLj+1 to GL2*j* provided in the region 102, respectively. Further, the (2j+1)-th to m-th pulse output circuits 20_2*j*+1 to 20_m are connected to the scan lines GL2*j*+1 to GLm provided in the region 103, respectively.

The first to m-th pulse output circuits 20_1 to 20_*m* begin to operate in response to the scan line driver circuit start pulse signal (GSP) that is input to the first pulse output circuit 20_1, and output selection signals whose pulses are sequentially shifted.

Circuits having the same configuration can be applied to the first to m-th pulse output circuits 20_1 to 20_*m*. A specific connection relation of the first to m-th pulse output circuits 20_1 to 20_*m* is described with reference to FIG. 7.

Figure 7:
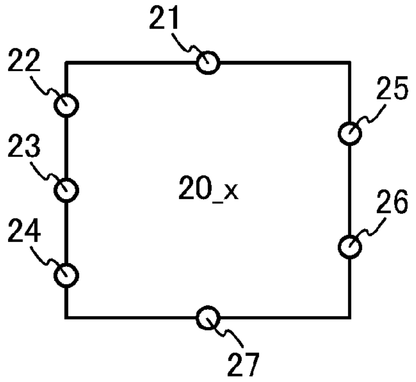
FIG. 7 schematically illustrates an x-th pulse output circuit 20_*x*.

FIG. 7 schematically illustrates the x-th pulse output circuit 20_*x* (x is a natural number less than or equal to m). Each of the first to m-th pulse output circuits 20_1 to 20_*m* has terminals 21 to 27. The terminals 21 to 24 and the terminal 26 are input terminals, and the terminals 25 and 27 are output terminals.

First, the terminal 21 is described. The terminal 21 of the first pulse output circuit 20_1 is connected to a wiring for supplying the scan line driver circuit start pulse signal (GSP). The terminal 21 of each of the second to m-th pulse output circuits 20_2 to 20_*m* is connected to the terminal 27 of each corresponding previous-stage pulse output circuit.

Next, the terminal 22 is described. The terminal 22 of the (4a−3)-th pulse output circuit 20_(4a−3) (a is a natural number less than or equal to m/4) is connected to a wiring for supplying the first scan line driver circuit clock signal (GCK1). The terminal 22 of the (4a−2)-th pulse output circuit 20_(4a−2) is connected to a wiring for supplying the second scan line driver circuit clock signal (GCK2). The terminal 22 of the (4a−1)-th pulse output circuit 20_(4a−1) is connected to a wiring for supplying the third scan line driver circuit clock signal (GCK3). The terminal 22 of the 4a-th pulse output circuit 20_4*a* is connected to a wiring for supplying the fourth scan line driver circuit clock signal (GCK4).

Next, the terminal 23 is described. The terminal 23 of the (4a−3)-th pulse output circuit 20_(4a−3) is connected to the wiring for supplying the second scan line driver circuit clock signal (GCK2). The terminal 23 of the (4a−2)-th pulse output circuit 20_(4a−2) is connected to the wiring for supplying the third scan line driver circuit clock signal (GCK3). The terminal 23 of the (4a−1)-th pulse output circuit 20_(4a−1) is connected to the wiring for supplying the fourth scan line driver circuit clock signal (GCK4). The terminal 23 in the 4a-th pulse output circuit 20_4*a* is connected to the wiring for supplying the first scan line driver circuit clock signal (GCK1).

Next, the terminal 24 is described. The terminal 24 of the (2b−1)-th pulse output circuit 20_(2b−1) (b is a natural number less than or equal to j/2) is connected to a wiring for supplying the first pulse width control signal (PWC1). The terminal 24 of the 2b-th pulse output circuit 20_2*b* is connected to a wiring for supplying the fourth pulse width control signal (PWC4). The terminal 24 of the (2c−1)-th pulse output circuit 20_(2c−1) (c is a natural number greater than or equal to (j/2+1) and less than or equal to j) is connected to a wiring for supplying the second pulse width control signal (PWC2). The terminal 24 of the 2c-th pulse output circuit 20_2*c* is connected to a wiring for supplying the fifth pulse width control signal (PWC5). The terminal 24 of the (2d−1)-th pulse output circuit 20_(2d−1) (d is a natural number greater than or equal to (j+1) and less than or equal to m/2) is connected to a wiring for supplying the third pulse width control signal (PWC3). The terminal 24 of the 2d-th pulse output circuit 20_2*d* is connected to a wiring for supplying the sixth pulse width control signal (PWC6).

Then, the terminal 25 is described. The terminal 25 of the x-th pulse output circuit 20_*x* is connected to the scan line GLx in the x-th row.

Next, the terminal 26 is described. The terminal 26 of the y-th pulse output circuit 20_*y* (y is a natural number less than or equal to (m−1)) is connected to the terminal 27 of the (y+1)-th pulse output circuit 20_(y+1). The terminal 26 of the m-th pulse output circuit 20_*m* is connected to a wiring for supplying a stop signal (STP) for the m-th pulse output circuit. In the case where a (m+1)-th pulse output circuit is provided, the stop signal (STP) for the m-th pulse output circuit corresponds to a signal output from the terminal 27 of the (m+1)-th pulse output circuit 20_(m+1). Specifically, these signals can be supplied to the m-th pulse output circuit 20_*m* by providing the (m+1)-th pulse output circuit 20_(m+1) as a dummy circuit or by directly inputting these signals from the outside.

The connection relation of the terminal 27 in each of the pulse output circuits has been described above. Therefore, the above description is to be referred to.

<Configuration Example 1 of Pulse Output Circuit>

Figure 8A:
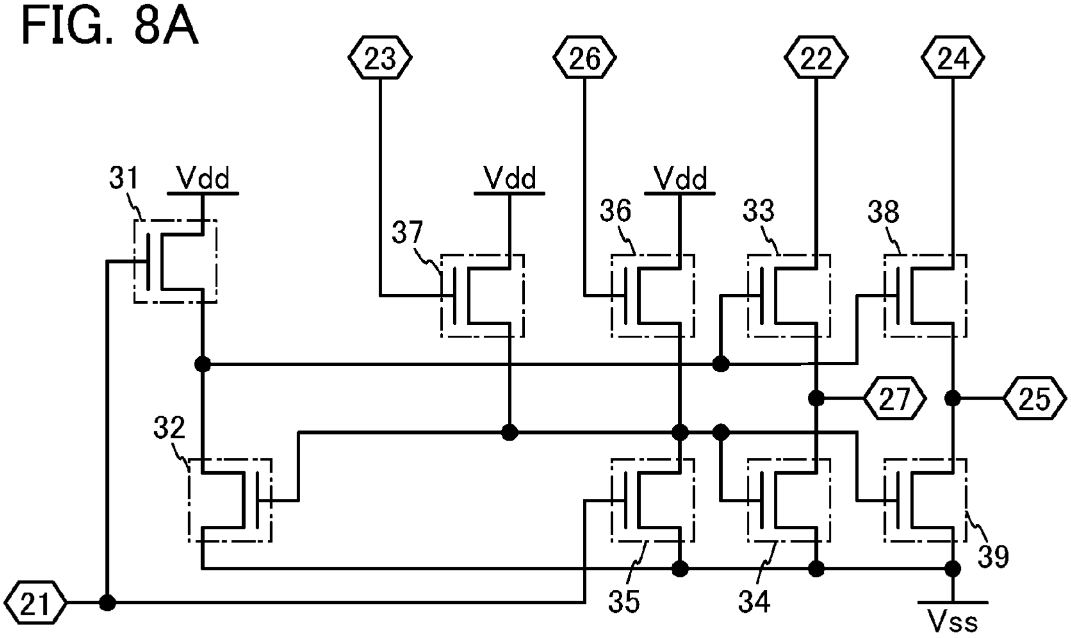
FIGS. 8A to 8C illustrate a configuration of a pulse output circuit and timing charts thereof.

Next, FIG. 8A illustrates an example of a specific configuration of the x-th pulse output circuit 20_*x* illustrated in FIG. 7. The pulse output circuit illustrated in FIG. 8A includes transistors 31 to 39.

A gate electrode of the transistor 31 is connected to the terminal 21. A first terminal of the transistor 31 is connected to a node supplied with a high power supply potential (Vdd). A second terminal of the transistor 31 is connected to a gate electrode of the transistor 33 and a gate electrode of the transistor 38.

A gate electrode of the transistor 32 is connected to a gate electrode of the transistor 34 and a gate electrode of the transistor 39. A first terminal of the transistor 32 is connected to a node supplied with a low power supply potential (Vss). A second terminal of the transistor 32 is connected to the gate electrode of the transistor 33 and the gate electrode of the transistor 38.

A first terminal of the transistor 33 is connected to the terminal 22. A second terminal of the transistor 33 is connected to the terminal 27.

A first terminal of the transistor 34 is connected to the node supplied with the low power supply potential (Vss). A second terminal of the transistor 34 is connected to the terminal 27.

A gate electrode of the transistor 35 is connected to the terminal 21. A first terminal of the transistor 35 is connected to the node supplied with the low power supply potential (Vss). A second terminal of the transistor 35 is connected to the gate electrode of the transistor 34 and the gate electrode of the transistor 39.

A gate electrode of the transistor 36 is connected to the terminal 26. A first terminal of the transistor 36 is connected to the node supplied with the high power supply potential (Vdd). A second terminal of the transistor 36 is connected to the gate electrode of the transistor 34 and the gate electrode of the transistor 39. Note that it is possible to employ a structure in which the first terminal of the transistor 36 is connected to a node supplied with a power supply potential (Vcc) which is higher than the low power supply potential (Vss) and lower than the high power supply potential (Vdd).

A gate electrode of the transistor 37 is connected to the terminal 23. A first terminal of the transistor 37 is connected to the node supplied with the high power supply potential (Vdd). A second terminal of the transistor 37 is connected to the gate electrode of the transistor 34 and the gate electrode of the transistor 39. Note that the first terminal of the transistor 37 may be connected to the node supplied with the power supply potential (Vcc).

A first terminal of the transistor 38 is connected to the terminal 24. A second terminal of the transistor 38 is connected to the terminal 25.

A first terminal of the transistor 39 is connected to the node supplied with the low power supply potential (Vss). A second terminal of the transistor 39 is connected to the terminal 25.

Figure 8B:
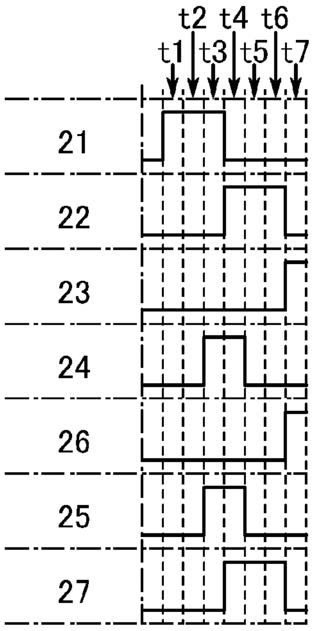

Next, FIG. 8B shows an example of a timing chart of the pulse output circuit illustrated in FIG. 8A. Periods t1 to t7 shown in FIG. 8B have the same period of time, respectively. The length of each of the periods t1 to t7 corresponds to ⅓ of a pulse width of one of the first to fourth scan line driver circuit clock signals (GCK1 to GCK4), and corresponds to ½ of a pulse width of one of the first to sixth pulse width control signals (PWC1 to PWC6).

In the pulse output circuit illustrated in FIG. 8A, a potential input to the terminal 21 is at a high level and potentials input to the terminal 22, the terminal 23, the terminal 24, and the terminal 26 are at a low level in the periods t1 and t2. Consequently, low-level potentials are output from the terminal 25 and the terminal 27.

Next, in the period t3, the potentials input to the terminal 21 and the terminal 24 are at a high level and the potentials input to the terminal 22, the terminal 23, and the terminal 26 are at a low level. Consequently, a high-level potential is output from the terminal 25 and a low-level potential is output from the terminal 27.

Subsequently, in the period t4, the potentials input to the terminal 22 and the terminal 24 are at a high level and the potentials input to the terminal 21, the terminal 23, and the terminal 26 are at a low level. Consequently, high-level potentials are output from the terminal 25 and the terminal 27.

In the periods t5 and t6, the potential input to the terminal 22 is at a high level and the potentials input to the terminal 21, the terminal 23, the terminal 24, and the terminal 26 are at a low level. Consequently, a low-level potential is output from the terminal 25 and a high-level potential is output from the terminal 27.

In the period t7, the potentials input to the terminal 23 and the terminal 26 are at a high level and the potentials input to the terminal 21, the terminal 22, and to the terminal 24 are at a low level. Consequently, low-level potentials are output from the terminal 25 and the terminal 27.

Figure 8C:
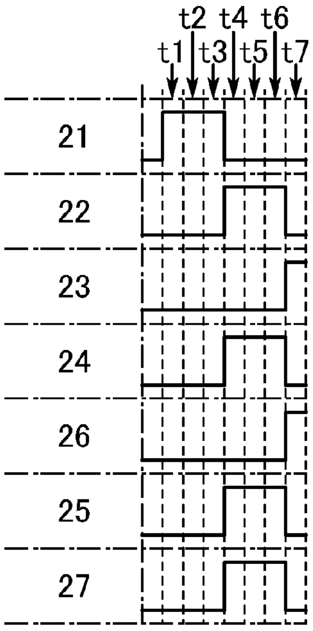

Next, FIG. 8C shows another example of the timing chart of the pulse output circuit illustrated in FIG. 8A. Periods t1 to t7 in FIG. 8C have the same length of time. The length of each of the periods t1 to t7 corresponds to ⅓ of the pulse width of one of the first to fourth scan line driver circuit clock signals (GCK1 to GCK4), and corresponds to ⅓ of the pulse width of one of the first to sixth pulse width control signals (PWC1 to PWC6).

In the output pulse circuit illustrated in FIG. 8A, the potential input to the terminal 21 is at a high level and the potentials input to the terminal 22, the terminal 23, the terminal 24, and the terminal 26 are at a low level in the periods t1 to t3. Consequently, low-level potentials are output from the terminal 25 and the terminal 27.

Then, in the periods t4 to t6, the potentials input to the terminal 22 and the terminal 24 are at a high level, and the potentials input to the terminal 21, the terminal 23, and the terminal 26 are at a low level. Consequently, high level potentials are output from the terminal 25 and the terminal 27.

<Operation Example of Scan Line Driver Circuit in Full-Color Image Display Period 301>

Next, the operation of the scan line driver circuit 11 in the full-color image display period 301 shown in FIG. 3 will be described, for example, using the scan line driver circuit 11 described with reference to FIG. 6, FIG. 7, and FIG. 8A.

Figure 9:
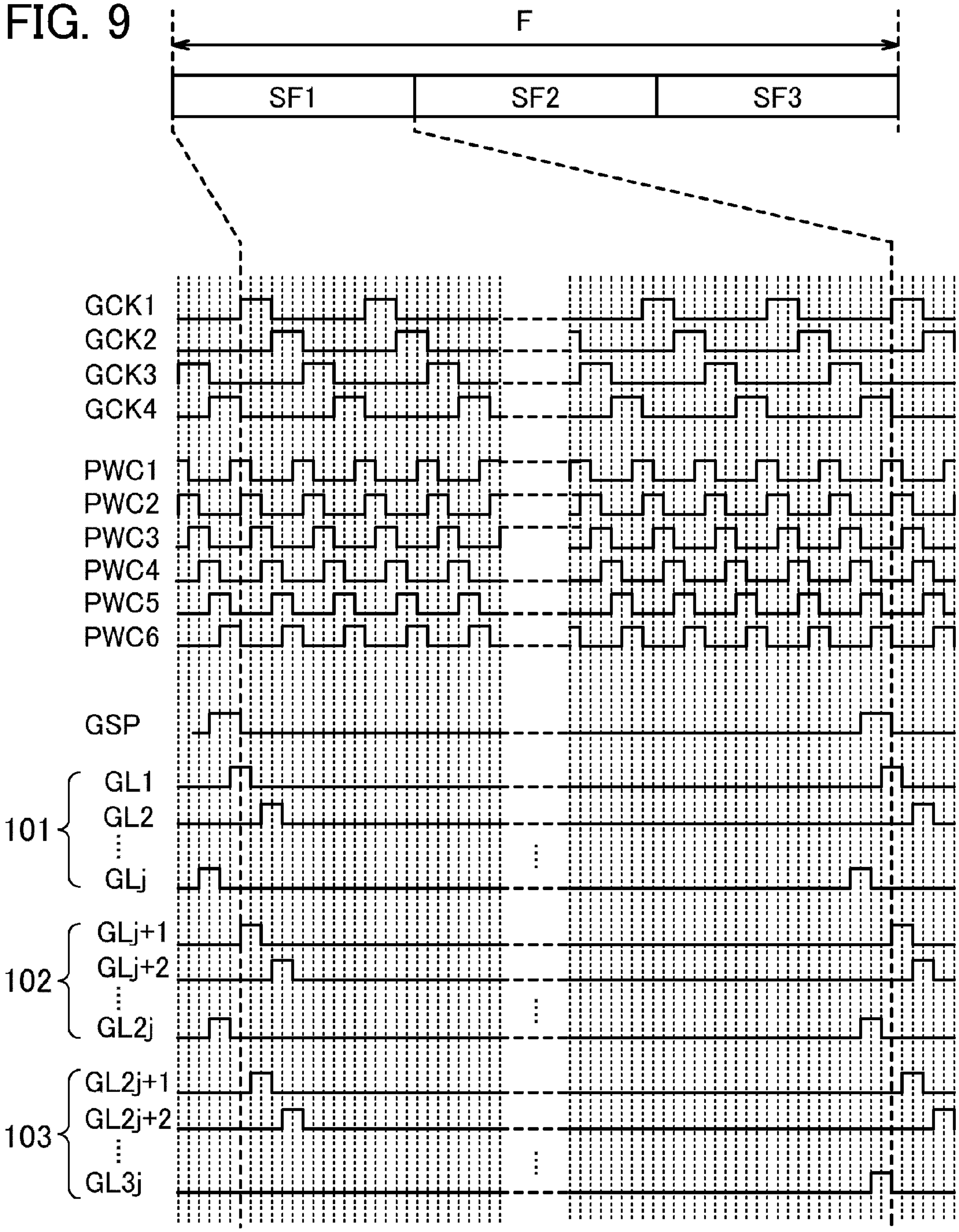
FIG. 9 illustrates a timing chart of a scan line driver circuit.

FIG. 9 shows an example of a timing chart of the scan line driver circuit 11 in the full-color image display period 301. A subframe period SF1, a subframe period SF2, and a subframe period SF3 are provided in one frame period in FIG. 9. In FIG. 9, a timing chart of the subframe period SF1 is used as a typical example. Note that FIG. 9 shows the case of m=3j.

In FIG. 9, the scan lines GL1 to GLj are connected to the pixels of the region 101, the scan lines GLj+1 to GL2*j* are connected to the pixels of the region 102, the scan lines GL2*j*+1 to GL3*j* are connected to the pixels of the region 103.

The first scan line driver circuit clock signal (GCK1) periodically repeats a high-level potential (the high power supply potential (Vdd)) and a low-level potential (the low power supply potential (Vss)), and has a duty ratio of ¼. Further, the second scan line driver circuit clock signal (GCK2) is a signal whose phase lags behind that of the first scan line driver circuit clock signal (GCK1) by ¼ of its cycle, the third scan line driver circuit clock signal (GCK3) is a signal whose phase lags behind that of the first scan line driver circuit clock signal (GCK1) by ½ of its cycle, and the fourth scan line driver circuit clock signal (GCK4) is a signal whose phase lags behind that of the first scan line driver circuit clock signal (GCK1) by ¾ of its cycle.

The first pulse width control signal (PWC1) periodically repeats a high-level potential (the high power supply potential (Vdd)) and a low-level potential (the low power supply potential (Vss)), and has a duty ratio of 1/3. The second pulse width control signal (PWC2) is a signal whose phase lags behind the first pulse width control signal (PWC1) by ⅙ of its cycle, the third pulse width control signal (PWC3) is a signal whose phase lags behind the first pulse width control signal (PWC1) by ⅓ of its cycle, the fourth pulse width control signal (PWC4) is a signal whose phase lags behind the first pulse width control signal (PWC1) by ½ of its cycle, the fifth pulse width control signal (PWC5) is a signal whose phase lags behind the first pulse width control signal (PWC1) by ⅔ of its cycle, and the sixth pulse width control signal (PWC6) is a signal whose phase lags behind the first pulse width control signal (PWC1) by ⅚ of its cycle.

In FIG. 9, the ratio of the pulse width of each of the first to fourth scan line driver circuit clock signals (GCK1 to GCK4) to the pulse width of each of the first to sixth pulse width control signals (PWC1 to PWC6) is 3:2.

Each of the subframe periods SF starts in response to falling of the potential of the pulse of the scan line driver circuit start pulse signal (GSP). The pulse width of the scan line driver circuit start pulse signal (GSP) is substantially the same as the pulse width of each of the first to fourth scan line driver circuit clock signals (GCK1 to GCK4). The falling of the potential of the pulse of the scan line driver circuit start pulse signal (GSP) is synchronized with rising of the potential of the pulse of the first scan line driver circuit clock signal (GCK1). The falling of the potential of the pulse of the scan line driver circuit start pulse signal (GSP) lags behind rising of the potential of the pulse of the first pulse width control signal (PWC1) by ⅙ of a cycle of the first pulse width control signal (PWC1).

The pulse output circuit illustrated in FIG. 8A is operated by the above signals in accordance with the timing chart in FIG. 8B. Accordingly, as illustrated in FIG. 9, the selection signals whose pulses are sequentially shifted are supplied to the scan lines GL1 to GLj provided for the region 101. Further, the phases of the pulses of the selection signals supplied to the scan lines GL1 to GLj are each shifted by a period corresponding to 3/2 of the pulse width. Note that the pulse width of each of the selection signals supplied to the scan lines GL1 to GLj is substantially the same as the pulse width of each of the first to sixth pulse width control signals (PWC1 to PWC6).

As in the case of the region 101, selection signals whose pulses are sequentially shifted are supplied to the scan lines GLj+1 to GL2*j* provided for the region 102. Further, the phases of the pulses of the selection signals supplied to the scan lines GLj+1 to GL2*j* are each shifted by a period corresponding to 3/2 of the pulse width. Note that the pulse width of each of the selection signals supplied to the scan lines GLj+1 to GL2*j* is substantially the same as the pulse width of each of the first to sixth pulse width control signals (PWC1 to PWC6).

As in the case of the region 101, selection signals whose pulses are sequentially shifted are supplied to the scan lines GL2*j*+1 to GL3*j* provided for the region 103. Further, the phases of the pulses of the selection signals supplied to the scan lines GL2*j*+1 to GL3*j* are each shifted by 3/2 of the pulse width. Note that the pulse width of each of the selection signal supplied to the scan lines GL2*j*+1 to GL3*j* is substantially the same as the pulse width of each of the first to sixth pulse width control signals (PWC1 to PWC6).

The phases of the pulses of the selection signals supplied to the scan lines GL1, GLj+1, and GL2*j*+1 are sequentially shifted by a period corresponding to ½ of the pulse width.

<Operation Example of Scan Line Driver Circuit in Monochrome Still Image Display Period 303>

Next, the operation of the scan line driver circuit 11 in the monochrome still image display period 303 shown in FIG. 3 will be described, for example, using the scan line driver circuit 11 described with reference to FIG. 6, FIG. 7, and FIG. 8A.

Figure 10:
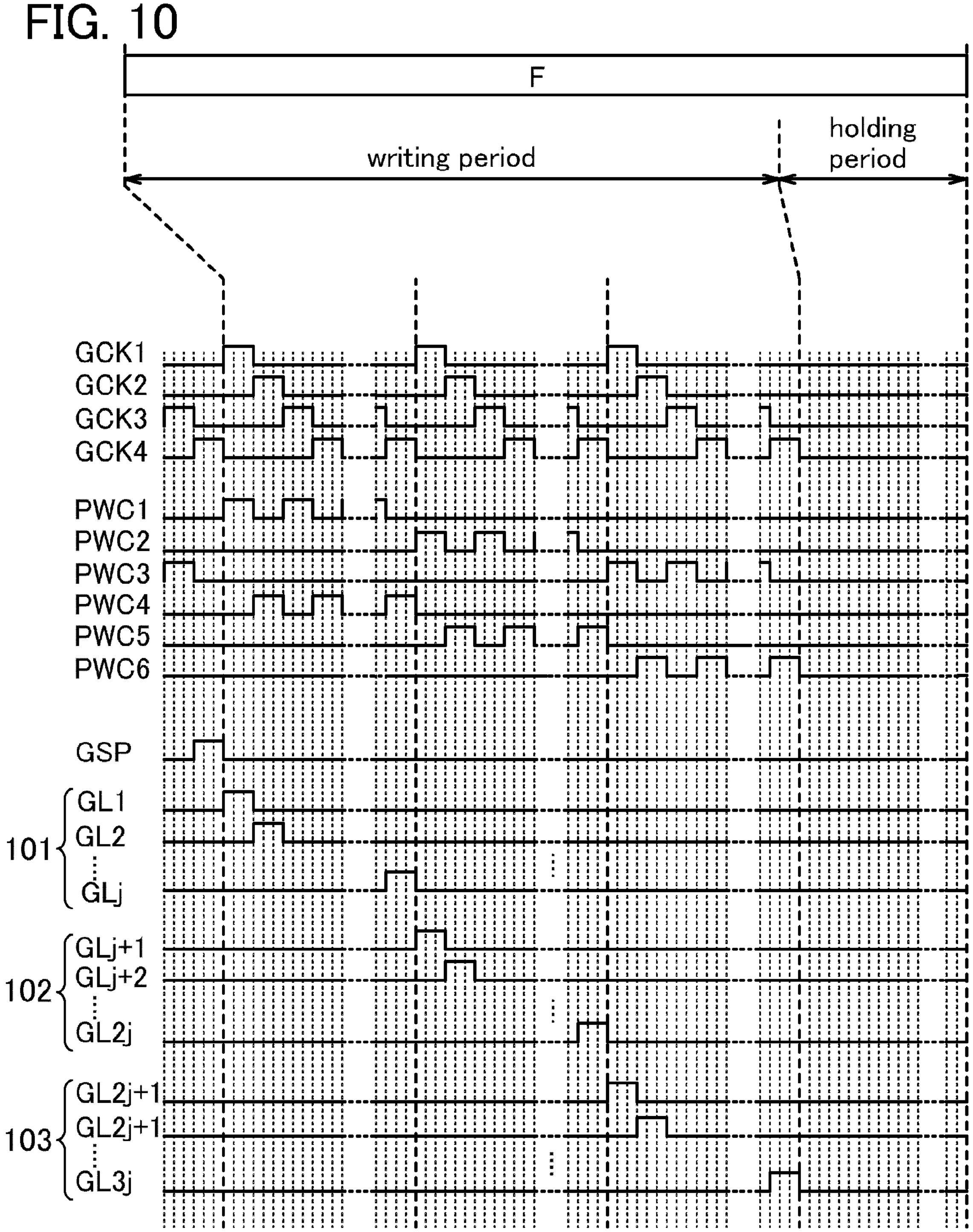
FIG. 10 illustrates a timing chart of a scan line driver circuit.

FIG. 10 shows an example of a timing chart of the scan line driver circuit 11 in the monochrome still image display period 303. In FIG. 10, a writing period in which writing of an image signal to a pixel is performed and a holding period in which the image signal is held are provided in one frame period.

The first to fourth scan line driver circuit clock signals (GCK1 to GCK4) are the same signals as those in the case of FIG. 9.

The first pulse width control signal (PWC1) and the fourth pulse width control signal (PWC4) periodically repeat a high-level potential (the high power supply potential (Vdd)) and a low-level potential (the low power supply potential (Vss)) and have a duty ratio of 1/2 in the first ⅓ period in the writing period. Further, in the other periods, the first pulse width control signal (PWC1) and the fourth pulse width control signal (PWC4) have the low-level potentials. The fourth pulse width control signal (PWC4) is a signal whose phase lags behind that of the first pulse width control signal (PWC1) by ½ of its cycle.

The second pulse width control signal (PWC2) and the fifth pulse width control signal (PWC5) periodically repeat a high-level potential (the high power supply potential (Vdd)) and a low-level potential (the low power supply potential (Vss)) and have a duty ratio of 1/2 in the middle ⅓ period in the writing period. In the other periods, the second pulse width control signal (PWC2) and the fifth pulse width control signal (PWC5) have the low-level potentials. The fifth pulse width control signal (PWC5) is a signal whose phase lags behind the second pulse width control signal (PWC2) by ½ of its cycle.

The third pulse width control signal (PWC3) and the sixth pulse width control signal (PWC6) periodically repeat a high-level potential (the high power supply potential (Vdd)) and a low-level potential (the low power supply potential (Vss)) and have a duty ratio of 1/2 in the last ⅓ period in the writing period. In the other periods, the third pulse width control signal (PWC3) and the sixth pulse width control signal (PWC6) have the low-level potentials. The sixth pulse width control signal (PWC6) is a signal whose phase lags behind the third pulse width control signal (PWC3) by ½ of its cycle.

In FIG. 10, the ratio of the pulse width of each of the first to fourth scan line driver circuit clock signals (GCK1 to GCK4) to the pulse width of each of the first to sixth pulse width control signals (PWC1 to PWC6) is 1:1.

A frame period F starts in response to falling of the potential of the pulse of the scan line driver circuit start pulse signal (GSP). The pulse width of the scan line driver circuit start pulse signal (GSP) is substantially the same as the pulse width of each of the first to fourth scan line driver circuit clock signals (GCK1 to GCK4). The falling of the potential of the pulse of the scan line driver circuit start pulse signal (GSP) is synchronized with rising of the potential of the pulse of the first scan line driver circuit clock signal (GCK1). In addition, the falling of the potential of the pulse of the scan line driver circuit start pulse signal (GSP) is synchronized with rising of the potential of a pulse of the first pulse width control signal (PWC1).

The pulse output circuit illustrated in FIG. 8A is operated by the above signals in accordance with the timing chart in FIG. 8C. Accordingly, as illustrated in FIG. 10, the selection signals whose pulses are sequentially shifted are supplied to the scan lines GL1 to GLj provided for the region 101. Further, the phases of the pulses of the selection signals supplied to the scan lines GL1 to GLj are each shifted by a period corresponding to the pulse width. Note that the pulse width of each of the selection signals supplied to the scan lines GL1 to GLj is substantially the same as the pulse width of each of the first to sixth pulse width control signals (PWC1 to PWC6).

After the selection signals whose pulses are sequentially shifted are supplied to all of the scan lines GL1 to GLj provided for the region 101, the selection signals whose pulses are sequentially shifted are also supplied to the scan lines GLj+1 to GL2*j* provided for the region 102. The phases of the pulses of the selection signals supplied to the scan lines GLj+1 to GL2*j* are each shifted by a period corresponding to the pulse width. Note that the pulse width of each of the selection signals supplied to the scan lines GLj+1 to GL2*j* is substantially the same as the pulse width of each of the first to sixth pulse width control signals (PWC1 to PWC6).

After the selection signals whose pulses are sequentially shifted are supplied to all of the scan lines GLj+1 to GL2*j* provided for the region 102, the selection signals whose pulses are sequentially shifted are also supplied to the scan lines GL2*j*+1 to GL3*j* provided for the region 103. Further, the phases of the pulses of the selection signals supplied to the scan lines GL2*j*+1 to GL3*j* are each shifted by a period corresponding to the pulse width. Note that the pulse width of each of the selection signals supplied to the scan lines GL2*j*+1 to GL3*j* is substantially the same as the pulse width of each of the first to sixth pulse width control signals (PWC1 to PWC6).

Next, in the holding period, supply of the driving signals and the power supply potential to the scan line driver circuit 11 is stopped. Specifically, first, supply of the scan line driver circuit start pulse signal (GSP) is stopped, whereby output of the selection signal from the pulse output circuit is stopped in the scan line driver circuit 11, and selection by the pulse in all of the scan lines is terminated. After that, supply of the power supply potential Vdd to the scan line driver circuit 11 is stopped. Note that to stop input or to stop supply means, for example, to make a wiring to which a signal or a potential is input in a floating state, or to apply a low-level potential to a wiring to which a signal or a potential is input. By the above method, malfunction of the scan line driver circuit 11 in stopping the operation can be prevented. In addition to the above structure, supply of the first to fourth scan line driver circuit clock signals (GCK1 to GCK4) and the first to sixth pulse width control signals (PWC1 to PWC6) to the scan line driver circuit 11 may be stopped.

By stopping the supply of the driving signals and the power supply potential to the scan line driver circuit 11, low-level potentials are supplied to all of the scan lines GL1 to GLj, the scan lines GLj+1 to GL2*j*, and the scan lines GL2*j*+1 to GL3*j*.

Note that in the monochrome moving image display period 302, the operation of the scan line driver circuit 11 in the writing period is the same as that in the monochrome still image display period 303.

In an embodiment of the present invention, a transistor whose off-state current is extremely low is used in a pixel, whereby a period in which a voltage applied to the liquid crystal element is held can be prolonged. Therefore, a long period as the holding period shown in FIG. 10 can be ensured, and the driving frequency of the scan line driver circuit 11 can be low as compared to the case of the operation shown in FIG. 9. Accordingly, it is possible to obtain the liquid crystal display device whose power consumption can be low.

<Configuration Example of Signal Line Driver Circuit 12>

Figure 11:
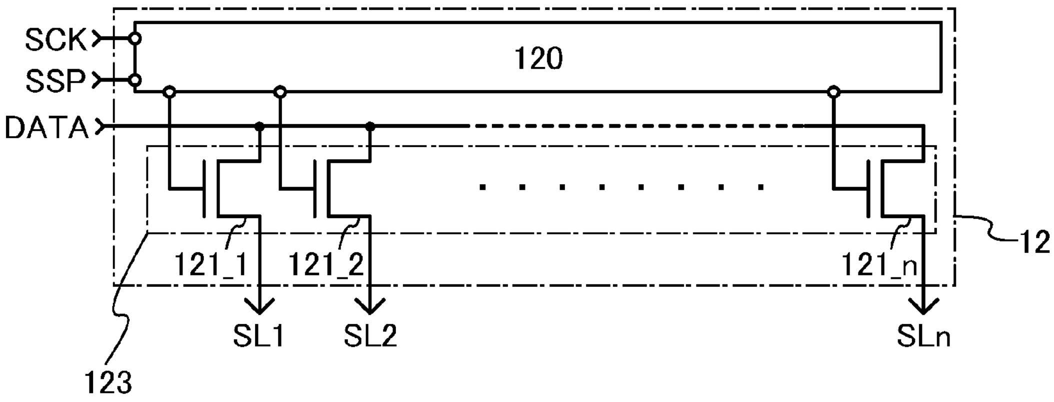
FIG. 11 illustrates a configuration of a signal line driver circuit.

FIG. 11 illustrates a configuration example of the signal line driver circuit 12 included in the liquid crystal display device shown in FIG. 2A. The signal line driver circuit 12 shown in FIG. 11 includes a shift register 120 having first to n-th output terminals and a switching element group 123 which controls supply of image signals (DATA) to the signal lines SL1 to SLn.

Specifically, the switching element group 123 includes transistors 121_1 to 121_*n*. First terminals of the transistors 121_1 to 121_*n* are connected to a wiring for supplying the image signal (DATA). Second terminals of the transistors 121_1 to 121_*n* are connected to the signal lines SL1 to SLn, respectively. Gate electrodes of the transistors 121_1 to 121_*n* are connected to the first to n-th output terminals of the shift register 120, respectively.

The shift register 120 operates in accordance with a driving signal such as a signal line driver circuit start pulse signal (SSP) and a signal line driver circuit clock signal (SCK), and outputs signals whose pulses are sequentially shifted from the first to n-th output terminals. The signals are input to the gate electrodes of the transistors to turn on the transistors 121_1 to 121_*n* sequentially.

Figure 12A:
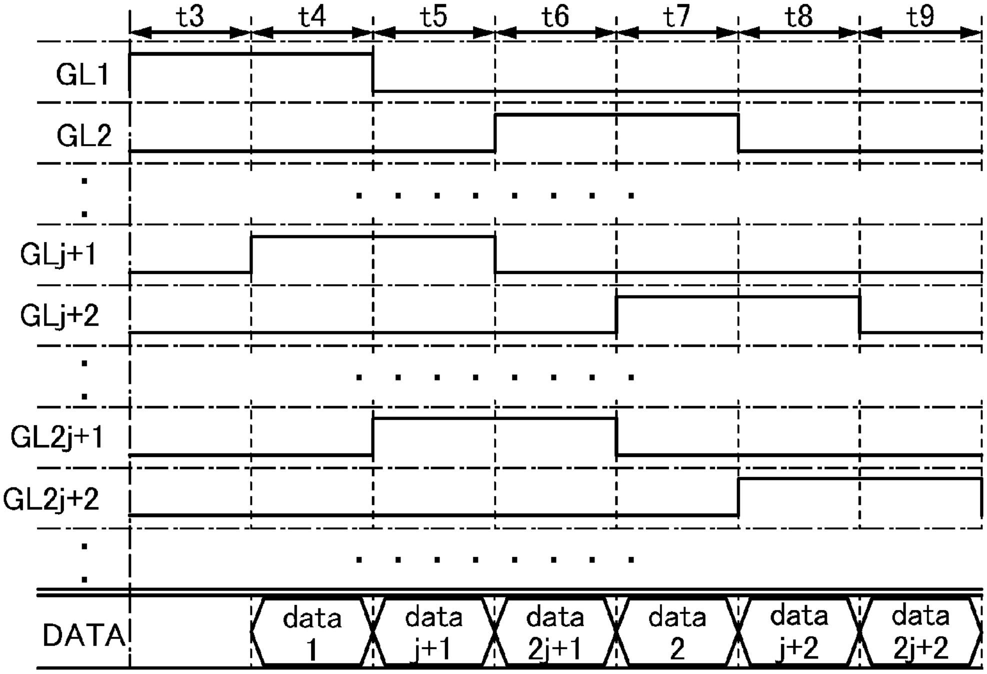
FIGS. 12A and 12B show examples of timing of image signals (DATA) supplied to signal lines.

FIG. 12A shows an example of the timing of image signals (DATA) supplied to the signal lines in the full-color image display period 301. As shown in FIG. 12A, in a period in which pulses of selections signals input to two scan lines overlap with each other, an image signal (DATA) to the scan line whose pulse appears first is sampled and input to the signal lines in the signal line driver circuit 12 illustrated in FIG. 11. Specifically, the pulse of the selection signal input to the scan line GL1 and the pulse of the selection signal input to the scan line GLj+1 overlap with each other in a period t4 corresponding to ½ of the pulse width. Note that the pulse of the scan line GL1 appears before the pulse of the scan line GLj+1. In the period in which the pulses overlap with each other, an image signal (data1) to the scan line GL1 among the image signals (DATA) is sampled and input to the signal lines SL1 to the SLn.

In a similar manner, in a period t5, an image signal (dataj+1) to the scan line GLj+1 is sampled and input to the signal lines SL1 to SLn. In a period t6, an image signal (data2*j*+1) to the scan line GL2*j*+1 is sampled and input to the signal lines SL1 to SLn. In a period t7, an image signal (data2) to the scan line GL2 is sampled and input to the signal lines SL1 to SLn. Also in each of periods subsequent to the period t7, the same operation is repeated and image signals (DATA) are written to the pixel portion.

In other words, input of the image signal to the signal lines SL1 to SLn is performed in the following order: pixels connected to the scan line GLs (s is a natural number less than j); pixels connected to the scan line GL2*j*+s; and pixels connected to the scan line GLs+1.

Figure 12B:
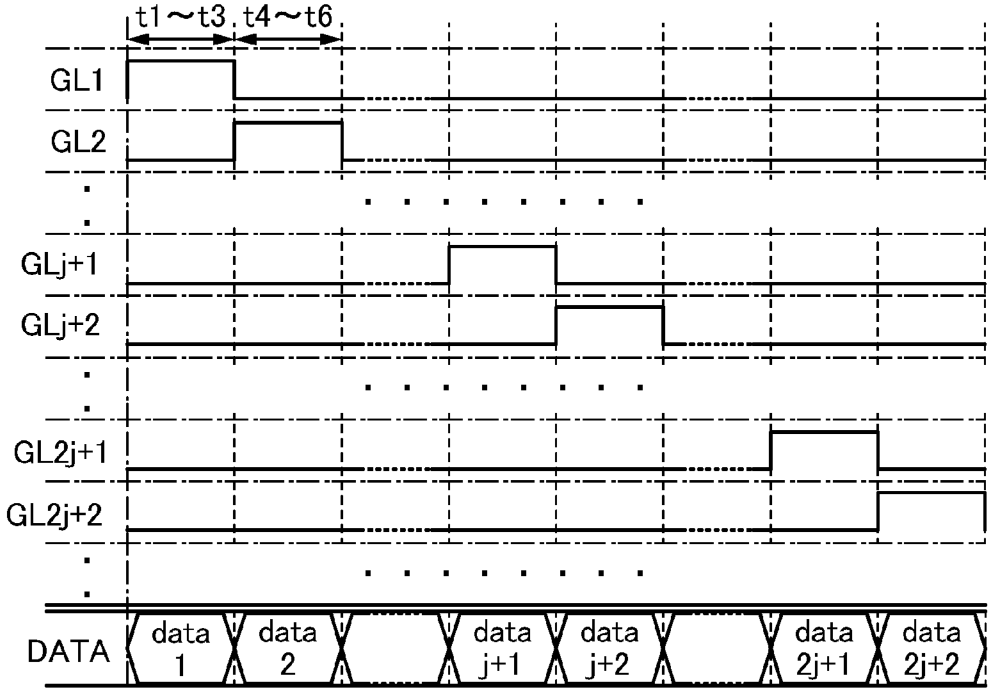

FIG. 12B shows an example of the timing of the image signals (DATA) supplied to the signal lines in the writing period provided in the monochrome moving image display period 302 and the monochrome still image display period 303. As shown in FIG. 12B, in a period in which a pulse of a selection signal input to the scan line appears, the image signal (DATA) to the scan line is sampled and input to the signal lines in the signal line driver circuit 12 illustrated in FIG. 11. Specifically, in a period in which the pulse of the selection signal input to the scan line GL1 appears, the image signal (data1) included in the image signals (DATA) to the scan line GL1, is sampled and input to the signal lines SL1 to SLn.

The same operation is repeated in all of the scan lines subsequent to the scan line GL1, whereby image signals (DATA) are written in the pixel portion.

In the holding period in the monochrome still image display period 303, supply of the signal line driver circuit start pulse signal (SSP) to the shift register 120 and supply of the image signals (DATA) to the signal line driver circuit 12 are stopped. Specifically, for example, first, the supply of the signal line driver circuit start pulse signal (SSP) is stopped to stop sampling of an image signal in the signal line driver circuit 12. Then, the supply of the image signals and the supply of the power supply potential to the signal line driver circuit 12 are stopped. According to the method, malfunction of the signal line driver circuit 12 in stopping operation of the signal line driver circuit 12 can be prevented. In addition, supply of the signal line driver circuit clock signal (SCK) to the signal line driver circuit 12 may be stopped.

<Operation Example of Liquid Crystal Display Device>

Figure 13:
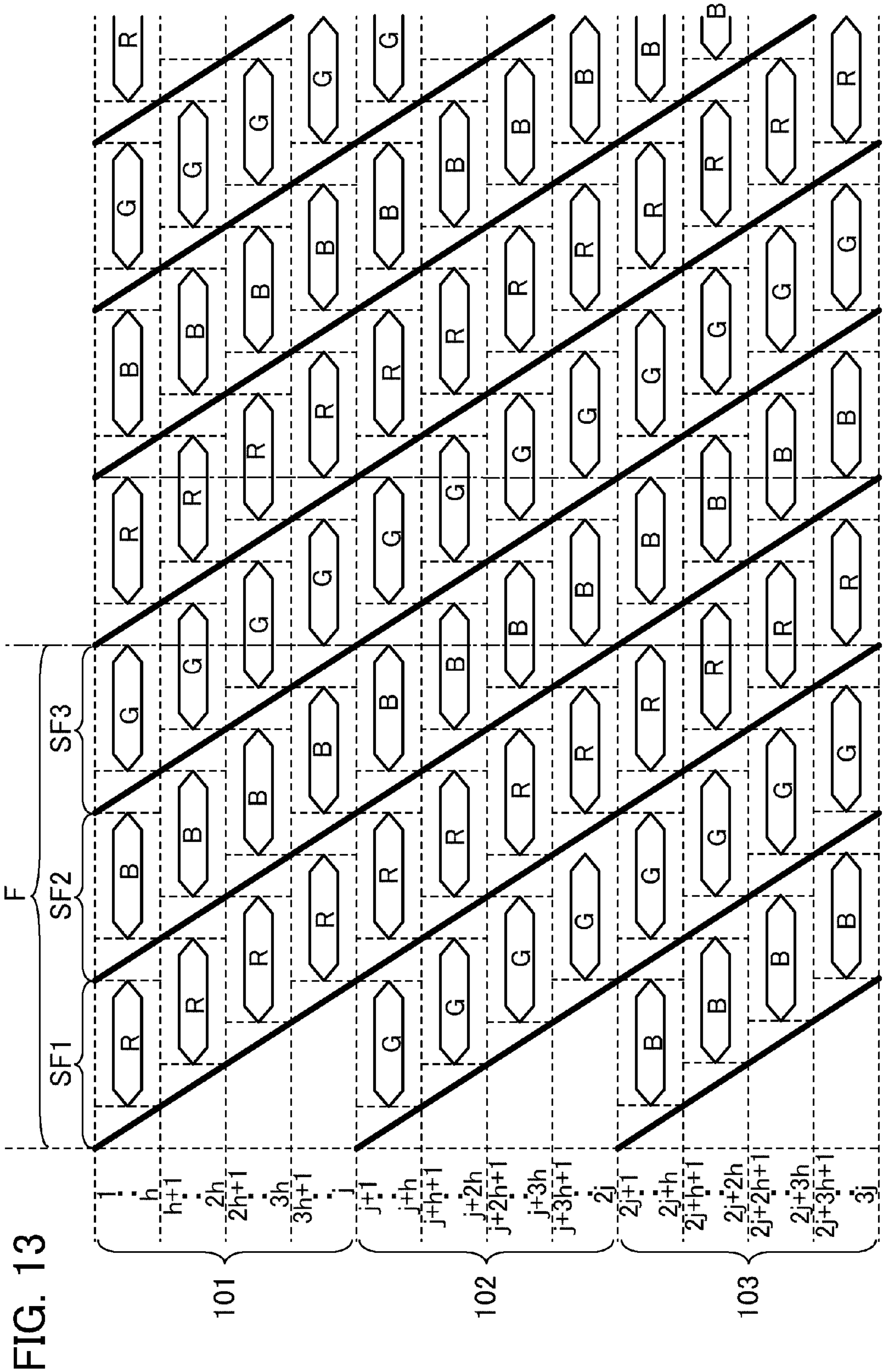
FIG. 13 shows timing of scanning of selection signals and timing of lighting of a backlight.

FIG. 13 shows the timing of scanning of the selection signals and the timing of lighting of the backlights in the full-color image display period 301 in the above-described liquid crystal display device. Note that in FIG. 13, the vertical axis represents the rows in the pixel portion, and the horizontal axis represents time.

As shown in FIG. 13, in the liquid crystal display device described in this embodiment, a driving method in which a selection signal is supplied to the scan line GL1 and then a selection signal is supplied to the scan line GLj+1, which is the j-th rows from the scan line GL1, can be used in the full-color image display period 301. Therefore, the image signals can be supplied to the pixels in one subframe period SF in such a manner that n pixels connected to the scan line GL1 to n pixels connected to the scan line GLj are sequentially selected, n pixels connected to the scan line GLj+1 to n pixels connected to the scan line GL2*j* are sequentially selected, and n pixels connected to the scan line GL2*j*+1 to n pixels connected to the scan line GL3*j* are sequentially selected.

Specifically, in a first subframe period SF1 in FIG. 13, image signals for red (R) are written in the pixels connected to the scan lines GL1 to GLj, and then a light of red (R) is supplied to the pixels connected to the scan lines GL1 to GLj. With the above structure, an image corresponding to red (R) can be displayed on the region 101 of the pixel portion, which is provided with the scan lines GL1 to GLj.

Further, in the first subframe period SF1, image signals for green (G) are written in the pixels connected to the scan lines GLj+1 to GL2*j*, and then a light of green (G) is supplied to the pixels connected to the scan lines GLj+1 to GL2*j*. With the above structure, an image corresponding to green (G) can be displayed on the region 102 of the pixel portion, which is provided with the scan lines GLj+1 to GL2*j*.

Further, in the first subframe period SF1, image signals for blue (B) are written in the pixels connected to the scan lines GL2*j*+1 to GL3*j*, and then a light of blue (B) is supplied to the pixels connected to the scan lines GL2*j*+1 to GL3*j*. With the above structure, an image for blue (B) can be displayed on the region 103 of the pixel portion, which is provided with the scan lines GL2*j*+1 to GL3*j*.

The same operation as in the first subframe period SF1 is repeated in a second subframe period SF2 and a third subframe period SF3. Note that in the second subframe period SF2, an image corresponding to blue (B) is displayed on the region 101 of the pixel portion, which is provided with the scan lines GL1 to GLj; an image corresponding to red (R) is displayed on the region 102 of the pixel portion, which is provided with the scan lines GLj+1 to GL2*j*; and an image corresponding to green (G) is displayed on the region 103 of the pixel portion, which is provided with the scan lines GL2*j*+1 to GL3*j*. In the third subframe period SF3, an image corresponding to green (G) is displayed on the region 101 of the pixel portion, which is provided with the scan lines GL1 to GLj; an image corresponding to blue (B) is displayed on the region 102 of the pixel portion, which is provided with the scan lines GLj+1 to GL2*j*; and an image corresponding to red (R) is displayed on the region 103 of the pixel portion, which is provided with the scan lines GL2*j*+1 to GL3*j*.

The first to third subframe periods SF1 to SF3 in all of the scan lines GL are terminated, that is, one frame period is completed, whereby a full-color image can be displayed on the pixel portion.

Note that in an embodiment of the present invention, each of the regions may be further divided into regions. In the divided regions, lighting of the backlight may start sequentially upon the termination of writing of an image signal. For example, the following may be employed: in the region 101, image signals for red (R) are written in the pixels connected to the scan lines GL1 to GLh (h is a natural number less than or equal to j/4); and then, a light of red (R) is supplied to the pixels connected to the scan lines GL1 to GLh while image signals for red (R) are written in the pixels connected to the scan lines GLh+1 to GL2*h*.

Figure 14:
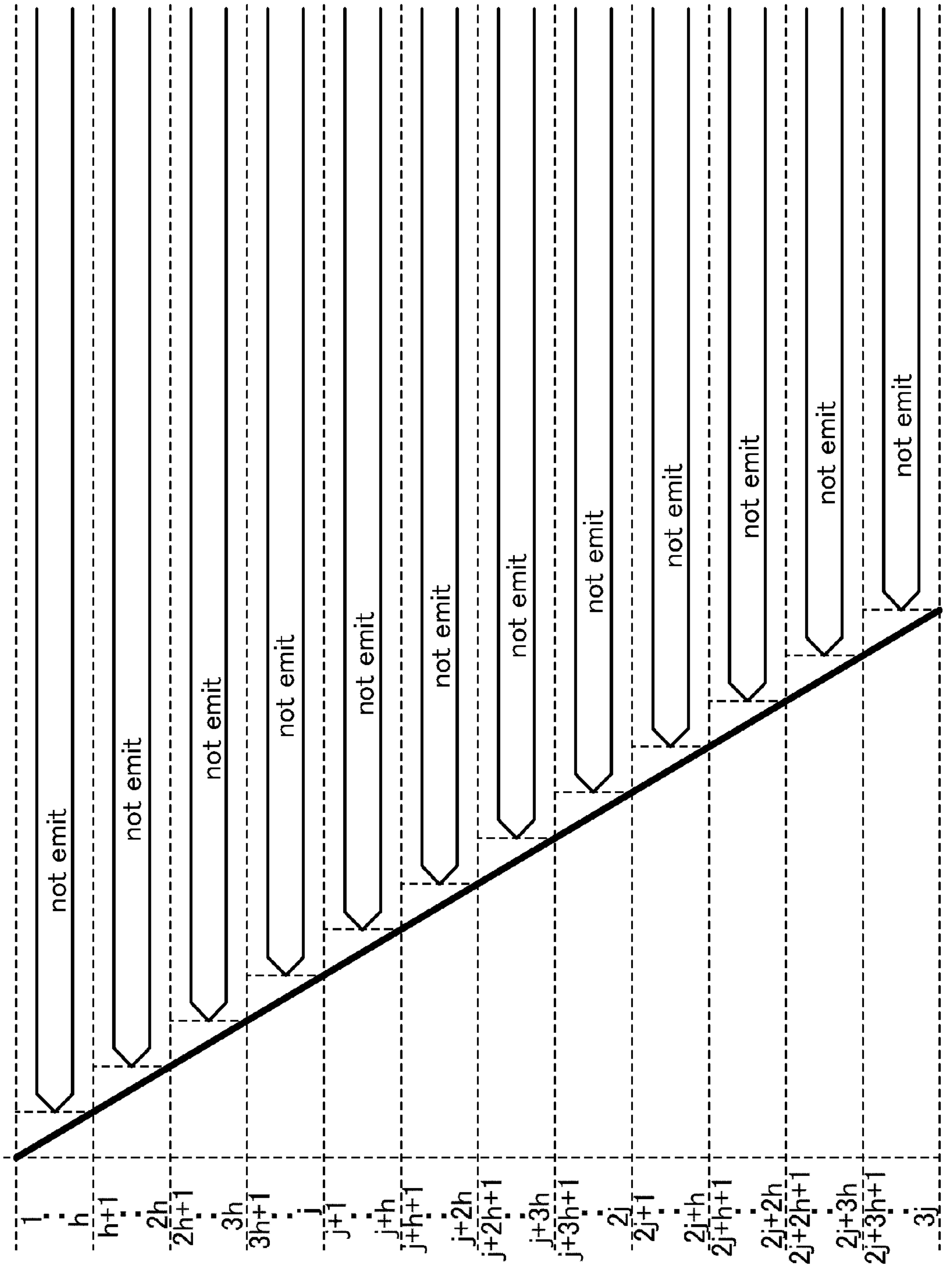
FIG. 14 shows timing of scanning of selection signals and timing of turning off of the backlight.

FIG. 14 shows the timing of scanning of the selection signals and the timing of lighting of the backlights in the monochrome still image display period 303 in the above-described liquid crystal display device. Note that in FIG. 14, the vertical axis represents rows in the pixel portion, and the horizontal axis represents time.

As shown in FIG. 14, the selection signals are sequentially supplied to the scan lines GL1 to GL3*j* in the monochrome still image display period 303 in the liquid crystal display device described in this embodiment.

Specifically, in FIG. 14, for example, image signals are written in the pixels connected to the scan lines GL1 to GLh in the region 101, and then the backlight is not turned on and remains off. Then, the same operation is performed in pixels connected to all of the other scan lines, whereby a monochrome image can be displayed on the pixel portion. After that, supply of the driving signals to the driver circuits is stopped, so that the driver circuits are in a non-operation state.

Note that in the case of the monochrome moving image display period 302, after the above operation is performed in the pixels connected to all of the scan lines, the driver circuits are not in a non-operation state and the same operation may be repeated again, so that a monochrome image is displayed on the pixel portion continually.

Although the structure in which light sources corresponding to three colors of red (R), green (G), and blue (B) are used as the backlight is employed for the liquid crystal display device according to an embodiment of the present invention, the structure of an liquid crystal display device of an embodiment of the present invention is not limited to this structure. In other words, light sources exhibiting a variety of colors may be used in combination in the backlight of a liquid crystal display of an embodiment of the present invention. For example, it is possible to use a combination of four colors of red (R), green (G), blue (B), and white (W); a combination of four colors of red (R), green (G), blue (B), and yellow (Y); or a combination of three colors of cyan (C), magenta (M), and yellow (Y).

In addition, a light source emitting a light of white (W) may further be provided in the backlight instead of forming a light of white (W) by mixing colors. The light source emitting a light of white (W) has high emission efficiency; therefore, with the use of the backlight formed using the light source, power consumption can be reduced. In the case where light sources that emit lights of two complementary colors (for example, in the case of lights of two colors of blue (B) and yellow (Y)), the lights of the two colors can be mixed, whereby a light exhibiting white (W) can be formed. Alternatively, light sources that emit lights of six colors of pale red (R), pale green (G), pale blue (B), deep red (R), deep green (G), and deep blue (B) can be used in combination or light sources that emit lights of six colors of red (R), green (G), blue (B), cyan (C), magenta (M), and yellow (Y) can be used in combination.

Note that, for example, colors that can be expressed using the light sources of red (R), green (G), and blue (B) are limited to colors existing in the triangle made by the three points on the chromaticity diagram which correspond to the emission colors of the respective light sources. Therefore, by further adding a light source of a color which exists outside the triangle on the chromaticity diagram, the range of the colors which can be expressed in the liquid crystal display device can be expanded, so that color reproducibility can be enhanced.

For example, a light source emitting any of the following colors can be used in the backlight in addition to the light sources of red (R), green (G), and blue (B): deep blue (DB) expressed by a point positioned substantially outside the triangle in a direction from the center of the chromaticity diagram toward the point on the chromaticity diagram corresponding to the blue light source B; or deep red (DR) represented by a point positioned substantially outside the triangle in a direction from the center of the chromaticity diagram toward the point on the chromaticity diagram corresponding to the red light source R.

As a light source of the backlight, a plurality of light-emitting diodes (LEDs) are preferably used, with which power consumption can be reduced as compared to a cold cathode fluorescent lamp and the intensity of light is adjustable. The intensity of light is partially adjusted by using LEDs in the backlight, so that image display with high contrast and high color visibility can be performed.

In addition, before and/or after the period in which one image is formed in the pixel portion, it is possible to provide a period (non-lighting period) in which the scanning of the selection signal and the lighting of the backlight unit are not performed.

In addition, by providing a plurality of frame periods which differ from each other in the order of lighting of colors of the backlight, generation of a color break-up can be further prevented.

<Configuration Example 2 of Pulse Output Circuit>

Figure 19A:
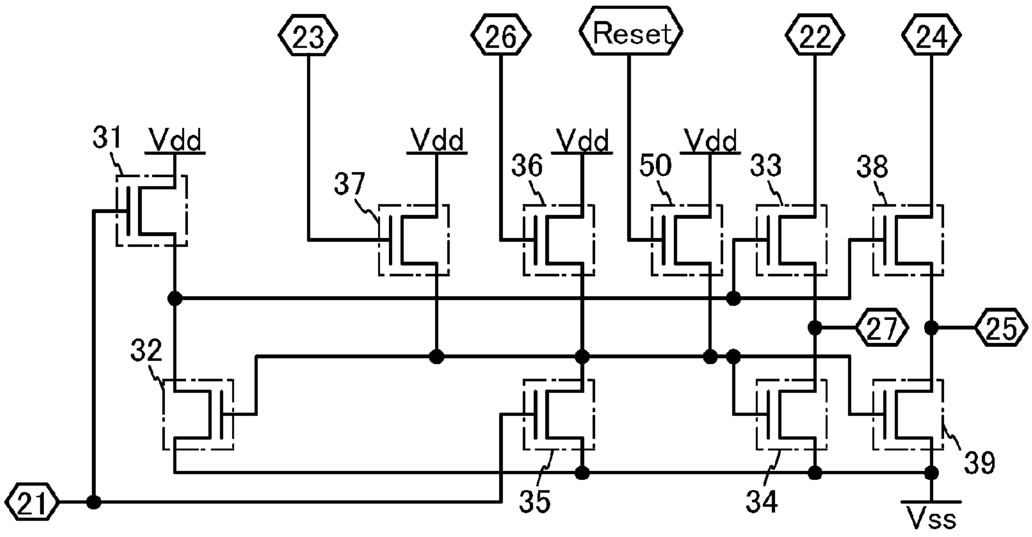
FIGS. 19A and 19B illustrate configurations of pulse output circuits.

FIG. 19A illustrates another example of the configuration of the pulse output circuit. The pulse output circuit illustrated in FIG. 19A includes a transistor 50 in addition to the configuration of the pulse output circuit illustrated in FIG. 8A. A first terminal of the transistor 50 is connected to the node supplied with the high power supply potential. A second terminal of the transistor 50 is connected to the gate electrode of the transistor 32, the gate electrode of the transistor 34, and the gate electrode of the transistor 39. A gate electrode of the transistor 50 is connected to a reset terminal (Reset).

A high-level potential is input to the reset terminal in a period which follows the round of switching of hues of the backlight in the pixel portion; a low-level potential is input in the other periods. Note that the transistor 50 is turned on by input of a high-level potential. Thus, the potential of each node can be initialized in the period after the backlight is turned on, so that malfunction can be prevented.

Note that in the case where the initialization is performed, it is necessary to provide an initialization period between periods in each of which an image is formed in the pixel portion. In addition, in the case where the backlight is turned off after one image is formed in the pixel portion, the initialization can be performed in the period in which the backlight is off.

Figure 19B:
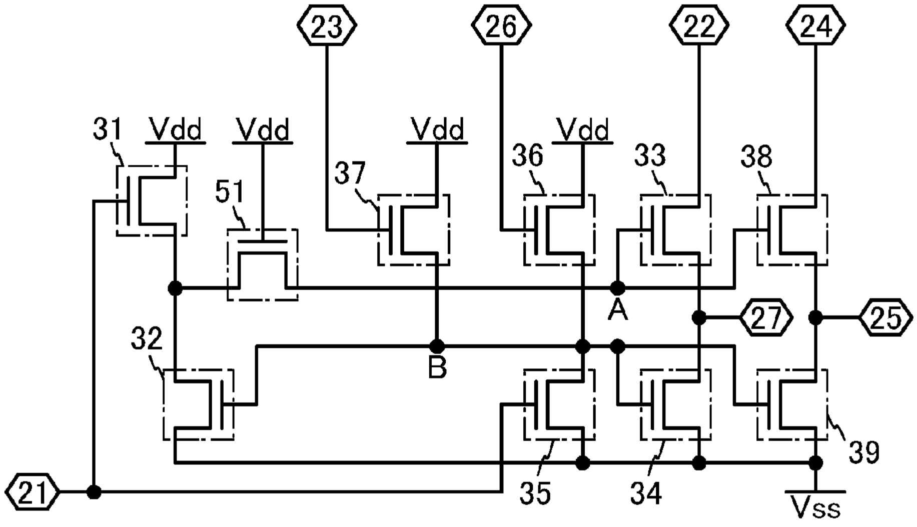

FIG. 19B illustrates another configuration example of the pulse output circuit. The pulse output circuit illustrated in FIG. 19B includes a transistor 51 in addition to the configuration of the pulse output circuit illustrated in FIG. 8A. A first terminal of the transistor 51 is connected to the second terminal of the transistor 31 and the second terminal of the transistor 32. A second terminal of the transistor 51 is connected to the gate electrode of the transistor 33 and the gate electrode of the transistor 38. A gate electrode of the transistor 51 is connected to the node supplied with the high power supply potential.

Note that the transistor 51 is off in the periods t1 to t6 shown in FIGS. 8B and 8C. Therefore, with the configuration including the transistor 51, the gate electrode of the transistor 33 and the gate electrode of the transistor 38 can be electrically disconnected to the second terminal of the transistor 31 and the second terminal of the transistor 32 in the periods t1 to t6. Thus, a load at the time of the bootstrapping in the pulse output circuit can be reduced in the periods t1 to t6.

Figure 20A:
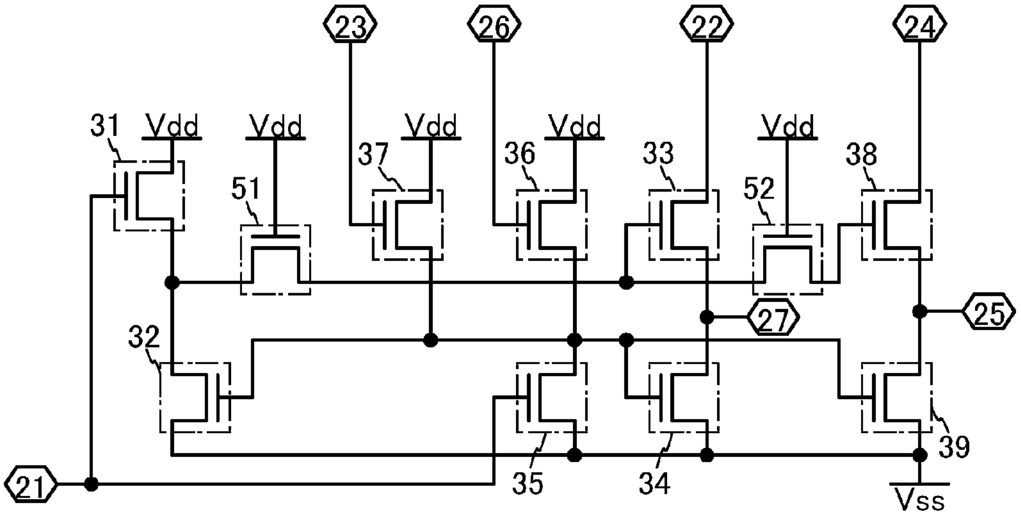
FIGS. 20A and 20B illustrate configurations of pulse output circuits.

FIG. 20A illustrates another example of the configuration of the pulse output circuit. The pulse output circuit illustrated in FIG. 20A includes a transistor 52 in addition to the configuration of the pulse output circuit illustrated in FIG. 19B. A first terminal of the transistor 52 is connected to the gate electrode of the transistor 33 and the second terminal of the transistor 51. A second terminal of the transistor 52 is connected to the gate electrode of the transistor 38. A gate electrode of the transistor 52 is connected to the node supplied with the high power supply potential.

The transistor 52 is provided as described above, whereby a load in the bootstrapping in the pulse output circuit can be reduced. In particular, the effect of reducing the load is enhanced in the case where the potential of a node connected to the gate electrode of the transistor 33 is increased only by capacitive coupling of the source electrode and the gate electrode of the transistor 33 in the pulse output circuit.

Figure 20B:
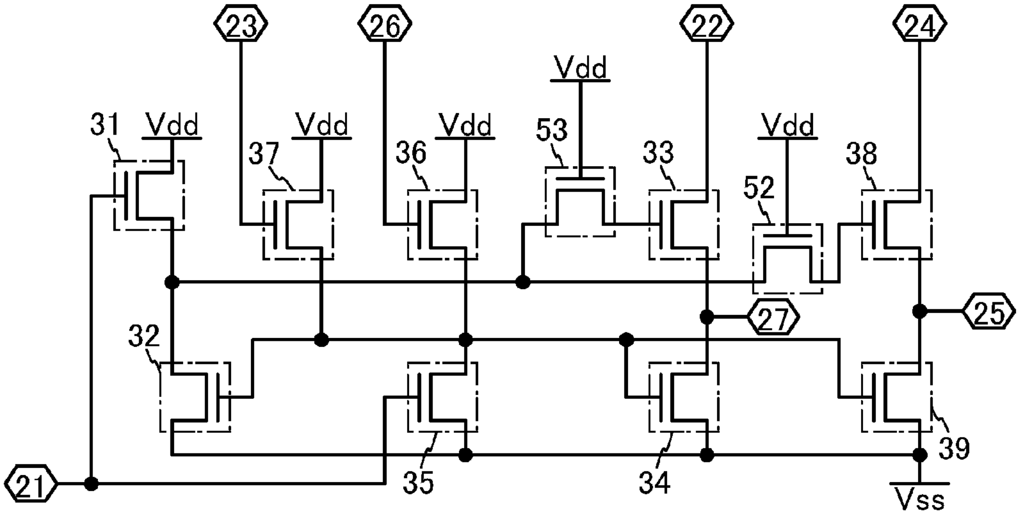

FIG. 20B illustrates another example of the configuration of the pulse output circuit. The pulse output circuit illustrated in FIG. 20B includes a transistor 53 in addition to the configuration of the pulse output circuit illustrated in FIG. 20A and does not include the transistor 51. A first terminal of the transistor 53 is connected to the second terminal of the transistor 31, the second terminal of the transistor 32, and the first terminal of the transistor 52. A second terminal of the transistor 53 is connected to the gate electrode of the transistor 33. A gate electrode of the transistor 53 is connected to the node supplied with the high power supply potential.

The transistor 53 is provided, whereby a load at the time of the bootstrapping in the pulse output circuit can be reduced. Further, an adverse effect of an irregular pulse generated in the pulse output circuit on the switching of the transistor 33 and the transistor 38 can be reduced.

As described in this embodiment, the liquid crystal display device according to an embodiment of the present invention performs color image display in such a manner that the pixel portion is divided into a plurality of regions and lights having different hues are sequentially supplied per region. At each time, the hues of the lights supplied to the adjacent regions can be different from each other. Accordingly, the images of respective colors can be prevented from being perceived separately without being synthesized, and a color break-up, which is likely to occur when a moving image is displayed, can be prevented.

Note that in the case where color image display is performed using a plurality of light sources having different hues, it is necessary to sequentially switch the plurality of light sources when light emission is performed unlike in the case where a light source of a single color and a color filter are used in combination. In addition, a frequency at which the light sources are switched is performed needs be higher than a frame frequency in the case of using a single-color light source. For example, when the frame frequency in the case of using the single-color light source is 60 Hz, in the case where FS driving is performed using light sources corresponding to colors of red, green, and blue, the frequency at which the light sources are switched is about three times as high as the frame frequency, i.e., 180 Hz. Accordingly, the driver circuits, which are operated in accordance with the frequency of the light sources, are operated at an extremely high frequency. Therefore, power consumption in the driver circuits tends to be high as compared to the case of using the combination of the single-color light source and the color filter.

However, in this embodiment, the transistor whose off-state current is extremely low is used, whereby the period in which a voltage applied to the liquid crystal element is held can be prolonged. Therefore, the driving frequency of a still image display can be lower than that of moving image display. Accordingly, it is possible to obtain a liquid crystal display device whose power consumption is reduced.

[Embodiment 2]

In this embodiment, an example of a liquid crystal display device of an embodiment of the present invention, whose panel structure is different from that of Embodiment 1 will be described.

<Structure Example of Panel>

A specific structure of a panel of an embodiment of the present invention will be described using an example thereof.

Figure 15A:
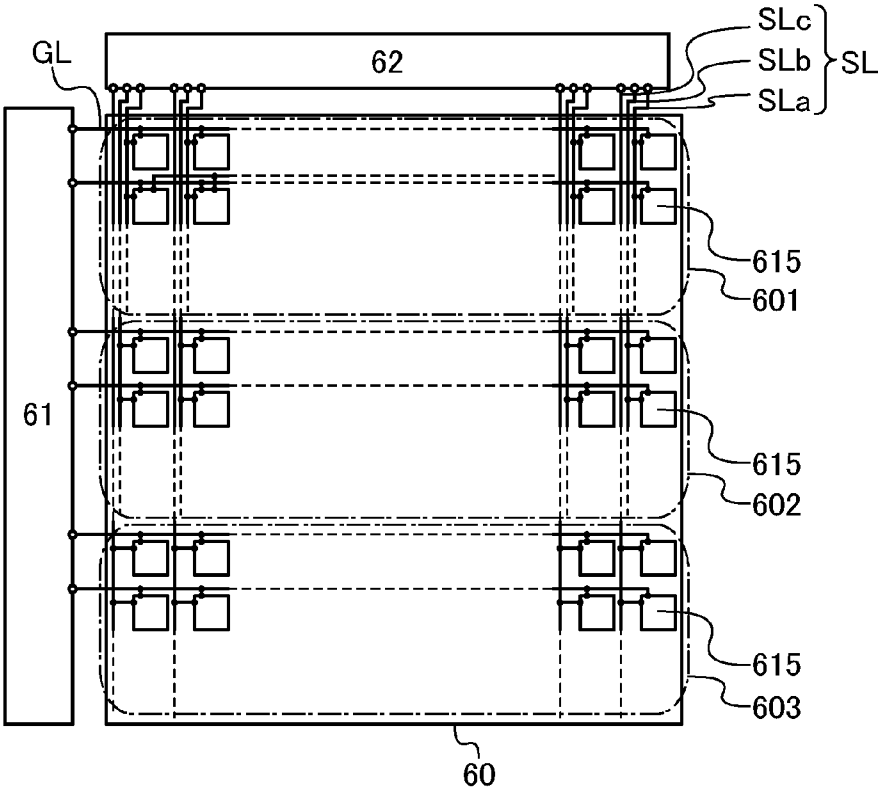
FIG. 15A illustrates a configuration of a panel and FIGS. 15B to 15D illustrates configurations of pixels.

FIG. 15A illustrates a structural example of a liquid crystal display device. The liquid crystal display device illustrated in FIG. 15A includes a pixel portion 60, a scan line driver circuit 61, and a signal line driver circuit 62. In an embodiment of the present invention, the pixel portion 60 is divided into a plurality of regions. Specifically, the pixel portion 60 is divided into three regions (regions 601 to 603) in FIG. 15A. Each region includes a plurality of pixels 615 arranged in a matrix.

M scan lines GL whose potentials are controlled by the scan line driver circuit 61 and 3×n signal lines SL whose potentials are controlled by the signal line driver circuit 62 are provided for the pixel portion 60. The m scan lines GL are divided into a plurality of groups in accordance with the number of regions of the pixel portion 60. For example, the m scan lines GL are divided into three groups because the pixel portion 60 is divided into three regions in FIG. 15A. The scan lines GL in each group are connected to the plurality of pixels 615 in each corresponding region. Specifically, each scan line GL is connected to n pixels 615 in each corresponding row among the plurality of pixels 615 arranged in matrix in each region.

In addition, the signal lines SL are divided into a plurality of groups in accordance with the number of regions of the pixel portion 60. For example, the 3 ×n signal lines SL are divided into three groups because the pixel portion 60 is divided into the three regions in FIG. 15A. The signal lines SL in each group are connected to the plurality of pixels 615 in each corresponding region.

Specifically, in FIG. 15A, the 3×n signal lines SL consist of n signal lines SLa, n signal lines SLb, and n signal lines SLc. Further, in FIG. 15A, each of the n signal lines SLa is connected to the pixels 615 in each corresponding column among the plurality of pixels 615 arranged in matrix in the region 601; each of the n signal lines SLb is connected to the pixels 615 in each corresponding column among the plurality of pixels 615 arranged in matrix in the region 602; and each of the n signal lines SLc is connected to the pixels 615 in each corresponding column among the plurality of pixels 615 arranged in matrix in the region 603.

Figure 15B:
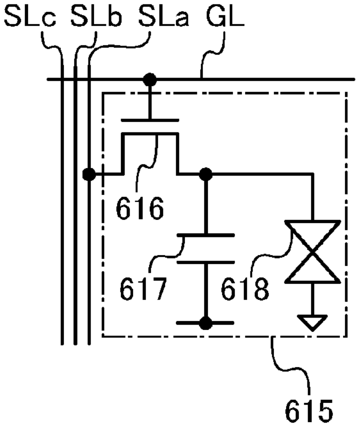
Figure 15C:
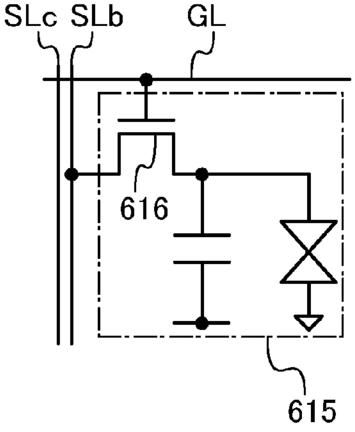
Figure 15D:
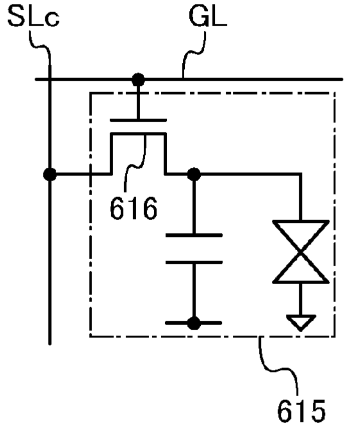

FIGS. 15B, 15C, and 15D are circuit diagrams of the pixels 615 in the regions 601, 602, and 603, respectively. The configuration of the pixel 615 is the same in the regions. Specifically, the pixel 615 includes a transistor 616 functioning as a switching element, a liquid crystal element 618 whose transmittivity is controlled in accordance with a potential of an image signal supplied through the transistor 616, and a capacitor 617 for holding the voltage between a pixel electrode and a counter electrode of the liquid crystal element 618.

As shown in FIG. 15B, in the region 601, the signal lines SLa, SLb, and SLc are provided next to the pixel 615. Further, in the pixel 615 in the region 601, a gate electrode of the transistor 616 is connected to the scan line GL. A first terminal of the transistor 616 is connected to the signal line Sla. A second terminal of the transistor 616 is connected to the pixel electrode of the liquid crystal element 618. One electrode of the capacitor 617 is connected to the pixel electrode of the liquid crystal element 618, and the other electrode of the capacitor 617 is connected to a node supplied with a potential.

As shown in FIG. 15C, in the region 602, the signal lines SLb and SLc are provided next to the pixel 615. Further, in the pixel 615 in the region 602, the gate electrode of the transistor 616 is connected to the scan line GL. The first terminal of the transistor 616 is connected to the signal line SLb. The second terminal of the transistor 616 is connected to the pixel electrode of the liquid crystal element 618. One electrode of the capacitor 617 is connected to the pixel electrode of the liquid crystal element 618, and the other electrode of the liquid crystal element 618 is connected to the node supplied with the potential.

As shown in FIG. 15D, in the region 603, the signal line SLc is provided next to the pixel 615. Further, in the pixel 615 in the region 603, the gate electrode of the transistor 616 is connected to the scan line GL. The first terminal of the transistor 616 is connected to the signal line SLc. The second terminal of the transistor 616 is connected to the pixel electrode of the liquid crystal element 618. One electrode of the capacitor 617 is connected to the pixel electrode of the liquid crystal element 618, and the other electrode of the capacitor 617 is connected to the node supplied with the potential.

A potential is also supplied to the counter electrode of the liquid crystal element 618 in each pixel 615. The potential supplied to the counter electrode may be in common with the potential supplied to the other electrode of the capacitor 617.

The pixel 615 may further include another circuit element such as a transistor, a diode, a resistor, a capacitor, or an inductor as needed.

In an embodiment of the present invention, a channel formation region of the transistor 616 functioning as a switching element may include a semiconductor which has a wider bandgap and a lower intrinsic carrier density than a silicon semiconductor. With such a semiconductor material having the above-described characteristics included in the channel formation region, the off-state current of the transistor 616 can be extremely decreased and the withstand voltage thereof can be increased. Further, with the transistor 616 having the above-described structure used as a switching element, leakage of electric charge accumulated in the liquid crystal element 618 can be further prevented as compared to the case of using a transistor including a normal semiconductor material such as silicon or germanium.

The transistor 616 whose off-state current is extremely low is used, whereby a period in which a voltage supplied to the liquid crystal element 618 is held can be prolonged. Accordingly, for example, in the case where image signals whose image data is the same as each other, like a still image, are written to the pixel portion 60 for a plurality of consecutive frame periods, display of an image can be maintained even when the driving frequency is low, i.e., the number of writing operations of an image signal to the pixel portion 60 for a certain period is reduced. For example, the above-described transistor in which an oxide semiconductor film which is highly purified and whose oxygen deficiency is reduced is used as an active layer is employed as the transistor 616, whereby an interval between writings of image signals can be extended to 10 seconds or more, preferably 30 seconds or more, further preferably 1 minute or more. As the interval between writings of image signals is made longer, power consumption can be further reduced.

In addition, since the potential of an image signal can be held for a longer period, the quality of the displayed image can be prevented from being lowered even when the capacitor 617 for holding the potential of an image signal is not connected to the liquid crystal element 618. Thus, it is possible to increase the aperture ratio by reducing the size of the capacitor 617 or by not providing the capacitor 617, which leads to reduction in power consumption of the liquid crystal display device.

In addition, by inversion driving in which the polarity of the potential of an image signal is inverted with respect to the potential of the counter electrode, deterioration of a liquid crystal called burn-in can be prevented. However, according to the inversion driving, the change in the potential supplied to the signal line is increased at the time of changing the polarity of the image signal; thus, a potential difference between a source electrode and a drain electrode of the transistor 616 functioning as a switching element is increased. Accordingly, deterioration of characteristics such as a shift in threshold voltage is easily caused in the transistor 616. Furthermore, in order to maintain the voltage held in the liquid crystal element 618, the off-state current of the transistor 616 needs to be low even when the potential difference between the source electrode and the drain electrode is large. In an embodiment of the present invention, a semiconductor which has a wider band-gap and a lower intrinsic carrier density than silicon or germanium, such as an oxide semiconductor, is used for the transistor 616; therefore, the withstand voltage of the transistor 616 can be increased and the off-state current can be made considerably low. Therefore, as compared to the case of using a transistor including a normal semiconductor material such as silicon or germanium, deterioration of the transistor 616 can be prevented and the voltage held in the liquid crystal element 618 can be maintained.

Although FIGS. 15B to 15D illustrate the case where one transistor 616 is used as a switching element in the pixel 615, the present invention is not limited to this structure. A plurality of transistors may be used as one switching element. In the case where a plurality of transistors functions as one switching element, the plurality of transistors may be connected to each other in parallel, in series, or in combination of parallel connection and series connection.

<Configuration Example of Scan Line Driver Circuit 61>

Figure 16:
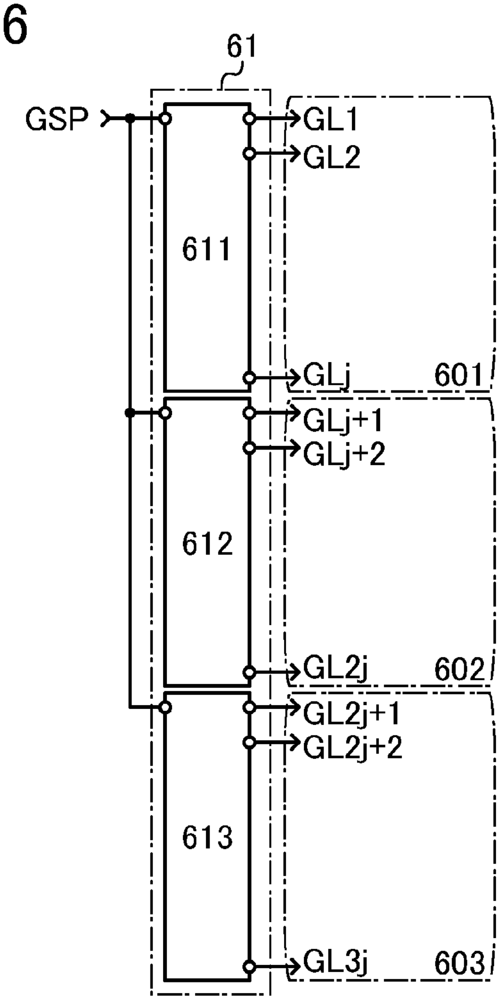
FIG. 16 illustrates a configuration of a scan line driver circuit.

FIG. 16 illustrates a configuration example of the scan line driver circuit 61 included in the liquid crystal display device illustrated in FIGS. 15A to 15D. The scan line driver circuit 61 illustrated in FIG. 16 includes shift registers 611 to 613 each including j output terminals. Each output terminal of the shift register 611 is connected to each corresponding one of the j scan lines GL provided in the region 601; each output terminal of the shift register 612 is connected to each corresponding one of the j scan lines GL provided in the region 602; and each output terminal of the shift register 613 is connected to each corresponding one of the j scan lines GL provided in the region 603. That is, selection signals are scanned in the region 601 by the shift register 611, selection signals are scanned in the region 602 by the shift register 612, and selection signals are scanned in the region 603 by the shift register 613.

Specifically, a pulse of a scan line driver circuit start pulse signal (GSP) is input to the shift register 611, in response to which, the shift register 611 supplies selection signals whose pulses are sequentially shifted by ½ period to the scan lines GL1 to GLj. In response to the input of the pulse of the scan line driver circuit start pulse signal (GSP), the shift register 612 supplies selection signals whose pulses are sequentially shifted by ½ period to the scan lines GLj+1 to GL2*j*. In response to the input of the pulse of the scan line driver circuit start pulse signal (GSP), the shift register 613 supplies selection signals whose pulses are sequentially shifted by ½ period to the scan lines GL2*j*+1 to GL3*j*.

An operation example of the scan line driver circuit 61 in a full-color image display period 301 and a monochrome still image display period 303 is described below using FIG. 17.

Figure 17:
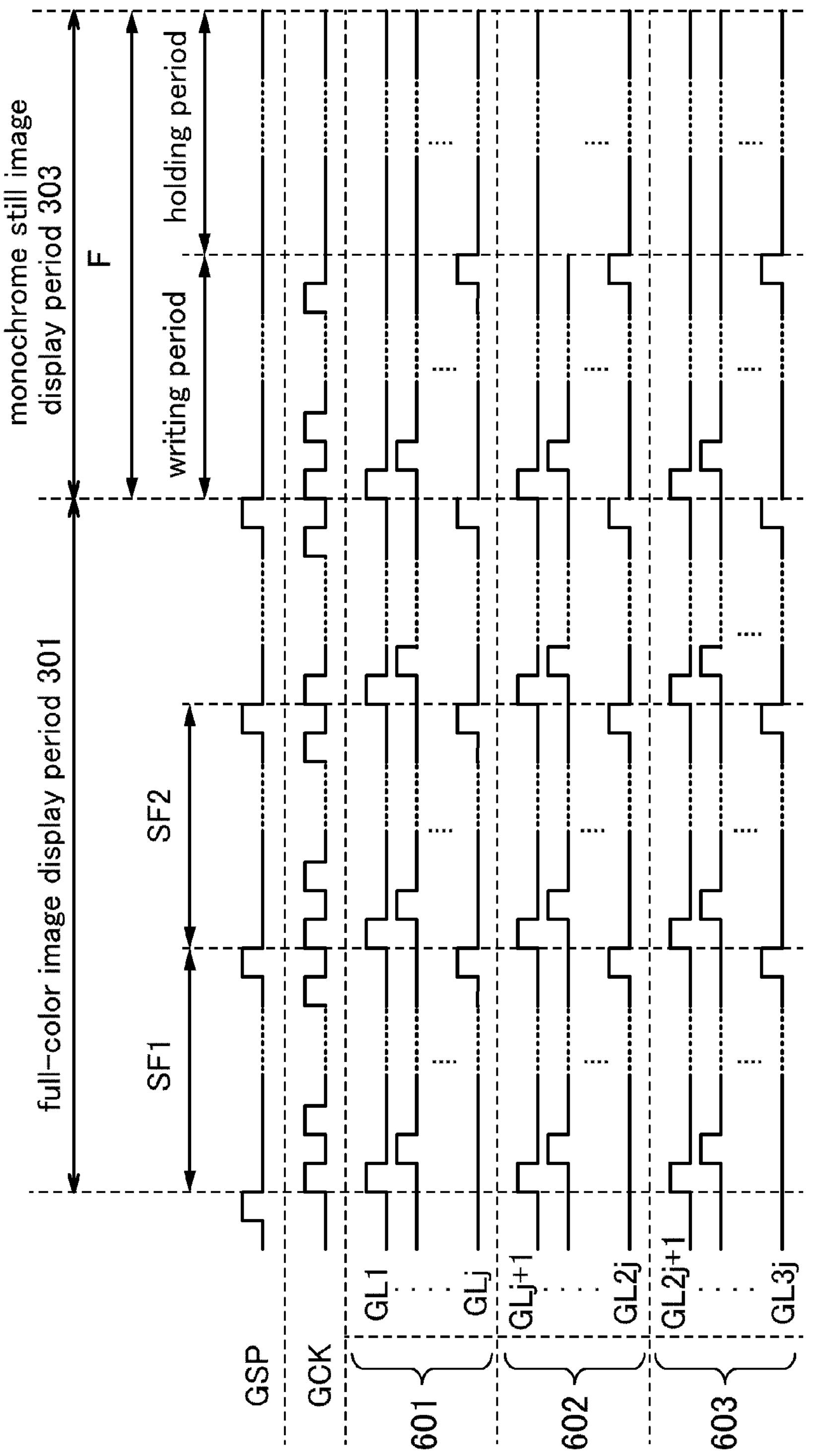
FIG. 17 illustrates a timing chart of a scan line driver circuit.

FIG. 17 is a timing chart of a scan line driver circuit clock signal (GCK), the selection signals input to the scan lines GL1 to GLj, the selection signals input to the scan lines GLj+1 to GL2*j*, and the selection signals input to the scan lines GL2*j*+1 to GL3*j*.

First, an operation of the scan line driver circuit 61 in the full-color image display period 301 is described below. In the full-color image display period 301, a first subframe period SF1 starts in response to the pulse of the scan line driver circuit start pulse signal (GSP). In the first subframe period SF1, the selection signals whose pulses are sequentially shifted by ½ period are supplied to the scan lines GL1 to GLj; the selection signals whose pulses are sequentially shifted by ½ period are supplied to the scan lines GLj+1 to GL2*j*; and the selection signals whose pulses are sequentially shifted by ½ period are supplied to the scan lines GL2*j*+1 to GL3*j*.

Then, the pulse of the scan line driver circuit start pulse signal (GSP) is input to the scan line driver circuit 61 again, in response to which a second subframe period SF2 starts. In the second subframe period SF2, in a similar manner to the first subframe period SF1, sequentially-pulse-shifted selection signals are input to the scan lines GL1 to GLj; the scan lines GLj+1 to GL2*j*; and the scan lines GL2*j*+1 to GL3*j*.

Then, the pulse of the scan line driver circuit start pulse signal (GSP) is input to the scan line driver circuit 61 again, in response to which a third subframe period SF3 starts. In the third subframe period SF3, in a similar manner to the first subframe period SF1, sequentially-pulse-shifted selection signals are input to the scan lines GL1 to GLj; the scan lines GLj+1 to GL2*j*; and the scan lines GL2*j*+1 to GL3*j*.

The first to third subframe periods SF1 to SF3 are terminated to complete one frame period, whereby an image can be displayed on the pixel portion.

Next, an operation of the scan line driver circuit 61 in the monochrome still image display period 303 is described below. In the monochrome still image display period 303, an operation which is similar to the operation of any of the subframe periods in the full-color image display period 301 is performed in an image signal writing period in the scan line driver circuit 61.

Next, in a holding period, supply of a driving signal and a power supply potential to the scan line driver circuit 61 is stopped. Specifically, first, the supply of the scan line driver circuit start pulse signal (GSP) is stopped to stop the output of selection signals from the scan line driver circuit 61, thereby terminating the selection by pulses in all of the scan lines GL, and then, the supply of the power supply potential to the scan line driver circuit 61 is stopped. According to the method, malfunction of the scan line driver circuit 61 in stopping the operation of the scan line driver circuit 61 can be prevented. In addition, supply of first to fourth scan line driver circuit clock signals (GCK1 to GCK4) to the scan line driver circuit 61 may be stopped.

The supply of the driving signal and the power supply potential to the scan line driver circuit 61 is stopped, whereby a low-level potential is supplied to the scan lines GL1 to GLj; the scan lines GLj+1 to GL2*j*; and the scan lines GL2*j*+1 to GL3*j*.

In a monochrome moving image display period 302, in a writing period, an operation of the scan line driver circuit 61 is similar to the operation in the monochrome still image display period 303.

In an embodiment of the present invention, a transistor whose off-state current is extremely low is used in the pixel, whereby the period in which a voltage supplied to the liquid crystal element is held can be prolonged. Therefore, in the monochrome still image display period 303, the holding period shown in FIG. 17 can be prolonged, which enables the driving frequency of the scan line driver circuit 61 to be lower than that in the full-color image display period 301. Accordingly, a liquid crystal display device whose power consumption is low can be provided.

<Configuration Example of Signal Line Driver Circuit 62>

Figure 18:
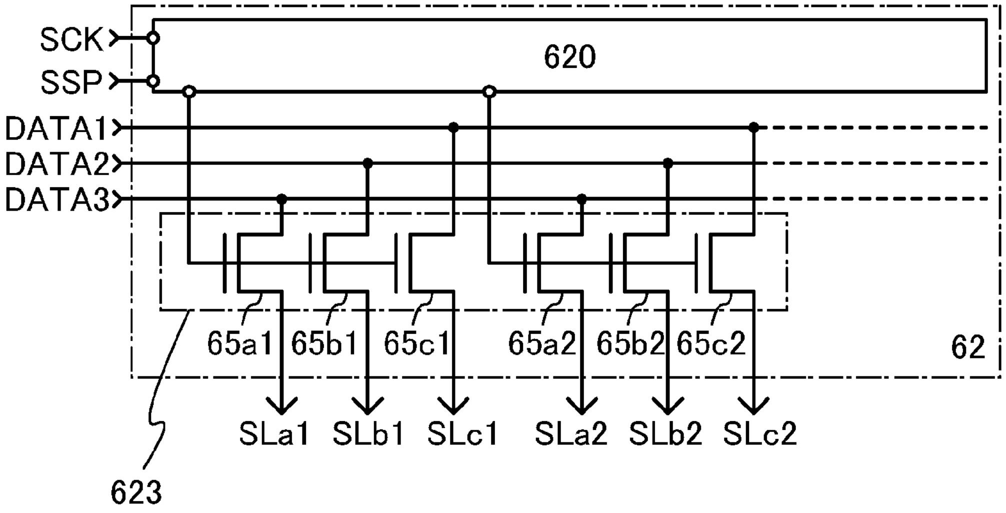
FIG. 18 illustrates a configuration of a signal line driver circuit.

FIG. 18 illustrates a configuration example of the signal line driver circuit 62 shown in FIG. 15A. The signal line driver circuit 62 shown in FIG. 18 includes a shift register 620 having first to n-th output terminals and a switching element group 623 which controls supply of an image signal (DATA1) input to the region 601, an image signal (DATA2) input to the region 602, and an image signal (DATA3) input to the region 603 to the signal lines SLa to SLc.

Specifically, the switching element group 623 includes transistors 65*a*1 to 65*an*, transistors 65*b*1 to 65*bn*, and transistors 65*c*1 to 65*cn*.

First terminals of the transistors 65*a*1 to 65*an* are connected to a wiring for supplying the image signal (DATA1), second terminals of the transistors 65*a*1 to 65*an* are connected to the signal lines SLa1 to SLan respectively, and gate electrodes of the transistors 65*a*1 to 65*an* are connected to the first to n-th output terminals of the shift register 620 respectively.

First terminals of the transistors 65*b*1 to 65*bn* are connected to a wiring for supplying the image signal (DATA2), second terminals of the transistors 65*b*1 to 65*bn* are connected to the signal lines SLb1 to SLbn respectively, and gate electrodes of the transistors 65*b*1 to 65*bn* are connected to the first to n-th output terminals of the shift register 620 respectively.

First terminals of the transistors 65*c*1 to 65*cn* are connected to a wiring for supplying the image signal (DATA3), second terminals of the transistors 65*c*1 to 65*cn* are connected to the signal lines SLc1 to SLcn respectively, and gate electrodes of the transistors 65*c*1 to 65*cn* are connected to the first to n-th output terminals of the shift register 620 respectively.

The shift register 620 operates in accordance with a driving signal such as a signal line driver circuit start pulse signal (SSP) and a signal line driver circuit clock signal (SCK), and outputs signals whose pulses are sequentially shifted from the first to n-th output terminals. The signals are input to the gate electrodes of the transistors to turn the transistors 65*a*1 to 65*cn* on sequentially, turn the transistors 65*b*1 to 65*bn* on sequentially, and turn the transistors 65*c*1 to 65*cn* on sequentially. Then, the image signal (Data1) is input to the signal lines SLa1 to SLan, the image signal (Data2) is input to the signal lines SLb1 to SLbn, and the image signal (Data3) is input to the signal lines SLc1 to SLcn, so that an image is displayed.

In the holding period in the monochrome still image display period 303, supply of the signal line driver circuit start pulse signal (SSP) to the shift register 620 and supply of the image signals (DATA1) to (DATA3) to the signal line driver circuit 62 are stopped. Specifically, for example, first, the supply of the signal line driver circuit start pulse signal (SSP) is stopped to stop sampling of an image signal in the signal line driver circuit 62, and then, the supply of the image signals and the supply of the power supply potential to the signal line driver circuit 62 are stopped. According to the method, malfunction of the signal line driver circuit 62 in stopping operation of the signal line driver circuit 62 can be prevented. In addition, supply of the signal line driver circuit clock signal (SCK) to the signal line driver circuit 62 may be stopped.

This embodiment can be combined as appropriate with any of the above-described embodiments.

[Embodiment 3]

In this embodiment, a method for manufacturing a transistor including an oxide semiconductor will be described.

Figure 21A:
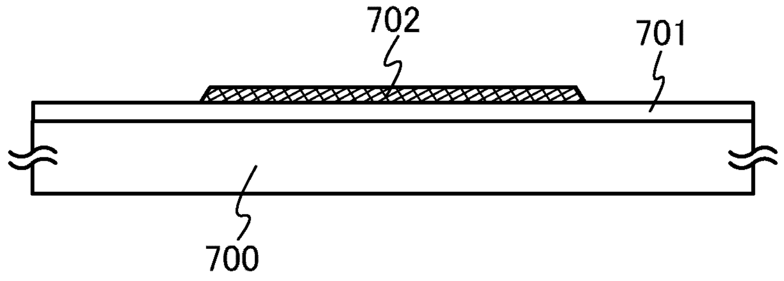
FIGS. 21A to 21C illustrate cross-sectional views of a method for manufacturing a transistor.

First, as illustrated in FIG. 21A, an insulating film 701 is formed over an insulating surface of a substrate 700, and a gate electrode 702 is formed over the insulating film 701.

Although there is no particular limitation on a substrate which can be used as the substrate 700 as long as it has a light-transmitting property, it is necessary that the substrate have at least enough heat resistance to heat treatment performed later. For example, a glass substrate manufactured by a fusion process or a float process, a quartz substrate, a ceramic substrate, or the like can be used as the substrate 700. In the case where a glass substrate is used and the temperature at which the heat treatment is to be performed later is high, a glass substrate whose strain point is higher than or equal to 730° C. is preferably used. Although a substrate formed of a flexible synthetic resin such as plastic generally has a lower resistance temperature than the aforementioned substrates, it may be used as long as being resistant to a processing temperature during manufacturing steps.

The insulating film 701 is formed using a material which can withstand a temperature of heat treatment in a later manufacturing step. Specifically, it is preferable to use silicon oxide, silicon nitride, silicon nitride oxide, silicon oxynitride, aluminum nitride, aluminum oxide, or the like for the insulating film 701.

In this specification, an oxynitride denotes a material in which the amount of oxygen is larger than that of nitrogen, and a nitride oxide denotes a material in which the amount of nitrogen is larger than that of oxygen.

The gate electrode 702 can be formed with a single layer or a stacked layer using one or more of conductive films including a metal material such as molybdenum, titanium, chromium, tantalum, tungsten, neodymium, or scandium, magnesium, or an alloy material including any of these metal materials as a main component, or a nitride of these metals. Note that aluminum or copper can also be used as such a metal material if it can withstand the temperature of heat treatment to be performed in a later process. Aluminum or copper is preferably combined with a refractory metal material in order to prevent a heat resistance problem and a corrosive problem. As the refractory metal material, molybdenum, titanium, chromium, tantalum, tungsten, neodymium, scandium, or the like can be used.

For example, as a two-layer structure of the gate electrode 702, the following structures are preferable: a two-layer structure in which a molybdenum film is stacked over an aluminum film, a two-layer structure in which a molybdenum film is stacked over a copper film, a two-layer structure in which a titanium nitride film or a tantalum nitride film is stacked over a copper film, and a two-layer structure in which a titanium nitride film and a molybdenum film are stacked. As a three-layer structure of the gate electrode 702, the following structure is preferable: a structure in which an aluminum film, an alloy film of aluminum and silicon, an alloy film of aluminum and titanium, or an alloy film of aluminum and neodymium is used as a middle layer and sandwiched between two films of an upper layer and a lower layer which are selected from a tungsten film, a tungsten nitride film, a titanium nitride film, or a titanium film.

Further, a light-transmitting oxide conductive film of indium oxide, an alloy of indium oxide and tin oxide ($In_2O_3$—$SnO_2$, abbreviated to ITO), an alloy of indium oxide and zinc oxide, zinc oxide, zinc aluminum oxide, zinc aluminum oxynitride, zinc gallium oxide, or the like can be used as the gate electrode 702.

The thickness of the gate electrode 702 is greater than or equal to 10 nm and less than or equal to 400 nm, preferably greater than or equal to 100 nm and less than or equal to 200 nm. In this embodiment, after a conductive film with a thickness of 150 nm for the gate electrode is formed by a sputtering method using a tungsten target, the conductive film is processed (patterned) into a desired shape by etching, whereby the gate electrode 702 is formed. Note that the end portion of the formed gate electrode are preferably tapered because coverage with a gate insulating film stacked thereover is improved. Note that a resist mask may be formed by an inkjet method. Formation of the resist mask by an inkjet method needs no photomask; thus, manufacturing cost can be reduced.

Figure 21B:
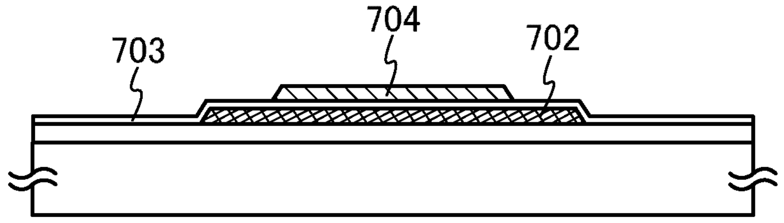

Next, as illustrated in FIG. 21B, a gate insulating film 703 is formed over the gate electrode 702, and then an island-shaped oxide semiconductor film 704 is formed over the gate insulating film 703 in a position overlapping with the gate electrode 702.

The gate insulating film 703 can be formed with a single-layer structure or a layered structure including any of a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, or a tantalum oxide film by a plasma CVD method, a sputtering method, or the like. It is preferable that the gate insulating film 703 do not include an impurity such as moisture, hydrogen, or oxygen as much as possible. In the case of forming a silicon oxide film by a sputtering method, a silicon target or a quartz target is used as a target, and oxygen or a mixed gas of oxygen and argon is used as a sputtering gas.

The oxide semiconductor which is highly purified by removal of an impurity is extremely sensitive to an interface state density or an interface electric charge; therefore, the interface between the highly purified oxide semiconductor and the gate insulating film 703 is important. Therefore, the gate insulating film (GI) that is in contact with the highly purified oxide semiconductor needs to have higher quality.

For example, a high-density plasma enhanced CVD using a microwave (frequency: 2.45 GHz) is preferably used, in which case an insulating film which is dense, has high withstand voltage, and is of high quality can be formed. This is because when the highly purified oxide semiconductor is closely in contact with the high-quality gate insulating film, the interface state density can be reduced and interface properties can be favorable.

Needless to say, other film formation methods, such as a sputtering method or a plasma CVD method, can be applied as long as a high-quality insulating film can be formed as the gate insulating film 703. In addition, any insulating film can be used as long as film quality and characteristics of an interface with an oxide semiconductor are modified by heat treatment performed after deposition. In any case, an insulating film that has favorable film quality as the gate insulating film and can reduce interface state density with the oxide semiconductor to form a favorable interface is formed.

The gate insulating film 703 may be formed to have a structure in which an insulating film including a material having a high barrier property and an insulating film having lower proportion of nitrogen, such as a silicon oxide film or a silicon oxynitride film, are stacked. In this case, the insulating film such as a silicon oxide film or a silicon oxynitride film is formed between the insulating film having a high barrier property and the oxide semiconductor film. As the insulating film having a high barrier property, a silicon nitride film, a silicon nitride oxide film, an aluminum nitride film, aluminum oxide film, an aluminum nitride oxide film, or the like can be given, for example. The insulating film having a high barrier property can prevent impurities in an atmosphere, such as moisture or hydrogen, or impurities in the substrate, such as an alkali metal or a heavy metal, from entering the oxide semiconductor film, the gate insulating film 703, or the interface between the oxide semiconductor film and another insulating film and the vicinity thereof. In addition, the insulating film having lower proportion of nitrogen such as a silicon oxide film or a silicon oxynitride film is formed so as to be in contact with the oxide semiconductor film, so that the insulating film having a high barrier property can be prevented from being in contact with the oxide semiconductor film directly.

For example, a layered film with a thickness of 100 nm may be formed as the gate insulating film 703 as follows: a silicon nitride film ($SiN_y$ (y>0)) with a thickness of greater than or equal to 50 nm and less than or equal to 200 nm is formed by a sputtering method as a first gate insulating film, and a silicon oxide film ($SiO_x$ (x>0)) with a thickness of greater than or equal to 5 nm and less than or equal to 300 nm is stacked over the first gate insulating film as a second gate insulating film. The thickness of the gate insulating film 703 may be set as appropriate depending on characteristics needed for the transistor and may be about 350 nm to 400 nm.

In this embodiment, the gate insulating film 703 having a structure in which a silicon oxide film with a thickness of 100 nm formed by a sputtering method is stacked over a silicon nitride film with a thickness of 50 nm formed by a sputtering method is formed.

Note that the gate insulating film 703 is in contact with the oxide semiconductor to be formed later. When hydrogen is contained in the oxide semiconductor, characteristics of the transistor are adversely affected; therefore, it is preferable that the gate insulating film 703 do not contain hydrogen, a hydroxyl group, and moisture. In order that the gate insulating film 703 does not contain hydrogen, a hydroxyl group, and moisture as much as possible, it is preferable that an impurity adsorbed on the substrate 700, such as moisture or hydrogen, be eliminated and removed by preheating the substrate 700, over which the gate electrode 702 is formed, in a preheating chamber of a sputtering apparatus, as a pretreatment for film formation. The temperature for the preheating is higher than or equal to 100° C. and lower than or equal to 400° C., preferably higher than or equal to 150° C. and lower than or equal to 300° C. As an exhaustion unit provided for the preheating chamber, a cryopump is preferable. Note that this preheating treatment can be omitted.

An oxide semiconductor film formed over the gate insulating film 703 is processed into a desired shape, so that the island-shaped oxide semiconductor film is formed. The thickness of the oxide semiconductor film is greater than or equal to 2 nm and less than or equal to 200 nm, preferably greater than or equal to 3 nm and less than or equal to 50 nm, further preferably greater than or equal to 3 nm and less than or equal to 20 nm. The oxide semiconductor film is formed by a sputtering method using an oxide semiconductor target. Moreover, the oxide semiconductor film can be formed by a sputtering method under a rare gas (e.g., argon) atmosphere, an oxygen atmosphere, or a mixed atmosphere of a rare gas (e.g., argon) and oxygen.

Note that before the oxide semiconductor film is formed by a sputtering method, dust on a surface of the gate insulating film 703 is preferably removed by reverse sputtering in which an argon gas is introduced and plasma is generated. The reverse sputtering refers to a method in which, without application of voltage to a target side, an RF power source is used for application of voltage to a substrate side in an argon atmosphere to generate plasma in the vicinity of the substrate to modify a surface. Note that instead of an argon atmosphere, a nitrogen atmosphere, a helium atmosphere, or the like may be used. Alternatively, an argon atmosphere to which oxygen, nitrous oxide, or the like is added may be used. Alternatively, an argon atmosphere to which chlorine, carbon tetrafluoride, or the like is added may be used.

As described above, as the oxide semiconductor, it is possible to use an indium oxide; a tin oxide; a zinc oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a four-component metal oxide such as an In—Sn—Ga—Zn-based oxide semiconductor, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

The oxide semiconductor preferably includes In, and further preferably includes In and Ga. In order to obtain an i-type (intrinsic) oxide semiconductor layer, dehydration or dehydrogenation to be described later is effective.

In this embodiment, as the oxide semiconductor film, an In—Ga—Zn—O-based oxide semiconductor thin film with a thickness of 30 nm, which is obtained by a sputtering method using a target including indium (In), gallium (Ga), and zinc (Zn), is used.

A target used for the formation of the oxide semiconductor film by a sputtering method was, for example, an oxide target containing $In_2O_3$, $Ga_2O_3$, and ZnO at a composition ratio of 1:1:1 [molar ratio], so that an In—Ga—Zn—O layer is formed. Without limitation to the material and the component of the target, for example, an oxide target having a composition ratio of $In_2O_3$:$Ga_2O_3$:ZnO=1:1:2 [molar ratio] may be used.

In the case where an In—Zn—O-based material is used as the oxide semiconductor film, a target therefor has a composition ratio of In:Zn=50:1 to 1:2 in an atomic ratio ($In_2O_3$:ZnO=25:1 to 1:4 in a molar ratio), preferably, In:Zn=20:1 to 1:1 in an atomic ratio ($In_2O_3$:ZnO=10:1 to 1:2 in a molar ratio), further preferably, In:Zn=15:1 to 1.5:1 in an atomic ratio ($In_2O_3$:ZnO=15:2 to 3:4 in a molar ratio). For example, the target used for deposition of an In—Zn—O-based oxide semiconductor layer has a composition ratio expressed by the equation $Z>1.5X+Y$ when In:Zn:O=X:Y:Z in atomic ratio.

The relative density of the oxide target is greater than or equal to 90% and less than or equal to 100%, preferably greater than or equal to 95% and less than or equal to 99.9%. By using the target with high relative density, a dense oxide semiconductor film can be formed.

In this embodiment, the oxide semiconductor film is formed over the substrate 700 in such a manner that the substrate is held in a treatment chamber kept at reduced pressure, a sputtering gas from which hydrogen and moisture have been removed is introduced into the treatment chamber while remaining moisture therein is removed, and the above target is used. The substrate temperature may be higher than or equal to 100° C. and lower than or equal to 600° C., preferably higher than or equal to 200° C. and lower than or equal to 400° C. in deposition. By forming the oxide semiconductor film in a state where the substrate is heated, the concentration of an impurity contained in the formed oxide semiconductor film can be reduced. In addition, damage by sputtering can be reduced. In order to remove remaining moisture in the treatment chamber, an entrapment vacuum pump is preferably used. For example, a cryopump, an ion pump, or a titanium sublimation pump is preferably used. The exhaustion unit may be a turbo pump provided with a cold trap. In a treatment chamber which is exhausted with the cryopump, for example, a hydrogen atom, a compound containing a hydrogen atom, such as water ($H_2O$), (further preferably, also a compound containing a carbon atom), and the like are removed, whereby the concentration of an impurity contained in the oxide semiconductor film formed in the treatment chamber can be reduced.

As one example of the deposition conditions, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulsed direct-current (DC) power supply is preferable because dust generated in deposition can be reduced and the film thickness can be made uniform.

In order that the oxide semiconductor film does not contain hydrogen, a hydroxyl group, and moisture as much as possible, it is preferable that an impurity adsorbed on the substrate 700, such as moisture or hydrogen, be eliminated and removed by preheating the substrate 700, over which films up to and including the gate insulating film 703 are formed, in a preheating chamber of a sputtering apparatus, as a pretreatment for film formation. The temperature for the preheating is higher than or equal to 100° C. and lower than or equal to 400° C., preferably higher than or equal to 150° C. and lower than or equal to 300° C. As an exhaustion unit, a cryopump is preferably provided for the preheating chamber. Note that this preheating treatment can be omitted. This preheating may be similarly performed on the substrate 700 over which films up to and including the conductive film 705 and the conductive film 706 are formed, before the formation of an insulating film 707.

Note that etching for forming the island-shaped oxide semiconductor film 704 may be wet etching, dry etching, or both dry etching and wet etching. As the etching gas for dry etching, a gas containing chlorine (e.g., a chlorine-based gas such as chlorine ($Cl_2$), boron trichloride ($BCl_3$), silicon tetrachloride ($SiCl_4$), or carbon tetrachloride ($CCl_4$)) is preferably used. Alternatively, a gas containing fluorine (e.g., a fluorine-based gas such as carbon tetrafluoride ($CF_4$), sulfur hexafluoride ($SF_6$), nitrogen trifluoride ($NF_3$), or trifluoromethane ($CHF_3$)); hydrogen bromide (HBr); any of these gases to which a rare gas such as helium (He) or argon (Ar) is added; or the like can be used.

As the dry etching method, a parallel plate RIE (reactive ion etching) method or an ICP (inductively coupled plasma) etching method can be used. In order to etch a film into a desired shape, the etching conditions (the amount of electric power applied to a coil-shaped electrode, the amount of electric power applied to an electrode on a substrate side, the temperature of the electrode on the substrate side, or the like) are adjusted as appropriate.

As an etchant used for wet etching, ITO-07N (produced by KANTO CHEMICAL CO., INC.) may be used.

A resist mask for forming the island-shaped oxide semiconductor film 704 may be formed by an inkjet method. Formation of the resist mask by an inkjet method needs no photomask; thus, manufacturing cost can be reduced.

Note that it is preferable that reverse sputtering be performed before the formation of a conductive film in a subsequent step so that a resist residue or the like left over surfaces of the island-shaped oxide semiconductor film 704 and the gate insulating film 703 is removed.

Note that the oxide semiconductor film formed by sputtering or the like contains a large amount of moisture or hydrogen (including a hydroxyl group) as an impurity in some cases. Moisture or hydrogen easily forms a donor level and thus serves as an impurity in the oxide semiconductor. In an embodiment of the present invention, in order to reduce an impurity such as moisture or hydrogen in the oxide semiconductor film (dehydration or dehydrogenation), the island-shaped oxide semiconductor film 704 is subjected to heat treatment in a reduced-pressure atmosphere, an inert gas atmosphere of nitrogen, a rare gas, or the like, an oxygen gas atmosphere, or an ultra dry air atmosphere (the moisture amount is 20 ppm (−55° C. by conversion into a dew point) or less, preferably 1 ppm or less, further preferably 10 ppb or less, in the case where the measurement is performed by a dew point meter in a cavity ring down laser spectroscopy (CRDS) method).

By performing heat treatment on the island-shaped oxide semiconductor film 704, moisture or hydrogen in the island-shaped oxide semiconductor film 704 can be eliminated. Specifically, heat treatment may be performed at a temperature higher than or equal to 250° C. and lower than or equal to 750° C., preferably higher than or equal to 400° C. and lower than the strain point of a substrate. For example, heat treatment may be performed at 500° C. for approximately more than or equal to 3 minutes and less than or equal to 6 minutes. When an RTA method is used for the heat treatment, dehydration or dehydrogenation can be performed in a short time; therefore, treatment can be performed even at a temperature higher than the strain point of a glass substrate.

In this embodiment, an electrical furnace that is one of heat treatment apparatuses is used.

Note that a heat treatment apparatus is not limited to an electrical furnace, and may include a device for heating an object by heat conduction or heat radiation from a heating element such as a resistance heating element. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the gas, an inert gas which does not react with an object by heat treatment, such as nitrogen or a rare gas such as argon is used.

Note that it is preferable that in the heat treatment, moisture, hydrogen, or the like be not contained in nitrogen or a rare gas such as helium, neon, or argon. It is preferable that the purity of nitrogen or the rare gas such as helium, neon, or argon which is introduced into a heat treatment apparatus be set to be 6N (99.9999%) or higher, preferably 7N (99.99999%) or higher (that is, the impurity concentration is 1 ppm or lower, preferably 0.1 ppm or lower).

Through the above-described process, the concentration of hydrogen in the island-shaped oxide semiconductor film 704 can be reduced and the oxide semiconductor film 704 can be highly purified. Thus, the oxide semiconductor film can be stabilized. In addition, the heat treatment at a temperature of lower than or equal to the glass transition point makes it possible to form an oxide semiconductor film with a wide band gap and a low carrier density due to hydrogen. Therefore, the transistor can be manufactured using a large substrate, so that the productivity can be increased. The above heat treatment can be performed at any time after the oxide semiconductor film is formed.

Note that in the case where the oxide semiconductor film is heated, although depending on a material of the oxide semiconductor film or heating conditions, plate-shaped crystals are formed in the surface of the oxide semiconductor film in some cases. The plate-shaped crystal is preferably a single crystal which is c-axis-aligned in a direction perpendicular to the surface of the oxide semiconductor film. Further, it is preferable to use a polycrystal or a single crystal in which a-b planes correspond to each other in the channel formation region, or a polycrystal in which a axes or b axes correspond to each other in the channel formation region, and which are c-axis-orientated in a direction substantially perpendicular to the surface of the oxide semiconductor film. Note that when a surface of a layer over which the oxide semiconductor film is formed is uneven, a plate-shaped crystal is a polycrystal. Therefore, the surface of the layer over which the oxide semiconductor film is formed is preferably as even as possible. Specifically, the surface of the layer over which the oxide semiconductor film is formed may have an average surface roughness (Ra) of 1 nm or less, preferably 0.3 nm or less, further preferably 0.1 nm or less. Ra can be evaluated by Atomic Force Microscope (AFM).

Figure 21C:
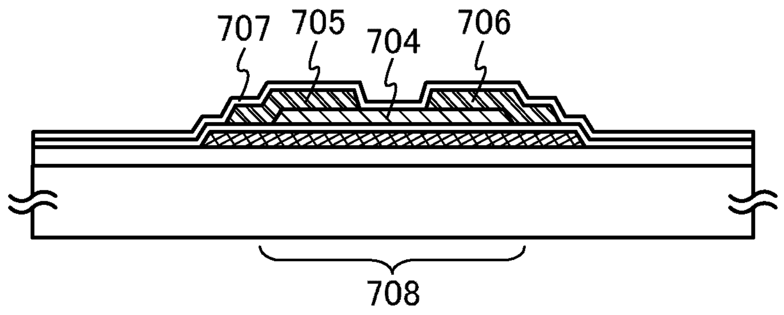

Next, as illustrated in FIG. 21C, the conductive film 705 and the conductive film 706 functioning as a source electrode and a drain electrode are formed, and an insulating film 707 is formed over the conductive film 705, the conductive film 706, and the island-shaped oxide semiconductor film 704.

The conductive film 705 and the conductive film 706 are formed in the following manner: a conductive film is formed to cover the island-shaped oxide semiconductor film 704 by a sputtering method or a vacuum evaporation method, and then the conductive film is patterned by etching or the like.

The conductive film 705 and the conductive film 706 are in contact with the island-shaped oxide semiconductor film 704. As a material of the conductive film for forming the conductive film 705 and the conductive film 706, any of the following materials can be used: an element selected from aluminum, chromium, copper, tantalum, titanium, molybdenum, tungsten, neodymium, scandium, or magnesium; an alloy including any of these elements; an alloy film including the above elements in combination; or the like. Aluminum or copper is preferably combined with a refractory metal material in order to prevent a heat resistance problem and a corrosion problem. As the refractory metal material, molybdenum, titanium, chromium, tantalum, tungsten, neodymium, scandium, yttrium, or the like can be used.

Further, the conductive film may have a single-layer structure or a layered structure of two or more layers. For example, a single-layer structure of an aluminum film containing silicon; a two-layer structure in which a titanium film is stacked over an aluminum film; a three-layer structure in which a titanium film, an aluminum film, and a titanium film are stacked in this order; and the like can be given.

For the conductive film for forming the conductive film 705 and the conductive film 706, a conductive metal oxide may be used. As the conductive metal oxide, indium oxide, tin oxide, zinc oxide, an alloy of indium oxide and tin oxide, an alloy of indium oxide and zinc oxide, or the metal oxide material containing silicon or silicon oxide can be used.

In the case where heat treatment is performed after formation of the conductive film, the conductive film preferably has heat resistance enough to withstand the heat treatment.

Note that the material and etching conditions are adjusted as appropriate so that the island-shaped oxide semiconductor film 704 is not removed as much as possible in the etching of the conductive film. Depending on the etching conditions, there are some cases in which an exposed portion of the island-shaped oxide semiconductor film 704 is partly etched and thereby a groove (a depression portion) is formed.

In this embodiment, a titanium film is used for the conductive film. Therefore, wet etching can be selectively performed on the conductive film using a solution (an ammonia hydrogen peroxide mixture) containing ammonia and hydrogen peroxide water. As the ammonia hydrogen peroxide mixture, specifically, a solution in which oxygenated water of 31 wt %, ammonia water of 28 wt %, and water are mixed at a volume ratio of 2:1:1 is used. Alternatively, dry etching may be performed on the conductive film with the use of a gas containing chlorine ($Cl_2$), boron chloride ($BCl_3$), or the like.

In order to reduce the number of photomasks and steps in a photolithography step, etching may be performed with the use of a resist mask formed using a multi-tone mask through which light is transmitted so as to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a process can be realized.

Note that before formation of the insulating film 707, the island-shaped oxide semiconductor film 704 is subjected to plasma treatment with the use of a gas such as $N_2O$, $N_2$, or Ar. By the plasma treatment, adsorbed water or the like attached to an exposed surface of the island-shaped oxide semiconductor film 704 is removed. Plasma treatment may be performed using a mixture gas of oxygen and argon as well.

The insulating film 707 does not preferably contain an impurity such as moisture or hydrogen as much as possible. An insulating film of a single layer or a plurality of insulating films stacked may be employed for the insulating film 707. When hydrogen is contained in the insulating film 707, the hydrogen enters the oxide semiconductor film or oxygen in the oxide semiconductor film is extracted by the hydrogen, whereby a back channel portion of the island-shaped oxide semiconductor film 704 has lower resistance (n-type conductivity); thus, a parasitic channel might be formed. Therefore, it is important that a film formation method in which hydrogen is not used be employed so that the insulating film 707 does not contain hydrogen as much as possible. A material having a high barrier property is preferably used for the insulating film 707. For example, as the insulating film having a high barrier property, a silicon nitride film, a silicon nitride oxide film, an aluminum nitride film, an aluminum oxide film, an aluminum nitride oxide film, or the like can be used. When a plurality of insulating films stacked is used, an insulating film having a lower proportion of nitrogen such as a silicon oxide film or a silicon oxynitride film is formed on the side closer to the island-shaped oxide semiconductor film 704 than the insulating film having a high barrier property. Then, the insulating film having a high barrier property is formed so as to overlap with the conductive film 705, the conductive film 706, and the island-shaped oxide semiconductor film 704 with the insulating film having a lower proportion of nitrogen between the insulating film having a high barrier property and the conductive film 705, the conductive film 706, and the island-shaped oxide semiconductor film 704. With the use of the insulating film having a high barrier property, an impurity such as moisture or hydrogen can be prevented from entering the island-shaped oxide semiconductor film 704, the gate insulating film 703, or the interface between the island-shaped oxide semiconductor film 704 and another insulating film and the vicinity thereof. In addition, the insulating film having a lower proportion of nitrogen such as a silicon oxide film or a silicon oxynitride film formed in contact with the island-shaped oxide semiconductor film 704 can prevent the insulating film formed using a material having a high barrier property from being in direct contact with the island-shaped oxide semiconductor film 704.

In this embodiment, the insulating film 707 having a structure in which a silicon nitride film with a thickness of 100 nm formed using a sputtering method is stacked over a silicon oxide film with a thickness of 200 nm formed using a sputtering method is formed. The substrate temperature in deposition may be higher than or equal to room temperature and lower than or equal to 300° C. and in this embodiment, is 100° C.

After the insulating film 707 is formed, heat treatment may be performed. The heat treatment is performed under an atmosphere of nitrogen, ultra-dry air, or a rare gas (argon, helium, or the like) preferably at a temperature higher than or equal to 200° C. and lower than or equal to 400° C., for example, higher than or equal to 250° C. and lower than or equal to 350° C. It is desirable that the content of water in the gas be 20 ppm or less, preferably 1 ppm or less, and further preferably 10 ppb or less. In this Embodiment, for example, the heat treatment is performed at a nitrogen atmosphere at 250° C. for 1 hour. Alternatively, RTA treatment for a short time at a high temperature may be performed before the formation of the conductive film 705 and the conductive film 706 in a manner similar to that of the previous heat treatment performed on the oxide semiconductor film for reduction of moisture or hydrogen. Even when oxygen deficiency is generated in the island-shaped oxide semiconductor film 704 by the previous heat treatment, by performing heat treatment after the insulating film 707 containing oxygen is provided, oxygen is supplied to the island-shaped oxide semiconductor film 704 from the insulating film 707. By supplying oxygen to the island-shaped oxide semiconductor film 704, oxygen deficiency that serves as a donor is reduced in the island-shaped oxide semiconductor film 704 and the stoichiometric composition can be satisfied. The island-shaped semiconductor film 704 preferably contains oxygen whose composition exceeds the stoichiometric composition. As a result, the island-shaped oxide semiconductor film 704 can be made to be substantially i-type and variation in electric characteristics of the transistor due to oxygen deficiency can be reduced; thus, electric characteristics can be improved. The timing of this heat treatment is not particularly limited as long as it is after the formation of the insulating film 707. When this heat treatment doubles as another step such as heat treatment for formation of a resin film or heat treatment for reduction of the resistance of a light-transmitting conductive film, the island-shaped oxide semiconductor film 704 can be made to be substantially i-type without the number of steps increased.

Moreover, the oxygen deficiency that serves as a donor in the island-shaped oxide semiconductor film 704 may be reduced by subjecting the island-shaped oxide semiconductor film 704 to heat treatment in an oxygen atmosphere so that oxygen is added to the oxide semiconductor. The heat treatment is performed at a temperature of, for example, higher than or equal to 100° C. and lower than 350° C., preferably higher than or equal to 150° C. and lower than 250° C. It is preferable that an oxygen gas used for the heat treatment under an oxygen atmosphere do not contain water, hydrogen, or the like. Alternatively, the purity of the oxygen gas which is introduced into the heat treatment apparatus is preferably greater than or equal to 6N (99.9999%) or further preferably greater than or equal to 7N (99.99999%) (that is, the impurity concentration in the oxygen is less than or equal to 1 ppm, or preferably less than or equal to 0.1 ppm).

Alternatively, oxygen may be added to the island-shaped oxide semiconductor film 704 by an ion implantation method or an ion doping method to reduce oxygen deficiency serving as a donor. For example, oxygen which is made into a plasma state by a microwave at 2.45 GHz may be added to the island-shaped oxide semiconductor film 704.

Note that a back gate electrode may be formed in a position overlapping with the island-shaped oxide semiconductor film 704 by forming a conductive film over the insulating film 707 and then patterning the conductive film. In the case where the back gate electrode is formed, an insulating film is preferably formed so as to cover the back gate electrode. The back gate electrode can be formed using a material and a structure similar to those of the gate electrode 702 and the conductive films 705 and 706.

The thickness of the back gate electrode is greater than or equal to 10 nm and less than or equal to 400 nm, preferably greater than or equal to 100 nm and less than or equal to 200 nm. For example, the back gate electrode may be formed in a such a manner that a conductive film in which a titanium film, an aluminum film, and a titanium film are stacked is formed, a resist mask is formed by a photolithography method or the like, and unnecessary portions are removed by etching so that the conductive film is processed (patterned) into a desired shape.

Through the above-described process, the transistor 708 is formed.

The transistor 708 includes the gate electrode 702, the gate insulating film 703 over the gate electrode 702, the island-shaped oxide semiconductor film 704 which is over the gate insulating film 703 and overlaps with the gate electrode 702, and a pair of the conductive film 705 and the conductive film 706 formed over the island-shaped oxide semiconductor film 704. Further, the transistor 708 may include the insulating film 707 as its constituent. The transistor 708 illustrated in FIG. 21C has a channel-etched structure in which part of the island-shaped oxide semiconductor film 704 between the conductive film 705 and the conductive film 706 is etched.

Although the transistor 708 is described as a single-gate transistor, a multi-gate transistor including a plurality of channel formation regions can be manufactured as needed. The multi-gate transistor includes a plurality of the gate electrodes 702 electrically connected to each other.

This embodiment can be implemented in combination with another embodiment as appropriate.

[Embodiment 4]

In this embodiment, structural examples of a transistor will be described. Note that the same portions as those in the above embodiments, portions having functions similar to those in the above embodiments, the same steps as those in the above embodiments, and steps similar to those in the above embodiments may be described as in the above embodiments, and repeated description thereof is omitted in this embodiment. Further, a specific description for the same portions is omitted.

Figure 22A:
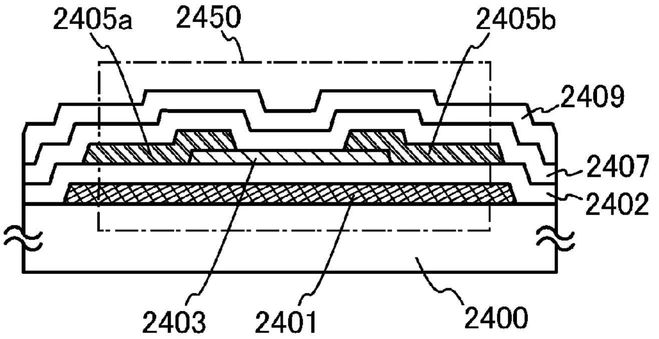
FIGS. 22A to 22D illustrate cross-sectional views of transistors.

A transistor 2450 illustrated in FIG. 22A includes a gate electrode 2401 over a substrate 2400, a gate insulating film 2402 over the gate electrode 2401, an oxide semiconductor film 2403 over the gate insulating film 2402, and a source electrode 2405*a* and a drain electrode 2405*b* over the oxide semiconductor film 2403. An insulating film 2407 is formed over the oxide semiconductor film 2403, the source electrode 2405*a*, and the drain electrode 2405*b*. A protective insulating film 2409 may be formed over the insulating film 2407. The transistor 2450 is a bottom-gate transistor and is also an inverted staggered transistor.

Figure 22B:
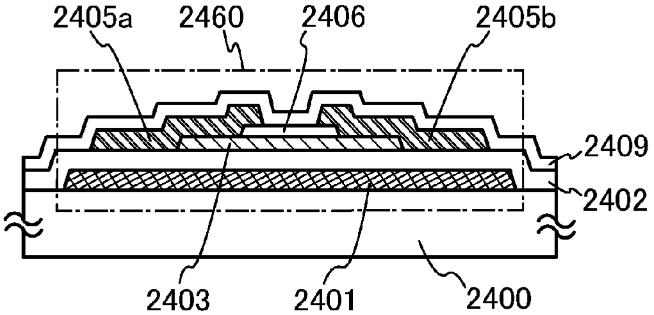

A transistor 2460 illustrated in FIG. 22B includes a gate electrode 2401 over the substrate 2400, the gate insulating film 2402 over the gate electrode 2401, the oxide semiconductor film 2403 over the gate insulating film 2402, a channel protective layer 2406 over the oxide semiconductor film 2403, and the source electrode 2405*a* and the drain electrode 2405*b* over the channel protective layer 2406 and the oxide semiconductor film 2403. The protective insulating film 2409 may be formed over the source electrode 2405*a* and the drain electrode 2405*b*. The transistor 2460 is a bottom-gate transistor called a channel-protective type (also referred to as a channel-stop type) transistor and is also an inverted staggered transistor. The channel protective layer 2406 can be formed using a material and a method similar to those of other insulating films.

Figure 22C:
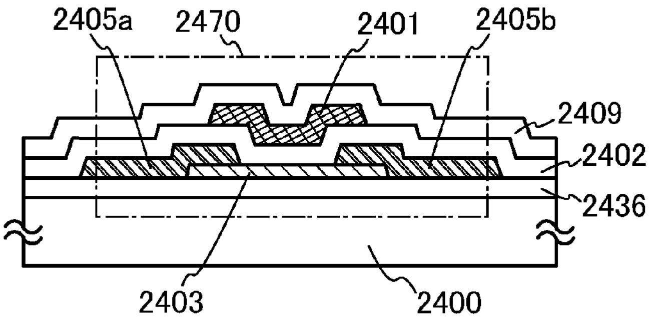

A transistor 2470 illustrated in FIG. 22C includes a base film 2436 over the substrate 2400, the oxide semiconductor film 2403 over the base film 2436, the source electrode 2405*a* and the drain electrode 2405*b* over the oxide semiconductor film 2403 and the base film 2436, the gate insulating film 2402 over the oxide semiconductor film 2403, the source electrode 2405*a*, and the drain electrode 2405*b*, and the gate electrode 2401 over the gate insulating film 2402. The protective insulating film 2409 may be formed over the gate electrode 2401. The transistor 2470 is a top-gate transistor.

Figure 22D:
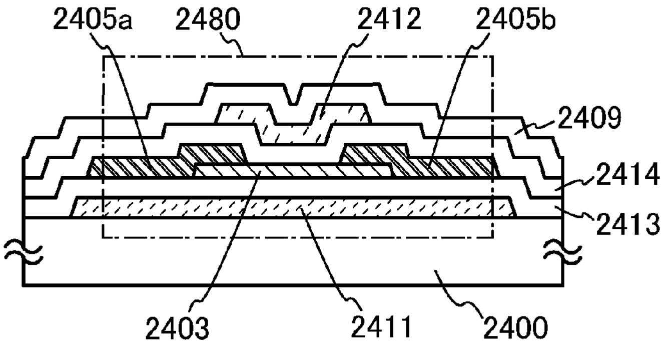

A transistor 2480 illustrated in FIG. 22D includes a first gate electrode 2411 over the substrate 2400, a first gate insulating film 2413 over the first gate electrode 2411, the oxide semiconductor film 2403 over the first gate insulating film 2413, and the source electrode 2405*a* and the drain electrode 2405*b* over the oxide semiconductor film 2403 and the first gate insulating film 2413. A second gate insulating film 2414 is formed over the oxide semiconductor film 2403, the source electrode 2405*a*, and the drain electrode 2405*b*, and a second gate electrode 2412 is formed over the second gate insulating film 2414. The protective insulating film 2409 may be formed over the second gate electrode 2412.

The transistor 2480 has a structure combining the transistor 2450 and the transistor 2470. The first gate electrode 2411 and the second gate electrode 2412 can be electrically connected to each other, so that they function as one gate electrode. Either the first gate electrode 2411 or the second gate electrode 2412 may be simply referred to as a gate electrode and the other may be referred to as a back gate electrode.

By changing a potential of the back gate electrode, the threshold voltage of the transistor can be changed. The back gate electrode is formed so as to overlap with a channel formation region in the oxide semiconductor film 2403. Further, the back gate electrode may be electrically insulated and in a floating state, or may be in a state where the back gate electrode is supplied with a potential. In the latter case, the back gate electrode may be supplied with a potential at the same level as that of the gate electrode, or may be supplied with a fixed potential such as a ground potential. The level of the potential applied to the back gate electrode is controlled, so that the threshold voltage of the transistor 2480 can be controlled.

When the oxide semiconductor film 2403 is completely covered with the back gate electrode, light from the back gate electrode side can be prevented from entering the oxide semiconductor film 2403. Therefore, photodegradation of the oxide semiconductor film 2403 can be prevented and deterioration in characteristics of the transistor, such as a shift of the threshold voltage, can be prevented.

An insulating film in contact with the oxide semiconductor film 2403 (in this embodiment, corresponding to the gate insulating film 2402, the insulating film 2407, the channel protective layer 2406, the base film 2436, the first gate insulating film 2413, and the second gate insulating film 2414) is preferably formed of an insulating material containing a Group 13 element and oxygen. Many oxide semiconductor materials contain a Group 13 element, and an insulating material containing a Group 13 element works well with an oxide semiconductor. By using such an insulating material containing a Group 13 element for the insulating film in contact with the oxide semiconductor film, an interface with the oxide semiconductor film can keep a favorable state.

An insulating material containing a Group 13 element means an insulating material containing one or more Group 13 elements. As the insulating material containing a Group 13 element, gallium oxide, aluminum oxide, aluminum gallium oxide, and gallium aluminum oxide can be given, for example. Here, the amount of aluminum is larger than that of gallium in atomic percent in aluminum gallium oxide, whereas the amount of gallium is larger than or equal to that of aluminum in atomic percent in gallium aluminum oxide.

For example, in the case of forming an insulating film in contact with an oxide semiconductor film containing gallium, a material containing gallium oxide may be used for the insulating film, so that favorable characteristics can be kept at the interface between the oxide semiconductor film and the insulating film. When the oxide semiconductor film and the insulating film containing gallium oxide are provided in contact with each other, pileup of hydrogen at the interface between the oxide semiconductor film and the insulating film can be reduced, for example. Note that a similar effect can be obtained in the case where an element in the same group as a constituent element of the oxide semiconductor film is used in an insulating film. For example, it is effective to form an insulating film with the use of a material containing aluminum oxide. Note that aluminum oxide has a property of not easily transmitting water. Thus, it is preferable to use a material containing aluminum oxide in terms of preventing entry of water to the oxide semiconductor film.

The insulating film in contact with the oxide semiconductor film 2403 preferably contains oxygen in a proportion higher than that in the stoichiometric composition, by heat treatment in an oxygen atmosphere or oxygen doping. Oxygen doping means addition of oxygen into a bulk. Note that the term "bulk" is used in order to clarify that oxygen is added not only to a surface of a thin film but also to the inside of the thin film. In addition, "oxygen doping" includes "oxygen plasma doping" in which oxygen which is made to be plasma is added to a bulk. The oxygen doping may be performed using an ion implantation method or an ion doping method.

For example, in the case where the insulating film in contact with the oxide semiconductor film 2403 is formed of gallium oxide, the composition of gallium oxide can be set to be $Ga_2O_x$ ($x=3+\alpha$, $0<\alpha<1$) by heat treatment in an oxygen atmosphere or oxygen doping.

In the case where the insulating film in contact with the oxide semiconductor film 2403 is formed of aluminum oxide, the composition of aluminum oxide can be set to be $Al_2O_x$ ($x=3+\alpha$, $0<\alpha<1$) by heat treatment in an oxygen atmosphere or oxygen doping.

In the case where the insulating film in contact with the oxide semiconductor film 2403 is formed of gallium aluminum oxide (or aluminum gallium oxide), the composition of gallium aluminum oxide (or aluminum gallium oxide) can be set to be $Ga_xAl_{2-x}O_{3+\alpha}$ ($0<x<2$, $0<\alpha<1$) by heat treatment in an oxygen atmosphere or oxygen doping.

By oxygen doping, an insulating film including a region where the proportion of oxygen is higher than that in the stoichiometric composition can be formed. When the insulating film including such a region is in contact with the oxide semiconductor film, oxygen that exists excessively in the insulating film is supplied to the oxide semiconductor film, and oxygen deficiency in the oxide semiconductor film or at an interface between the oxide semiconductor film and the insulating film is reduced. Thus, the oxide semiconductor film can be formed to an i-type or substantially i-type oxide semiconductor.

The insulating film including a region where the proportion of oxygen is higher than that in the stoichiometric composition may be applied to either the insulating film placed on the upper side of the oxide semiconductor film or the insulating film placed on the lower side of the oxide semiconductor film of the insulating films in contact with the oxide semiconductor film 2403; however, it is preferable to apply such an insulating film to both of the insulating films in contact with the oxide semiconductor film 2403. The above-described effect can be enhanced with a structure where the oxide semiconductor film 2403 is sandwiched between the insulating films each including a region where the proportion of oxygen is higher than that in the stoichiometric composition, which are used as the insulating films in contact with the oxide semiconductor film 2403 and placed on the upper side and the lower side of the oxide semiconductor film 2403.

The insulating films on the upper side and the lower side of the oxide semiconductor film 2403 may contain the same constituent element or different constituent elements. For example, the insulating films on the upper side and the lower side may be both formed using gallium oxide whose composition is $Ga_2O_x$ ($x=3+\alpha$, $0<\alpha<1$). Alternatively, one of the insulating films on the upper side and the lower side may be formed using gallium oxide whose composition is $Ga_2O_x$ ($x=3+\alpha$, $0<\alpha<1$) and the other may be formed using aluminum oxide whose composition is $Al_2O_x$ ($x=3+\alpha$, $0<\alpha<1$).

The insulating film in contact with the oxide semiconductor film 2403 may be formed by stacking insulating films including a region where the proportion of oxygen is higher than that in the stoichiometric composition. For example, the insulating film on the upper side of the oxide semiconductor film 2403 may be formed as follows: gallium oxide whose composition is $Ga_2O_x$ (x=3+α, 0<α<1) is formed and gallium aluminum oxide (or aluminum gallium oxide) whose composition is $Ga_xAl_{2-x}O_{3+\alpha}$ (0<x<2, 0<α<1) may be formed thereover. Note that the insulating film on the lower side of the oxide semiconductor film 2403 may be formed by stacking insulating films each including a region where the proportion of oxygen is higher than that in the stoichiometric composition. Further, both of the insulating films on the upper side and the lower side of the oxide semiconductor film 2403 may be formed by stacking insulating films including a region where the proportion of oxygen is higher than that in the stoichiometric composition.

This embodiment can be implemented in combination with another embodiment as appropriate.

[Embodiment 5]

In this embodiment, an example of a substrate used in a liquid crystal display device according to an embodiment of the present invention will be described with reference to FIGS. 23A to 23E2, and FIGS. 24A to 24C.

Figure 23A:
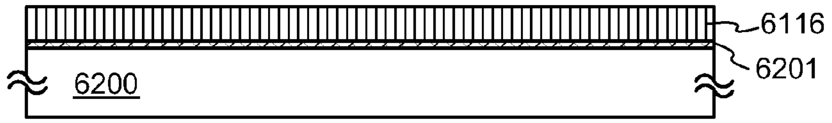

First, a layer 6116 to be separated is formed over a substrate 6200 with a separation layer 6201 provided therebetween (see FIG. 23A).

The substrate 6200 may be a quartz substrate, a sapphire substrate, a ceramic substrate, a glass substrate, a metal substrate, or the like. Note that such a substrate which is thick enough not to be definitely flexible enables precise formation of an element such as a transistor. The degree "not to be definitely flexible" means that the elastic modulus of the substrate is higher than or equivalent to that of a glass substrate used in generally fabricating a liquid crystal display.

The separation layer 6201 is formed with a single layer or stacked layers using any of elements selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), and silicon (Si), an alloy material containing any of the above elements as its main component, and a compound material containing any of the above elements as its main component by a sputtering method, a plasma CVD method, an application method, a printing method, or the like.

In the case where the separation layer 6201 has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum is formed. Note that the mixture of tungsten and molybdenum corresponds to an alloy of tungsten and molybdenum, for example.

In the case where the separation layer 6201 has a layered structure, it is preferable that a metal layer and a metal oxide layer be formed as a first layer and a second layer, respectively. Typically, it is preferable to form a tungsten layer, a molybdenum layer, or a layer containing a mixture of tungsten and molybdenum as the first layer and to form an oxide, a nitride, an oxynitride, or a nitride oxide of tungsten, molybdenum, or a mixture of tungsten and molybdenum as the second layer. As formation of the metal oxide layer as the second layer, an oxide layer (such as a silicon oxide which can be utilized as an insulating layer) may be formed over the metal layer which is the first layer so that an oxide of the metal is formed on a surface of the metal layer.

The layer 6116 to be separated includes components necessary for an element substrate, such as a transistor, an interlayer insulating film, a wiring, and a pixel electrode, and further, depending on a case, a counter electrode, a blocking film, an alignment film, or the like. Such components can be normally formed over the separation layer 6201. Materials, manufacturing methods, and structures of these components are similar to those described in any of the above embodiments, and repeated description thereof is omitted in this embodiment. Thus, the transistor and the electrode can be formed precisely using a known material and a known method.

Figure 23B:
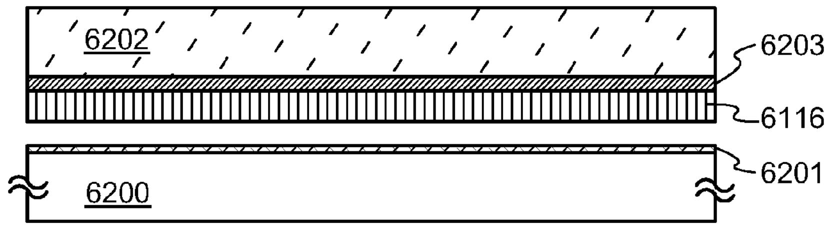
Figure 23B:
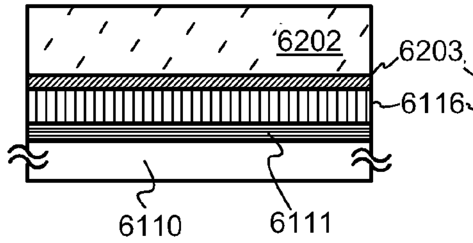
Figure 23B:
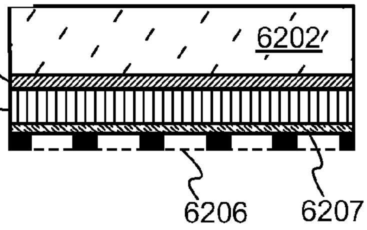
Figure 23B:
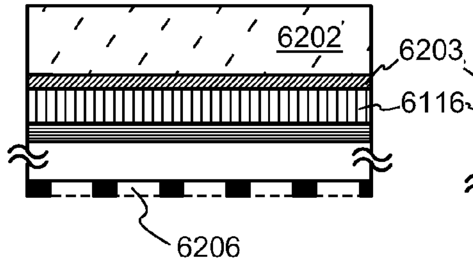
Figure 23B:
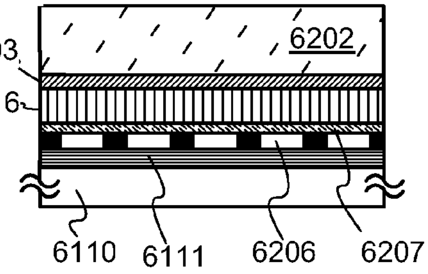
Figure 23B:
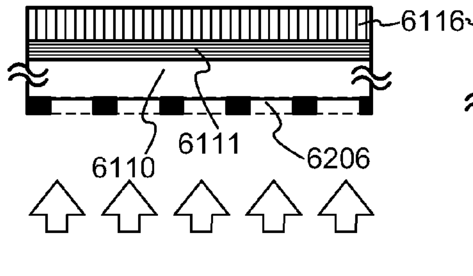
Figure 23B:
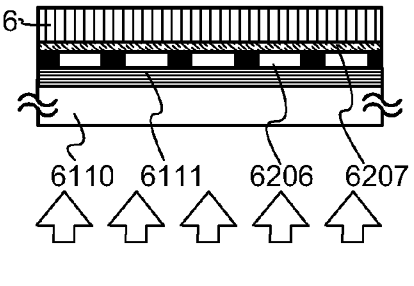

Next, the layer 6116 to be separated is bonded to a temporary supporting substrate 6202 with the use of an adhesive 6203 for separation and then, the layer 6116 to be separated is separated from the separation layer 6201 over the substrate 6200 to be transferred (see FIG. 23B). In this manner, the layer 6116 to be separated is placed on the temporary supporting substrate side. Note that in this specification, a process for transferring the layer to be separated from the substrate to the temporary supporting substrate is referred to as a transfer process.

As the temporary supporting substrate 6202, a glass substrate, a quartz substrate, a sapphire substrate, a ceramic substrate, a metal substrate, or the like can be used. Alternatively, a plastic substrate which can withstand the temperature of the following process may be used.

As the adhesive 6203 for separation which is used here, an adhesive which is soluble in water or a solvent, an adhesive which is capable of being plasticized upon irradiation of UV light, or the like is used so that the temporary supporting substrate 6202 and the layer 6116 to be separated can be separated when necessary.

Any of various methods can be used as appropriate in the process for transferring the layer 6116 to be separated to the temporary supporting substrate 6202. For example, when a film including a metal oxide film is formed as the separation layer 6201 so as to be in contact with the layer 6116 to be separated, the metal oxide film is embrittled by crystallization, whereby the layer 6116 to be separated can be separated from the substrate 6200. When an amorphous silicon film containing hydrogen is formed as the separation layer 6201 between the substrate 6200 and the layer 6116 to be separated, the amorphous silicon film containing hydrogen is removed by laser light irradiation or etching, so that the layer 6116 to be separated can be separated from the substrate 6200. In the case where a film containing nitrogen, oxygen, hydrogen, or the like (for example, an amorphous silicon film containing hydrogen, an alloy film containing hydrogen, an alloy film containing oxygen, or the like) is used as the separation layer 6201, the separation layer 6201 can be irradiated with laser light to release the nitrogen, oxygen, or hydrogen contained in the separation layer 6201 as a gas, so that separation between the layer 6116 to be separated and the substrate 6200 can be promoted. Alternatively, a liquid may be made to penetrate the interface between the separation layer 6201 and the layer 6116 to be separated to cause separation of the layer 6116 to be separated from the substrate 6200. Still alternatively, when the separation layer 6201 is formed using tungsten, the separation may be performed while the separation layer 6201 is etched with the use of a mixed solution of ammonia water and a hydrogen peroxide solution.

Further, the transfer process can be facilitated by using plural kinds of separation methods described above in combination. That is, the separation can be performed with a physical force (by a machine or the like) after performing laser light irradiation on part of the separation layer, etching on part of the separation layer with a gas, a solution, or the like, or mechanical removal of part of the separation layer with a sharp knife, a scalpel, or the like, in order that the separation layer and the layer to be separated can be easily separated from each other. In the case where the separation layer 6201 is formed to have a layered structure of a metal and a metal oxide, the layer to be separated can be physically separated easily from the separation layer by using a groove formed by laser light irradiation or a scratch made by a sharp knife, a scalpel, or the like as a trigger.

Alternatively, the separation may be performed while liquid such as water is poured.

As a method for separating the layer 6116 to be separated from the substrate 6200, a method may alternatively be employed in which the substrate 6200 over which the layer 6116 to be separated is formed is removed by mechanical polishing or by etching using a solution or a halogen fluoride gas such as $NF_3$, $BrF_3$, or $ClF_3$, or the like. In that case, the separation layer 6201 is not necessarily provided.

Next, a surface of the layer 6116 to be separated or the separation layer 6201 exposed by separation of the layer 6116 to be separated from the substrate 6200 is bonded to a transfer substrate 6110 with the use of a first adhesive layer 6111 including an adhesive different from the adhesive 6203 for separation (see FIG. 23C1).

As a material of the first adhesive layer 6111, any of various curable adhesives, e.g., a light curable adhesive such as an UV curable adhesive, a reactive curable adhesive, a thermal curable adhesive, and an anaerobic adhesive, can be used.

As the transfer substrate 6110, any of various substrates with high toughness, such as an organic resin film and a metal substrate, can be favorably used. Substrates with high toughness have high impact resistance and thus are less likely to be damaged. In the case of using an organic resin film and a thin metal substrate, which are lightweight, the weight can be significantly lower than in the case of using a general glass substrate. With the use of such a substrate, it is possible to fabricate a lightweight liquid crystal display device which is not easily damaged.

In the case of a transmissive or transflective liquid crystal display device, a substrate which has high toughness and transmits visible light may be used as the transfer substrate 6110. As a material of such a substrate, for example, polyester resins such as polyethylene terephthalate (PET) and polyethylene naphthalate (PEN), an acrylic resin, a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinylchloride resin can be given. A substrate made of such an organic resin has high toughness and thus has high impact resistance and is less likely to be damaged. Further, a film of such an organic resin, which is lightweight, enables significant reduction in weight of a display device unlike a general glass substrate. In that case, the transfer substrate 6110 is preferably further provided with a metal plate 6206 having an opening at least in a portion overlapping with a region where light of each pixel is transmitted. With the above structure, the transfer substrate 6110 which has high toughness and high impact resistance and is less likely to be damaged can be formed while a change in dimension is suppressed. Further, when the thickness of the metal plate 6206 is reduced, the transfer substrate 6110 which is lighter than a general glass substrate can be formed. With the use of such a substrate, it is possible to fabricate a lightweight liquid crystal display device which is not easily damaged (see FIG. 23D1).

Figure 24A:
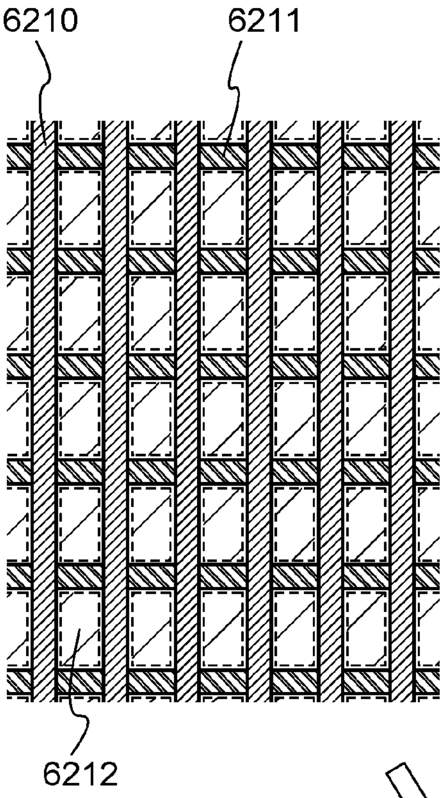
FIGS. 24A to 24C illustrate an example of a top view of a liquid crystal display device.
Figure 24B:
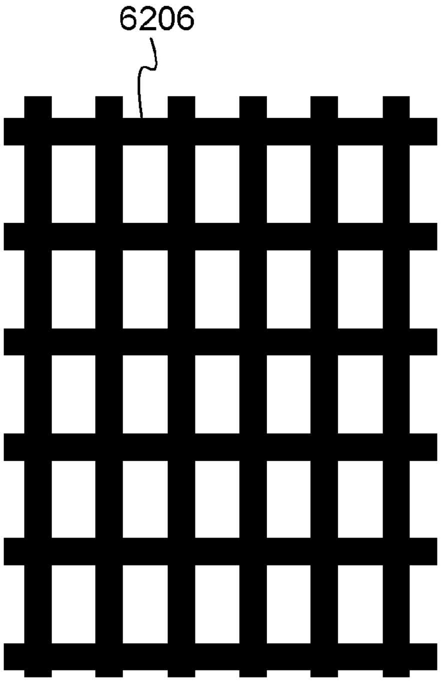
Figure 24C:
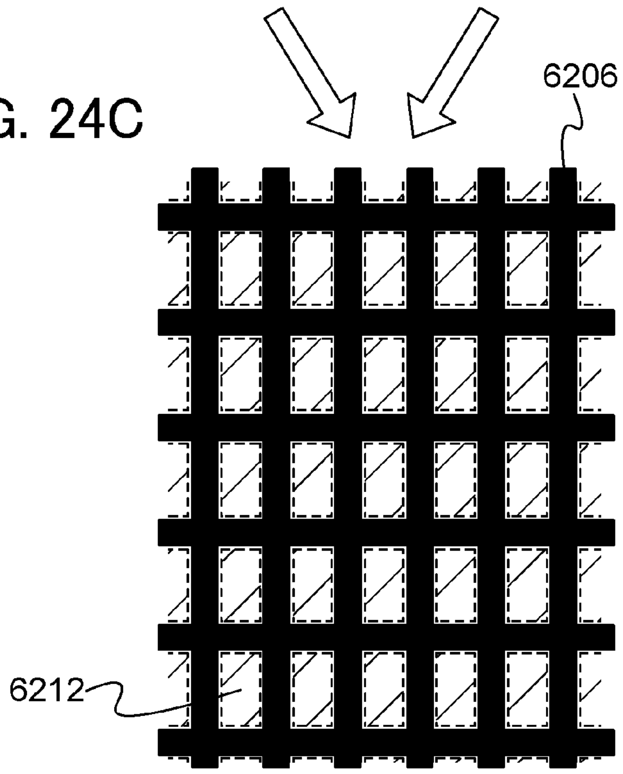

In the case of a liquid crystal display device in which first wiring layers 6210 intersect second wiring layers 6211, and regions surrounded by the first wiring layers 6210 and the second wiring layers 6211 are regions 6212 which transmit light as shown in FIG. 24A, the metal plate 6206, in which portions overlapping with the first wiring layers 6210 and the second wiring layers 6211 are left and openings are provided so that a grid pattern is formed may be used as shown in FIG. 24B. As shown in FIG. 24C, such a metal plate 6206 is attached to the layer 6116 to be separated, which can suppress reduction in accuracy of alignment due to the use of a substrate formed of an organic resin or change in the dimension due to expansion of the substrate. Note that in the case where a polarizing plate (not shown) is needed, the polarizing plate may be provided between the transfer substrate 6110 and the metal plate 6206 or outside the metal plate 6206. The polarizing plate may be attached to the metal plate 6206 in advance. Note that in terms of reduction in weight, a thin substrate is preferably used as the metal plate 6206 as long as an effect of stabilizing the dimension is obtained.

After that, the temporary supporting substrate 6202 is separated from the layer 6116 to be separated. Since the adhesive 6203 for separation includes a material capable of separating the temporary supporting substrate 6202 and the layer 6116 to be separated from each other when necessary, the temporary supporting substrate 6202 may be separated by a method suitable for the material. Note that light is emitted from the backlight as shown by arrows in the drawing (see FIG. 23E1).

Thus, the layer 6116 to be separated, which includes components such as the transistor and the pixel electrode (a counter electrode, a blocking film, an alignment film, or the like may also be provided as necessary), can be formed over the transfer substrate 6110, whereby a lightweight element substrate with high impact resistance can be formed.

MODIFICATION EXAMPLE

The liquid crystal display device having the above structure is an embodiment of the present invention, and the present invention also includes a liquid crystal display device having a structure different from that of the above liquid crystal display device. After the above transfer process (FIG. 23B), the metal plate 6206 may be attached to an exposed surface of the separation layer 6201 or the layer 6116 to be separated before attachment of the transfer substrate 6110 (see FIG. 23C2). In that case, a barrier layer 6207 is preferably provided between the metal plate 6206 and the layer 6116 to be separated so that a contaminant from the metal plate 6206 can be prevented from adversely affecting characteristics of the transistor in the layer 6116 to be separated. In the case of providing the barrier layer 6207, the barrier layer 6207 may be provided over the exposed surface of the separation layer 6201 or the layer 6116 to be separated before attachment of the metal plate 6206. The barrier layer 6207 may be formed using an inorganic material, an organic material, or the like; typically, a silicon nitride and the like can be used. A material of the barrier layer is not limited to the above as long as contamination of the transistor can be prevented. The barrier layer is formed using a light-transmitting material or formed to a thickness small enough to transmit light so that the barrier layer can transmit at least visible light. Note that the metal plate 6206 may be bonded with the use of a second adhesive layer (not shown) including an adhesive different from the adhesive 6203 for separation.

After that, the first adhesive layer 6111 is formed over a surface of the metal plate 6206 and the transfer substrate 6110 is attached to the first adhesive layer 6111 (FIG. 23D2) and the temporary supporting substrate 6202 is separated from the layer 6116 to be separated (FIG. 23E2), whereby a lightweight element substrate with high impact resistance can be formed. Note that light is emitted from the backlight as shown by arrows in the drawing.

The lightweight element substrate with high impact resistance formed as described above is firmly attached to a counter substrate with the use of a sealant with a liquid crystal layer provided between the substrates, whereby a lightweight liquid crystal display device with high impact resistance can be manufactured. As the counter substrate, a substrate which has high toughness and transmits visible light (similar to a plastic substrate which can be used as the transfer substrate 6110) can be used. Further, a polarizing plate, a blocking film, a counter electrode, or an alignment film may be provided as necessary. As a method for forming the liquid crystal layer, a dispenser method, an injection method, or the like can be employed as in a conventional case.

In the case of the lightweight liquid crystal display device with high impact resistance manufactured as described above, a fine element such as the transistor can be formed over a glass substrate or the like which has relatively high dimensional stability, and a conventional manufacturing method can be applied, so that even such a fine element can be formed precisely. Therefore, the lightweight liquid crystal display device with high impact resistance can display images with high precision and high quality.

Further, the liquid crystal display device manufactured as described above may be flexible.

This embodiment can be implemented in combination with another embodiment as appropriate.

[Embodiment 6]

Figure 25A:
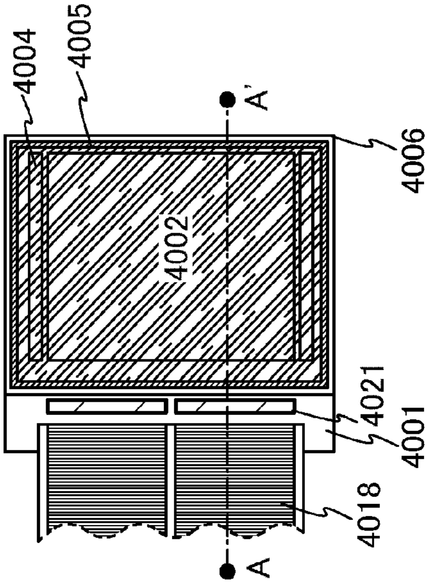
FIGS. 25A and 25B illustrate a top view and a cross-sectional view of a liquid crystal display device, respectively.
Figure 25B:
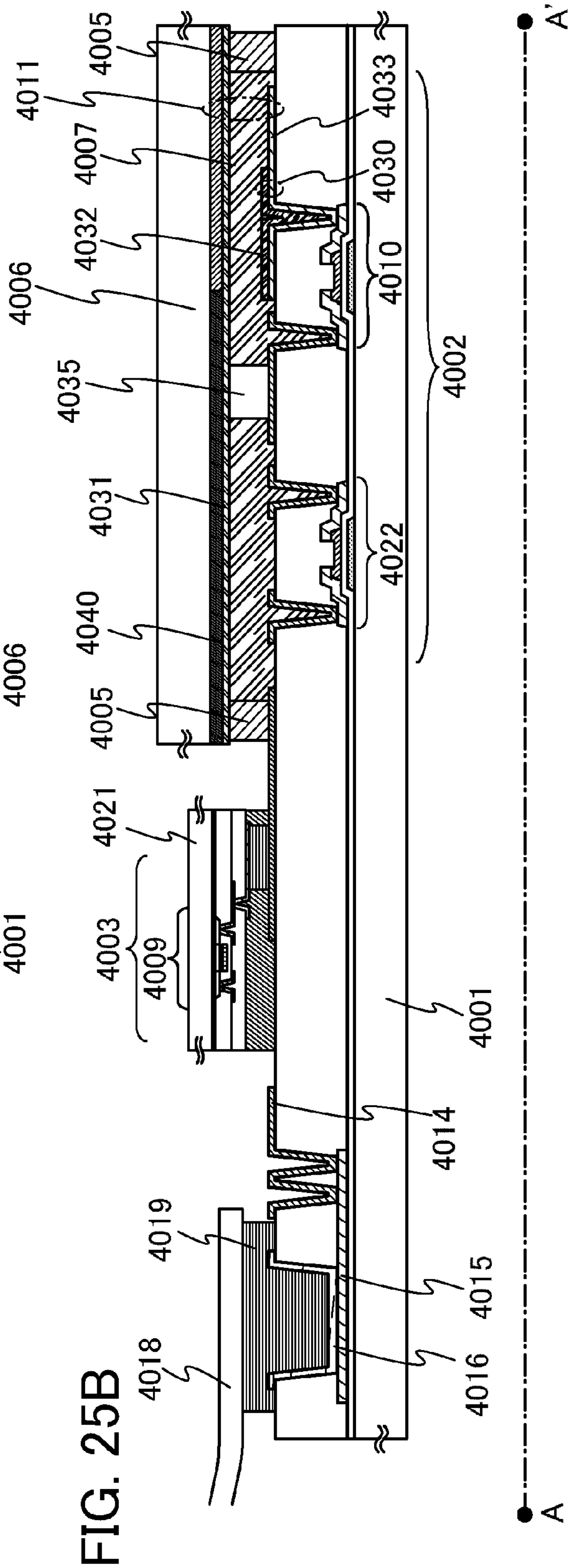

Next, a liquid crystal display device of an embodiment of the present invention will be described with reference to FIGS. 25A and 25B. FIG. 25A is a top view of a panel in which a substrate 4001 is attached to a counter substrate 4006 with a sealant 4005, and FIG. 25B is a cross-sectional view along dashed line A-A' in FIG. 25A.

The sealant 4005 is provided so as to surround a pixel portion 4002 and a scan line driver circuit 4004 provided over the substrate 4001. In addition, the counter substrate 4006 is provided over the pixel portion 4002 and the scan line driver circuit 4004. Thus, the pixel portion 4002 and the scan line driver circuit 4004 are sealed together with a liquid crystal 4007 by the substrate 4001, the sealant 4005, and the counter substrate 4006.

A substrate 4021 provided with a signal line driver circuit 4003 is mounted in a region which is different from the region surrounded by the sealant 4005 over the substrate 4001. In FIG. 25B, a transistor 4009 included in the signal line driver circuit 4003 is illustrated.

A plurality of transistors are included in the pixel portion 4002 and the scan line driver circuit 4004 which are provided over the substrate 4001. In FIG. 25B, transistors 4010 and 4022 which are included in the pixel portion 4002 are illustrated. Each of the transistor 4010 and the transistor 4022 includes an oxide semiconductor in a channel formation region. A blocking film 4040 provided for the counter substrate 4006 overlaps with the transistors 4010 and 4022. By blocking light to the transistors 4010 and 4022, deterioration of the oxide semiconductor in each transistor due to light is prevented; thus, deterioration of characteristics of the transistors 4010 and 4022, such as a shift of the threshold voltage, can be prevented.

A pixel electrode 4030 included in a liquid crystal element 4011 includes a reflective electrode 4032 and a transparent electrode 4033 and is electrically connected to the transistor 4010. A counter electrode 4031 of the liquid crystal element 4011 is provided for the counter substrate 4006. A portion where the pixel electrode 4030, the counter electrode 4031, and the liquid crystal 4007 overlap with each other corresponds to the liquid crystal element 4011.

A spacer 4035 is provided to control a distance (cell gap) between the pixel electrode 4030 and the counter electrode 4031. FIG. 25B shows the case where the spacer 4035 is formed by patterning of an insulating film; alternatively, a spherical spacer may be used.

A variety of signals and potentials are supplied to the signal line driver circuit 4003, the scan line driver circuit 4004, and the pixel portion 4002 from a connection terminal 4016 through wirings 4014 and 4015. The connection terminal 4016 is electrically connected to a terminal of a FPC 4018 via an anisotropic conductive film 4019.

Note that any of the substrate 4001, the counter substrate 4006, and the substrate 4021 can be formed using glass, ceramics, or plastics. Plastics include in its category, a fiberglass-reinforced plastic (FRP) plate, a polyvinyl fluoride (PVF) film, a polyester film, an acrylic resin film, and the like. A sheet having a structure in which an aluminum foil is sandwiched between PVF films can be used as well.

Note that a substrate placed in a direction in which light is extracted through the liquid crystal element 4011 is formed using a light-transmitting material such as a glass plate, plastic, a polyester film, or an acrylic film.

Figure 26:
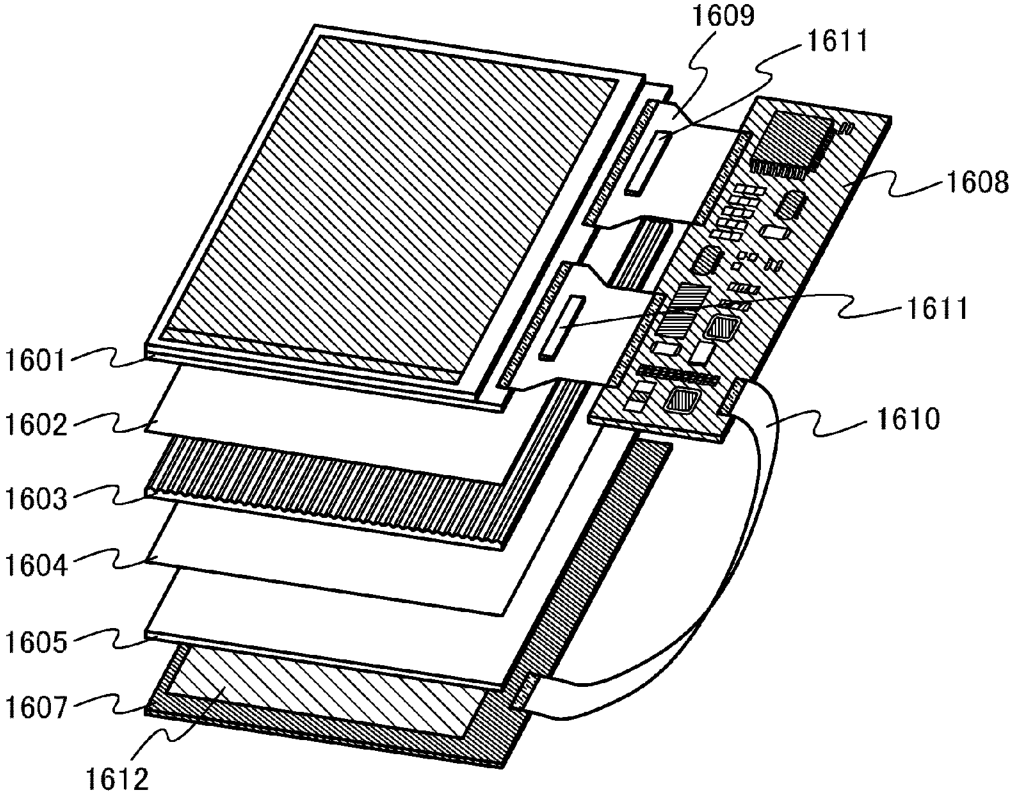
FIG. 26 illustrates a perspective view of a structure of a liquid crystal display device.

FIG. 26 is an example of a perspective view illustrating a structure of a liquid crystal display device of an embodiment of the present invention. The liquid crystal display device illustrated in FIG. 26 includes a panel 1601 including a pixel portion, a first diffusion plate 1602, a prism sheet 1603, a second diffusion plate 1604, a light guide plate 1605, a backlight panel 1607, a circuit board 1608, and a substrate 1611 provided with a signal line driver circuit.

The panel 1601, the first diffusion plate 1602, the prism sheet 1603, the second diffusion plate 1604, the light guide plate 1605, and the backlight panel 1607 are sequentially stacked. The backlight panel 1607 has a backlight 1612 including a plurality of light sources. Light from the backlight 1612 that is diffused into the light guide plate 1605 is delivered to the panel 1601 through the first diffusion plate 1602, the prism sheet 1603, and the second diffusion plate 1604.

Although the first diffusion plate 1602 and the second diffusion plate 1604 are used in this embodiment, the number of diffusion plates is not limited to two; the number of diffusion plates may be one, or may be three or more. The diffusion plate is provided between the light guide plate 1605 and the panel 1601. The diffusion plate may be provided only on the side closer to the panel 1601 than the prism sheet 1603, or may be provided only on the side closer to the light guide plate 1605 than the prism sheet 1603.

Further, the shape of the cross section of the prism sheet 1603 which is illustrated in FIG. 26 is not limited to a serrate shape; the cross section can have any shape with which light from the light guide plate 1605 can be gathered to the panel 1601 side.

The circuit board 1608 is provided with a circuit which generates various signals input to the panel 1601, a circuit which processes the signals, or the like. In FIG. 26, the circuit board 1608 is connected to the panel 1601 via a COF tape 1609. In addition, the substrate 1611 provided with the signal line driver circuit is connected to the COF tape 1609 by a chip on film (COF) method.

FIG. 26 illustrates an example in which the circuit board 1608 is provided with a control circuit which controls driving of the backlight 1612 and the control circuit is connected to the backlight panel 1607 via an FPC 1610. The control circuit may be formed over the panel 1601. In that case, the panel 1601 may be connected to the backlight panel 1607 via an FPC or the like.

This embodiment can be combined as appropriate with any of the above-described embodiments.

[Embodiment 7]

Figure 27A:
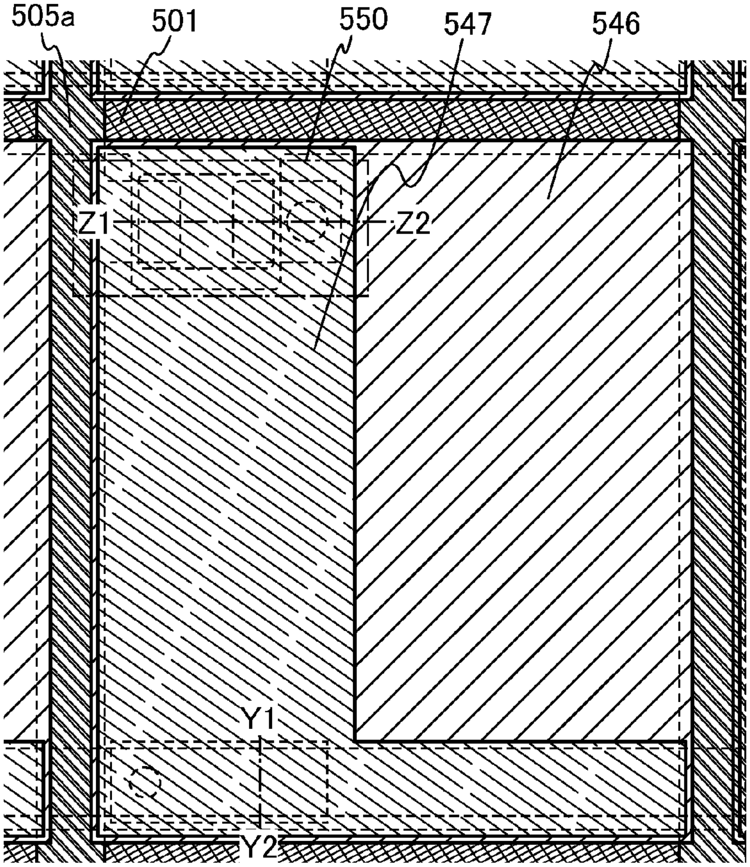
FIGS. 27A and 27B illustrate a top view and a cross-sectional view of a configuration of a pixel, respectively.
Figure 27B:
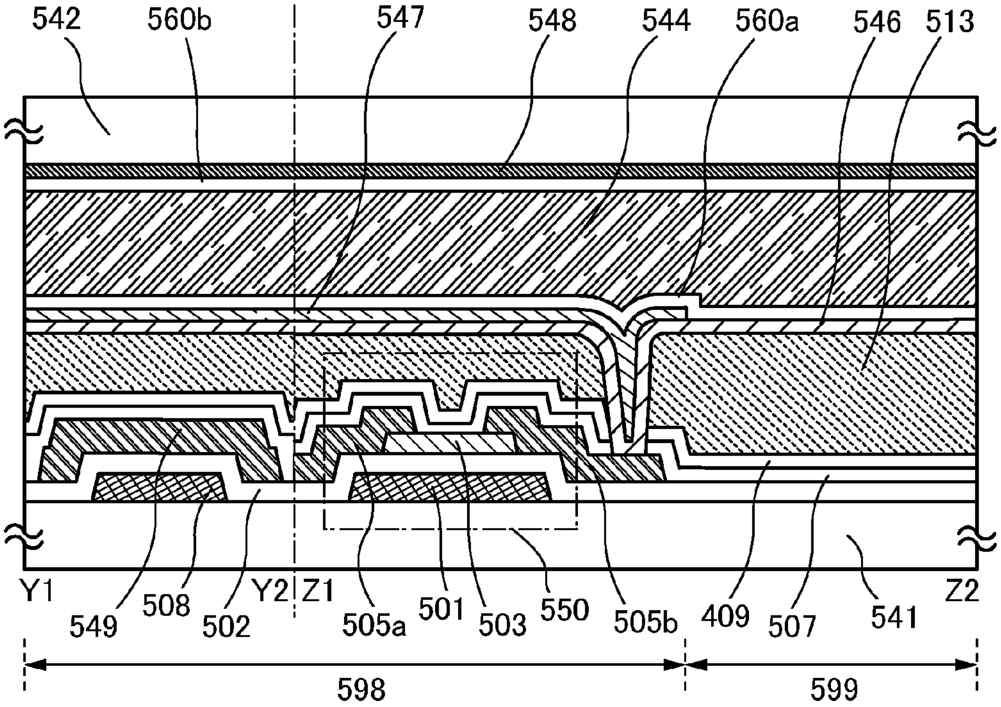
Figure 28A:
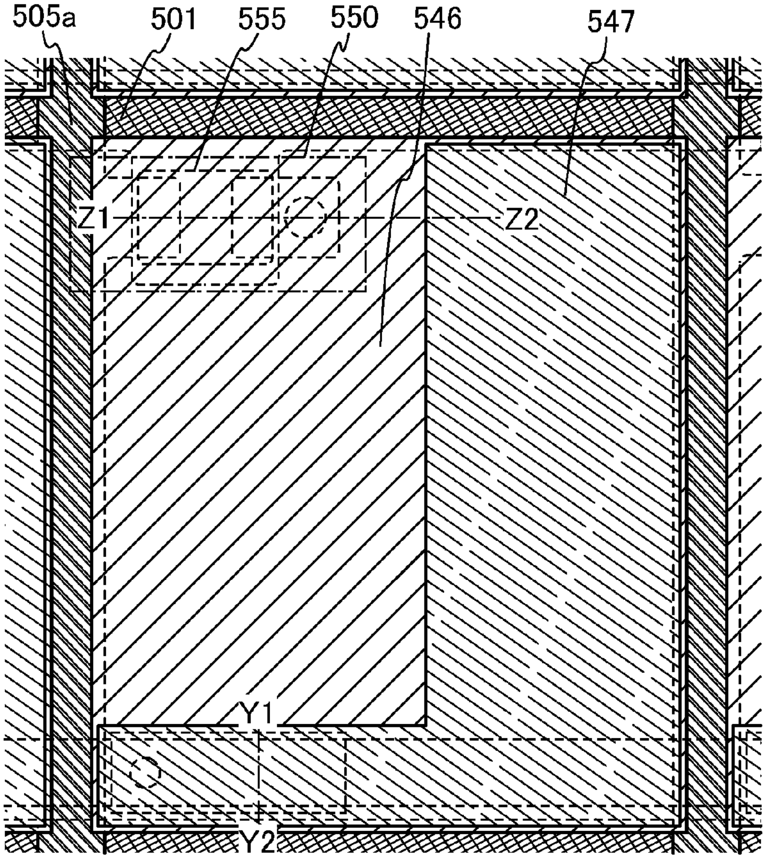
FIGS. 28A and 28B illustrate a top view and a cross-sectional view of a configuration of a pixel, respectively.
Figure 28B:
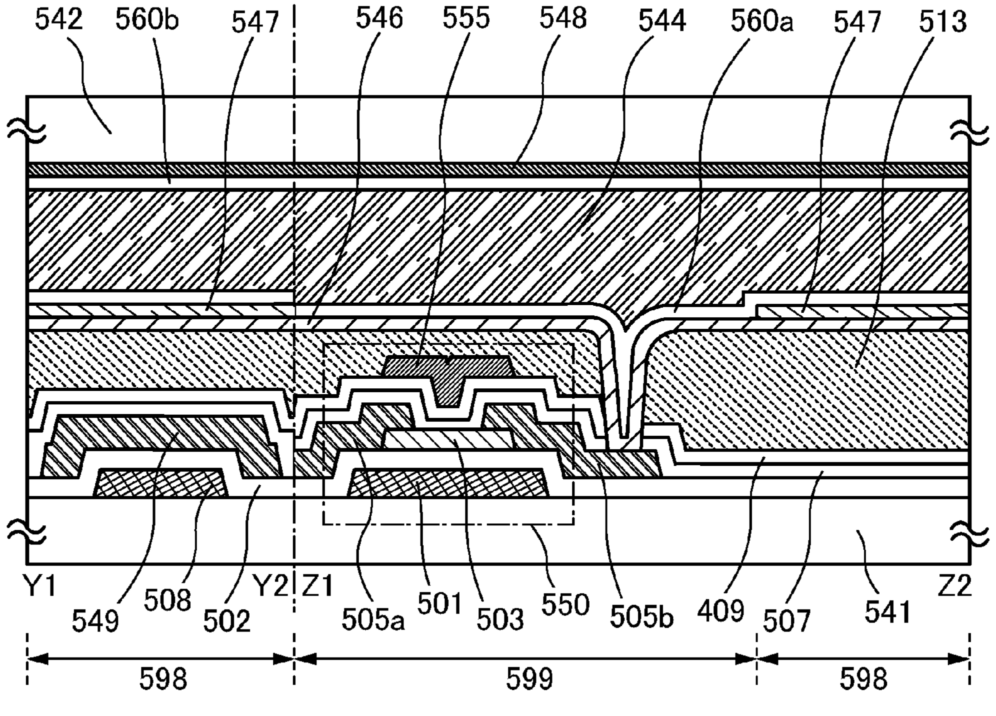

In this embodiment, an example of a pixel structure of a liquid crystal display device according to an embodiment of the present invention will be described with reference to FIGS. 27A and 27B, FIGS. 28A and 28B, and FIG. 29. FIG. 27A is a plan view of a pixel portion used in a liquid crystal display device and illustrates one pixel thereof. FIG. 27B is a cross-sectional view taken along lines Y1-Y2 and Z1-Z2 of FIG. 27A.

In FIG. 27A, a plurality of source wirings (including a source or drain electrode 505*a*) are arranged in parallel (are extended in the vertical direction in the drawing) to be spaced from each other. A plurality of gate wirings (including a gate electrode 501) are extended in a direction generally perpendicular to the source wirings (a horizontal direction in the drawing) and provided apart from each other. Capacitor wirings 508 are adjacent to respective gate wirings and are extended in a direction substantially parallel to the gate wirings, that is, a direction substantially perpendicular to the source wirings (the horizontal direction in the drawing).

The liquid crystal display device in FIGS. 27A and 27B is a semi-transmissive liquid crystal display device in which a pixel region includes a reflective region 598 and a transmissive region 599. In the reflective region 598, a reflective electrode 547 is stacked over a transparent electrode 546 as a pixel electrode, and in the transmissive region 599, only the transparent electrode 546 is provided as a pixel electrode. Note that an example in which the transparent electrode 546 and the reflective electrode 547 are stacked in this order over an interlayer film 513 is illustrated in FIGS. 27A and 27B; however, a structure in which the reflective electrode 547 and the transparent electrode 546 are stacked in this order over the interlayer film 513 may be employed. Insulating films 507 and 509 and the interlayer film 513 are provided over a transistor 550. The transparent electrode 546 and the reflective electrode 547 are electrically connected to the transistor 550 through an opening (contact hole) provided in the insulating films 507 and 509 and the interlayer film 513.

As illustrated in FIG. 27B, a common electrode (also referred to as a counter electrode) 548 is provided for a second substrate 542 and faces the transparent electrode 546 and the reflective electrode 547 over a first substrate 541 with a liquid crystal layer 544 provided therebetween. Note that in the liquid crystal display device in FIGS. 27A and 27B, an alignment film 560*a* is provided between the transparent electrode 546 and the liquid crystal layer 544 and between the reflective electrode 547 and the liquid crystal layer 544, and an alignment film 560*b* is provided between the common electrode 548 and the liquid crystal layer 544. The alignment films 560*a* and 560*b* are insulating layers having a function of controlling the alignment of liquid crystal and therefore, are not necessarily provided depending on a material of the liquid crystal.

The transistor 550 is an example of a bottom-gate inverted-staggered transistor and includes the gate electrode 501, a gate insulating film 502, an oxide semiconductor film 503, the source or drain electrode 505*a*, and a source or drain electrode 505*b*. In addition, the capacitor wiring 508 which is formed in the same step as the gate electrode 501, the gate insulating film 502, and a conductive layer 549 which is formed in the same step as the source and drain electrodes 505*a* and 505*b* are stacked to form a capacitor. Note that it is preferable to form the reflective electrode 547 which is formed using a reflective conductive film of aluminum (Al), silver (Ag), or the like so as to cover the capacitor wiring 508.

In addition, by forming the reflective electrode 547 to cover the transistor 550, incident light from the second substrate 542 side is prevented from reaching the oxide semiconductor film 503, which prevents deterioration of the oxide semiconductor due to light and deterioration of characteristics of the transistor 550, such as shift of the threshold voltage. Note that since the transistor 550 is a bottom-gate transistor, when a conductive material having a light-blocking property is used as the gate electrode 501, incident light from the first substrate 541 side can be blocked.

The semi-transmissive liquid crystal display device in this embodiment can perform color display of a moving image in the transmissive region 599 and a monochrome (black and white) display of a still image in the reflective region 598 by control of on and off the transistor 550.

In the transmissive region 599, display can be performed by incident light from a backlight provided on the first substrate 541 side. On the other hand, in the reflective region 598, display can be performed by reflecting external light incident from the second substrate 542 side by the reflective electrode 547.

Unlike FIGS. 27A and 27B, FIGS. 28A and 28B illustrates an example of a liquid crystal display device in which the transistor 550 is not covered with the reflective electrode 547. In the liquid crystal display device in FIGS. 28A and 28B, a light-blocking film 555 is formed to cover the oxide semiconductor film 503 included in the transistor 550. The light-blocking film 555 can prevent deterioration of the oxide semiconductor due to incident light from the second substrate 542 side even when the transistor 550 is not covered with the reflective electrode 547.

The light-blocking film 555 may be formed using a material having a light-blocking property and can be formed using the same material and method as those of the gate electrode, the source or drain electrode, the reflective electrode, and the like. The light-blocking film 555 may be formed using a light-blocking, conductive material to function as a back gate electrode.

Figure 29:
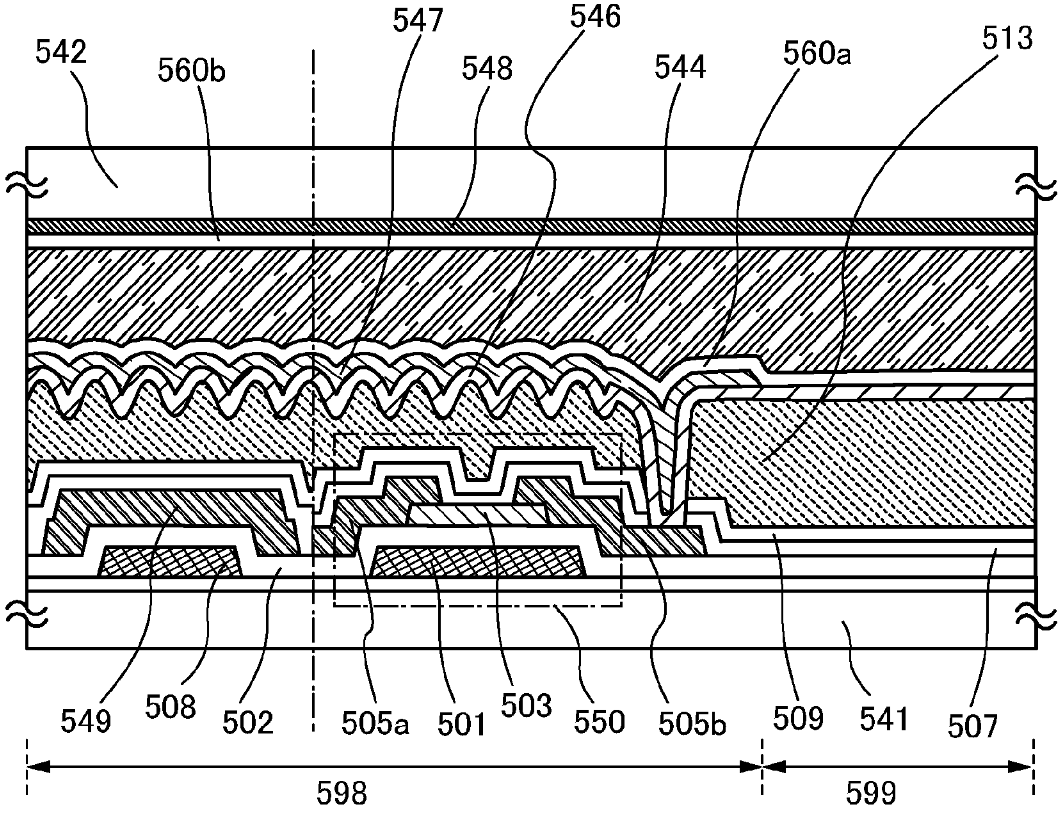
FIG. 29 illustrates a cross-sectional view of a structure of a pixel.

Next, an example in which the reflective electrode 547 has an uneven shape in the liquid crystal display device is illustrated in FIG. 29. FIG. 29 illustrates an example in which a surface of the interlayer film 513 in the reflective region 598 is formed to have an uneven shape so that the reflective electrode 547 has an uneven shape. The uneven shape of the surface of the interlayer film 513 may be formed by performing selective etching. For example, the interlayer film 513 having the uneven shape can be formed, for example, by performing a photolithography step on a photosensitive organic resin.

When the surface of the reflective electrode 547 has the uneven shape as illustrated in FIG. 29, incident light from the outside is irregularly reflected, so that more favorable display can be performed. Accordingly, visibility of display is improved.

This embodiment can be implemented in combination with another embodiment, as appropriate.

[Embodiment 8]

In this embodiment, a transistor 951 was manufactured using the manufacturing method described in another embodiment, a transistor 952 having a back gate electrode was manufactured, and evaluation results of the amount of change in the threshold voltage (Vth) through a negative bias stress test with light irradiation on the transistors will be described.

Figure 30A:
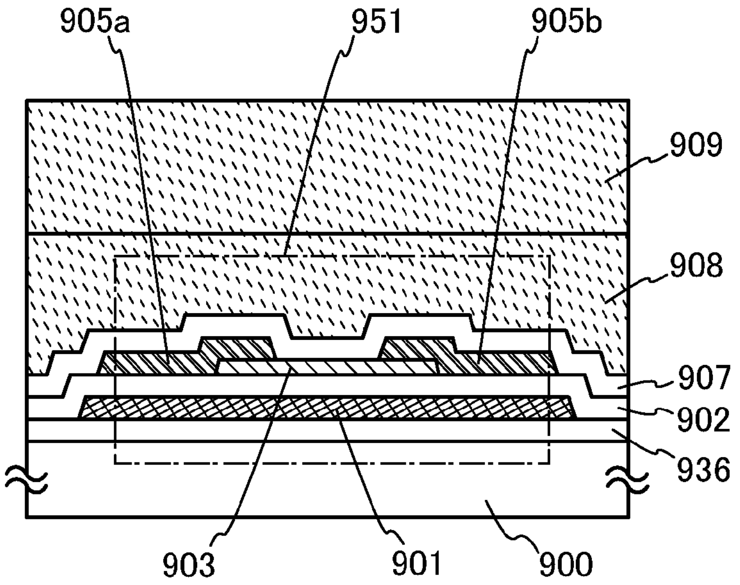
FIGS. 30A and 30B illustrate structures of transistors.

Described first is a layered structure and a manufacturing method of the transistor 951 with reference to FIG. 30A. Over a substrate 900, a layered film of a silicon nitride film (thickness: 200 nm) and a silicon oxynitride film (thickness: 400 nm) was formed by a CVD method as a base film 936. Next, over the base film 936, a layered film of a tantalum nitride film (thickness: 30 nm) and a tungsten film (thickness: 100 nm) was formed by a sputtering method and selectively etched to form a gate electrode 901.

Next, over the gate electrode 901, a silicon oxynitride film (thickness: 30 nm) was formed by a high-density plasma enhanced CVD method as a gate insulating film 902.

Next, over the gate insulating film 902, an oxide semiconductor film (thickness: 30 nm) was formed using a target of an In—Ga—Zn—O-based oxide semiconductor by a sputtering method. Then, the oxide semiconductor film was selectively etched to form an island-shaped oxide semiconductor film 903.

Next, first heat treatment was performed at 450° C. for 60 minutes in a nitrogen atmosphere.

Next, over the oxide semiconductor film 903, a layered film of a titanium film (thickness: 100 nm), an aluminum film (thickness: 200 nm), and a titanium film (thickness: 100 nm) was formed by a sputtering method and selectively etched to form a source electrode 905*a* and a drain electrode 905*b*.

Next, second heat treatment was performed at 300° C. for 60 minutes in a nitrogen atmosphere.

Next, over the source electrode 905*a* and the drain electrode 905*b*, a silicon oxide film was formed by a sputtering method as an insulating film 907 so as to be in contact with part of the oxide semiconductor film 903, and over the insulating film 907, a polyimide resin film (thickness: 1.5 μm) was formed as an insulating film 908.

Next, third heat treatment was performed at 250° C. for 60 minutes in a nitrogen atmosphere.

Next, over the insulating film 908, a polyimide resin film (thickness: 2.0 μm) was formed as an insulating film 909.

Next, fourth heat treatment was performed at 250° C. for 60 minutes in a nitrogen atmosphere.

Figure 30B:
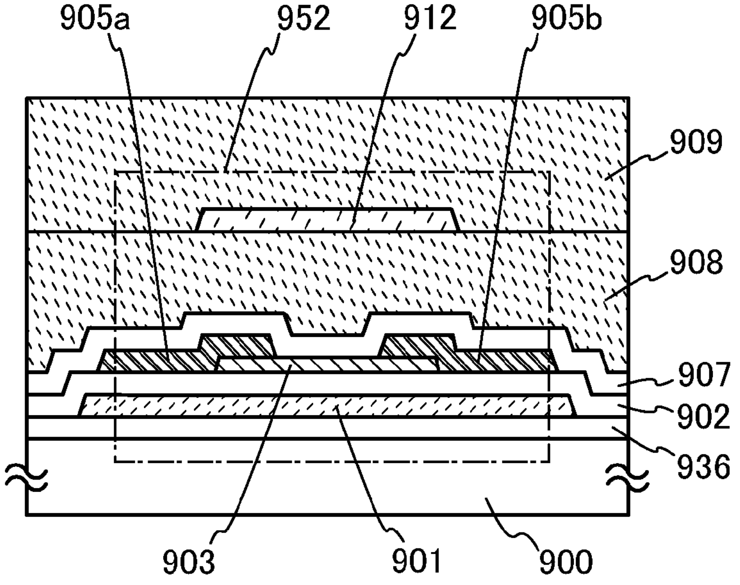

The transistor 952 shown in FIG. 30B can be manufactured in a similar manner to that of the transistor 951. The transistor 952 is different from the transistor 951 in that a back gate electrode 912 is provided between the insulating films 908 and 909. The back gate electrode 912 was formed as follows: a layered film of a titanium film (thickness: 100 nm), an aluminum film (thickness: 200 nm), and a titanium film (thickness: 100 nm) was formed by a sputtering method over the insulating film 908 and selectively etched. The back gate electrode 912 was electrically connected to the source electrode 905*a*.

In each of the transistors 951 and 952, the channel length is 3 μm and the channel width is 20 μm.

Described next is a negative bias stress test with light irradiation performed on the transistors 951 and 952.

The negative bias stress test with light irradiation is a kind of accelerated test and can evaluate the change of characteristics of a transistor with light irradiation, in a short period of time. In particular, the amount of change in the threshold voltage Vth of a transistor through the negative bias stress test with light irradiation is an important benchmark for the reliability. The smaller the amount of change in the threshold voltage Vth of a transistor through the negative bias stress test with light irradiation is, the higher the reliability of the transistor is. The amount of change through the negative bias stress test with light irradiation is preferably less than or equal to 1 V, far preferably less than or equal to 0.5 V.

Specifically, according to the negative bias stress test with light irradiation, the temperature of a substrate provided with a transistor (substrate temperature) is kept at a fixed temperature, a source electrode and a drain electrode of the transistor are set at the same potential, and a gate electrode of the transistor is applied with a potential lower than the potential of the source electrode and the drain electrode for a certain period while irradiating the transistor with light.

The stress intensity of a negative bias stress test with light irradiation can be determined in accordance with the light irradiation condition, the substrate temperature, the intensity of electric field applied to a gate insulating film, and a time of applying the electric field. The intensity of the electric field applied to the gate insulating film is determined in accordance with a value obtained by dividing a potential difference between a gate electrode and a source and drain electrodes by the thickness of the gate insulating film in the case where the source electrode and the drain electrode have the same potentials. For example, in the case where the intensity of the electric field applied to the gate insulating film with a thickness of 100 nm is to be 2 MV/cm, the potential difference may be set to 20 V.

A test in which a potential higher than that of a source electrode and a drain electrode is applied to a gate electrode under light irradiation is called a positive bias temperature stress test with light irradiation. The characteristics of a transistor are more likely to change through a negative bias stress test with light irradiation than through the positive bias temperature stress test with light irradiation, and therefore, the negative bias stress test with light irradiation was adopted in this embodiment.

The negative bias stress test with light irradiation in this embodiment was performed in the following condition: the substrate temperature is room temperature (25° C.), the electric field intensity applied to the gate insulating film 902 is 2 MV/cm, and a period of light irradiation and electric field application is 1 hour. The condition of the light irradiation was as follows: a xenon light source "MAX-302" manufactured by Asahi Spectra Co., Ltd is used, the peak wavelength is 400 nm (half width: 10 nm), and irradiance is 326 $\mu W/cm^2$.

Prior to the negative bias stress test with light irradiation, initial characteristics of each transistor were measured. Measured in this embodiment were Vg-Id characteristics, that is, change characteristics of a current which flows between the source electrode and the drain electrode (the current hereinafter referred to as a drain current or Id) under the following condition: the substrate temperature is room temperature (25° C.), the voltage between the source electrode and the drain electrode (the voltage hereinafter referred to as a drain voltage or Vd) is 3 V, and the voltage between the source electrode and the gate electrode (the voltage hereinafter referred to as a gate voltage or Vg) is changed from −5 V to +5 V.

Next, light irradiation on the insulating film 909 side was started, the potential of each of the source and drain electrodes of the transistor was set to 0 V, and a negative voltage was applied to the gate electrode 901 such that the intensity of an electric field applied to the gate insulating film 902 of the transistor became 2 MV/cm. In this embodiment, since the thickness of the gate insulating film 902 of the transistor was 30 nm, −6 V was applied to the gate electrode 901 and kept for 1 hour. The time of the voltage application was 1 hour in this embodiment; however, the time may be determined as appropriate in accordance with the purpose.

Next, the voltage application was ended but while keeping the light irradiation, the Vg-Id characteristics were measured under the condition which is the same as the measurement of the initial characteristics, so that the Vg-Id characteristics after the negative bias stress test with light irradiation were obtained.

Figure 31:
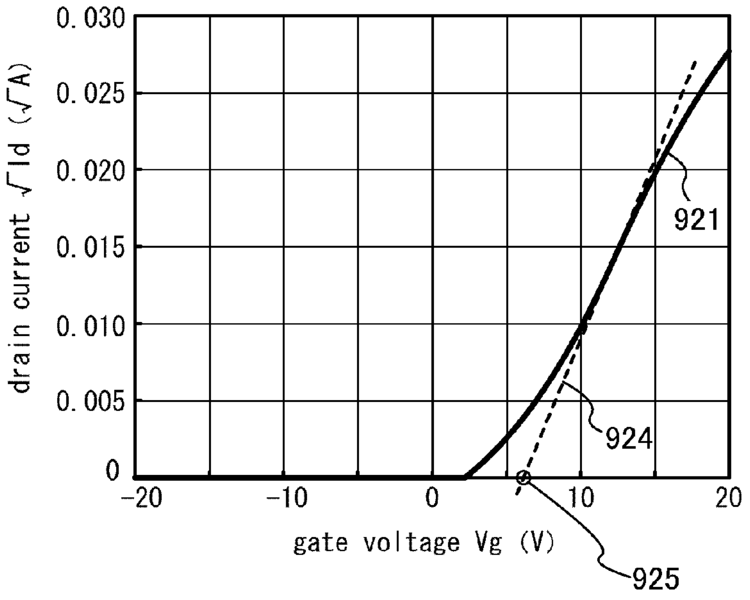
FIG. 31 is a graph for defining $V_{th}$.

The threshold voltage Vth in this embodiment is defined below using FIG. 31. In FIG. 31, the horizontal axis represents the gate voltage on a linear scale and the vertical axis represents the square root of the drain current (hereinafter also referred to as √Id) on a linear scale. A curve 921 indicates the square root of value of Vth in the Vg-Id characteristics (the curve hereinafter also referred to as a √Id curve).

First, the √Id curve (the curve 921) is obtained from the Vg-Id curve. Then, a tangent 924 to a point on the √Id curve at which a differential value of the √Id curve is the maximum is obtained. Then, the tangent 924 is extended, and the gate voltage Vg at a drain current Id of 0 A on the tangent 924, that is, a value at a horizontal-axis-intercept, i.e., gate-voltage-axis-intercept 925 of the tangent 924 is defined as Vth.

Figure 32A:
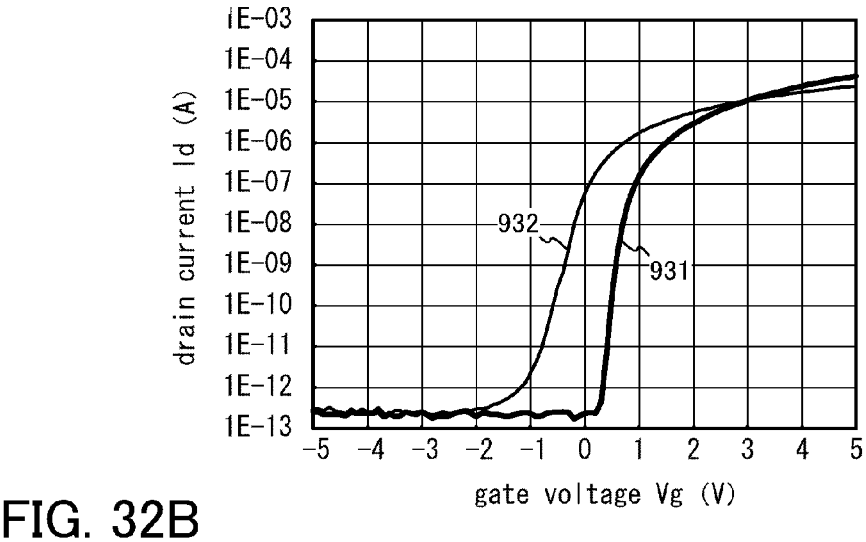
FIGS. 32A to 32C are graphs showing results of negative bias stress tests with light irradiation.
Figure 32B:
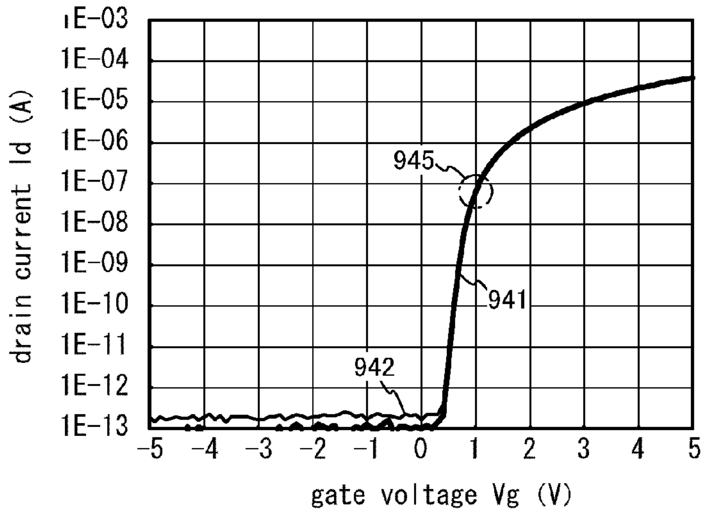
Figure 32C:
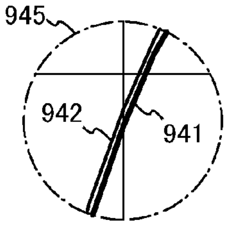

FIGS. 32A to 32C show the Vg-Id characteristics of the transistors 951 and 952 before and after the negative bias stress test with light irradiation. In each of FIGS. 32A and 32B, the horizontal axis represents the gate voltage (Vg), and the vertical axis represents the drain current (Id) with respect to the gate voltage on a logarithmic scale.

FIG. 32A shows the Vg-Id characteristics of the transistor 951 before and after the negative bias stress test with light irradiation. Initial characteristics 931 are the Vg-Id characteristics of the transistor 951 before being subjected to the negative bias stress test with light irradiation, and post-test characteristics 932 are the Vg-Id characteristics of the transistor 951 after being subjected to the negative bias stress test with light irradiation. The threshold voltage Vth of the initial characteristics 931 was 1.01 V, and that of the post-test characteristics 932 was 0.44 V.

FIG. 32B shows the Vg-Id characteristics of the transistor 952 before and after the negative bias stress test with light irradiation. FIG. 32C is an enlarged graph of a portion 945 in FIG. 32B. Initial characteristics 941 are the Vg-Id characteristics of the transistor 952 before being subjected to the negative bias stress test with light irradiation, and post-test characteristics 942 are the Vg-Id characteristics of the transistor 952 after being subjected to the negative bias stress test with light irradiation. The threshold voltage Vth of the initial characteristics 941 was 1.16 V, and that of the post-test characteristics 942 was 1.10 V. Since the back gate electrode 912 of the transistor 952 is electrically connected to the source electrode 905*a*, the potential of the back gate electrode 912 equals to that of the source electrode 905*a*.

In FIG. 32A, the threshold voltage Vth of the post-test characteristics 932 is changed by 0.57 V in the negative direction from that of the initial characteristics 931; in FIG. 32B, the threshold voltage Vth of the post-test characteristics 942 is changed by 0.06 V in the negative direction from that of the initial characteristics 941. The amount of a change of either of the transistor 951 and the transistor 952 is less than or equal to 1 V, from which it can be confirmed that both of the transistors have high reliability. In addition, since the amount of a change of the threshold voltage Vth of the transistor 952 provided with the back gate electrode 912 is less than or equal to 0.1 V, it can be confirmed that the transistor 952 has higher reliability than the transistor 951.

EXAMPLE 1

With a liquid crystal display device of an embodiment of the present invention, an electronic device capable of displaying a high-quality image can be provided. With the liquid crystal display device of an embodiment of the present invention, an electronic device with low power consumption can be provided. In particular, in a mobile electronic device to which power cannot be easily supplied constantly, a liquid crystal display device of an embodiment of the present invention included as a component provides a merit of an increase in continuous use time.

A liquid crystal display device of an embodiment of the present invention can be used for display devices, laptop personal computers, or image reproducing devices provided with recording media (typically, devices which reproduce the content of recording media such as digital versatile discs (DVDs) and have displays for displaying the reproduced image). In addition to the above examples, as an electronic device which can include a liquid crystal display device of an embodiment of the present invention, the following can be given: mobile phones, portable game machines, portable information terminals, e-book readers, cameras such as video cameras or digital still cameras, goggle-type displays (head mounted displays), navigation systems, audio reproducing devices (e.g., car audio components and digital audio players), copiers, facsimiles, printers, multifunction printers, automated teller machines (ATM), vending machines, and the like. Specific examples of such electronic devices are shown in FIGS. 28A to 28F.

Figure 33A:
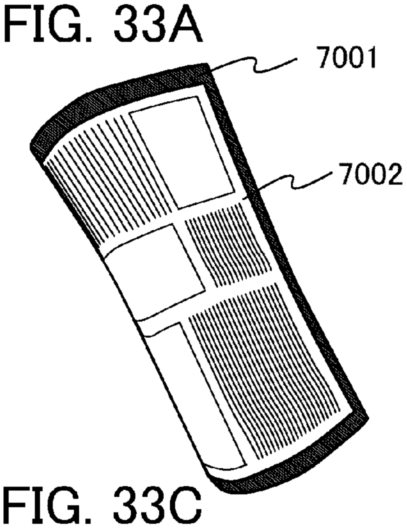
FIGS. 33A to 33F illustrate electronic devices.

FIG. 33A illustrates an e-book reader including a housing 7001, a display portion 7002, and the like. A liquid crystal display device of an embodiment of the present invention can be used for the display portion 7002. With the liquid crystal display device of an embodiment of the present invention applied to the display portion 7002, an e-book reader capable of displaying a high-quality image or an e-book reader with low power consumption can be provided. Moreover, a panel can be formed using a flexible substrate and a touch panel can be flexible, whereby the liquid crystal display device can have flexibility, which enables a flexible, lightweight, and easy-to-use e-book reader to be provided.

Figure 33B:
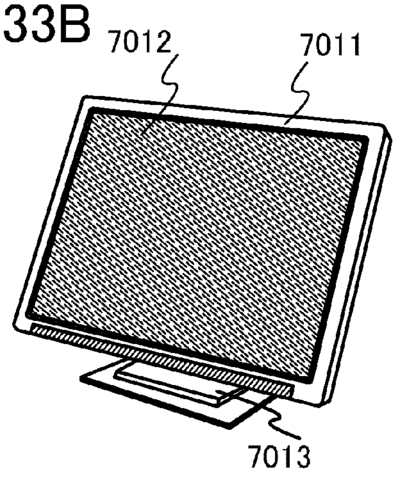

FIG. 33B illustrates a display device including a housing 7011, a display portion 7012, a support 7013, and the like. A liquid crystal display device of an embodiment of the present invention can be used for the display portion 7012. With the liquid crystal display device of an embodiment of the present invention applied to the display portion 7012, a display device capable of displaying a high-quality image or a display device with low power consumption can be provided. The display device includes in its category, any information display device for personal computers, TV broadcast reception, advertisement, and the like.

Figure 33C:
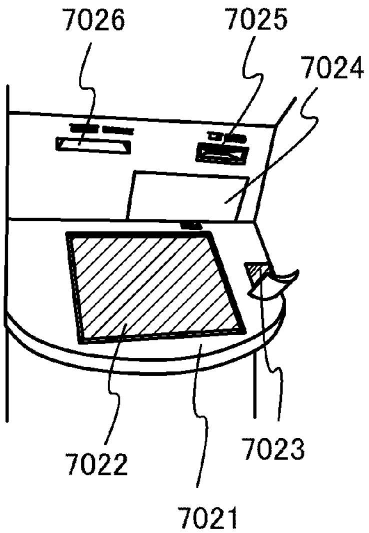

FIG. 33C illustrates an automated teller machine including a housing 7021, a display portion 7022, a coin slot 7023, a bill slot 7024, a card slot 7025, a bankbook slot 7026, and the like. A liquid crystal display device of an embodiment of the present invention can be used for the display portion 7022. With the liquid crystal display device of an embodiment of the present invention applied to the display portion 7022, an automated teller machine capable of displaying a high-quality image or an automated teller machine with low power consumption can be provided.

Figure 33D:
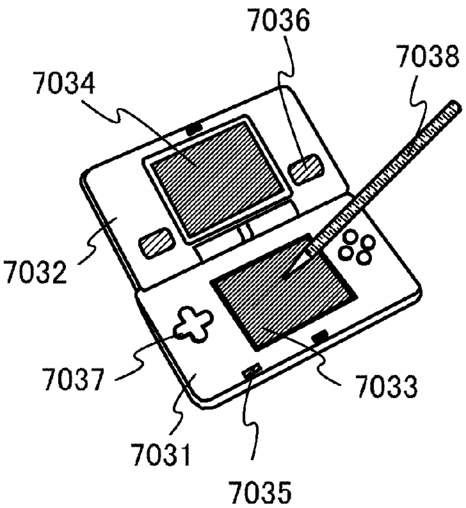

FIG. 33D illustrates a portable game machine including a housing 7031, a housing 7032, a display portion 7033, a display portion 7034, a microphone 7035, speakers 7036, operation keys 7037, a stylus 7038, and the like. A liquid crystal display device of an embodiment of the present invention can be used for the display portion 7033, 7034. With the liquid crystal display device of an embodiment of the present invention applied to the display portion 7033, 7034, a portable game machine capable of displaying a high-quality image or a portable game machine with low power consumption can be provided. Although the portable game machine illustrated in FIG. 33D has the two display portions 7033 and 7034, the number of display portions included in the portable game machine is not limited to two.

Figure 33E:
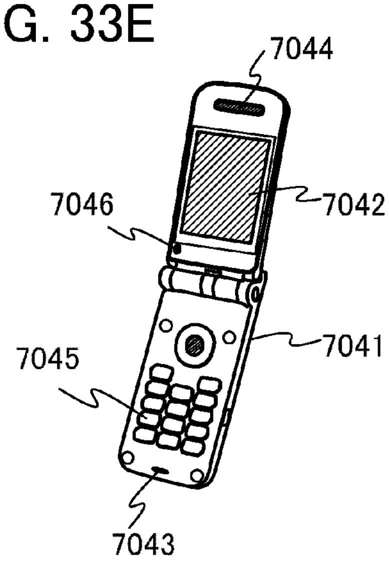

FIG. 33E illustrates a mobile phone including a housing 7041, a display portion 7042, an audio input portion 7043, an audio output portion 7044, operation keys 7045, a light-receiving portion 7046, and the like. Light received in the light-receiving portion 7046 is converted into electrical signals, whereby external images can be loaded. A liquid crystal display device of an embodiment of the present invention can be used for the display portion 7042. With the liquid crystal display device of an embodiment of the present invention applied to the display portion 7042, a mobile phone capable of displaying a high-quality image or a mobile phone with low power consumption can be provided.

Figure 33F:
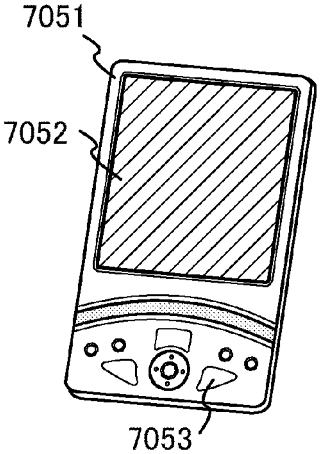

FIG. 33F illustrates a portable information terminal including a housing 7051, a display portion 7052, operation keys 7053, and the like. A modem may be incorporated in the housing 7051 of the portable information terminal illustrated in FIG. 33F. A liquid crystal display device of an embodiment of the present invention can be used for the display portion 7052. With the liquid crystal display device of an embodiment of the present invention applied to the display portion 7052, a portable information terminal capable of displaying a high-quality image or a portable information terminal with low power consumption can be provided.

This example can be combined as appropriate with any of the above-described embodiments.

This application is based on Japanese Patent Application serial no. 2010-152429 filed with Japan Patent Office on Jul. 2, 2010, the entire contents of which are hereby incorporated by reference.

What is claimed is:

1. A liquid crystal display device comprising:
a backlight; and
a pixel portion including:
a first region comprising a first pixel and a second pixel;
a second region comprising a third pixel and a fourth pixel; and
a third region comprising a fifth pixel,
wherein the second pixel is located closer to the second region than the first pixel,
wherein the third pixel is located closer to the first region than the fourth pixel,
wherein each of the first pixel, the second pixel, the third pixel, the fourth pixel and the fifth pixel includes a liquid crystal element and a transistor being configured for controlling holding of a voltage supplied to the liquid crystal element,
wherein the backlight includes first light sources configured to emit a first hue, second light sources configured to emit a second hue, and third light sources configured to emit a third hue,
wherein each of the first region and the second region comprises a plurality of pixels each including a transparent pixel electrode and a reflective pixel electrode,
wherein, in a first case of expressing a color image in a frame period, one of the first light sources lights the first pixel in a first period, one of the second light sources lights the first pixel in a second period, one of the third light sources lights the first pixel in a third period, another one of the first light sources lights the second pixel in a fourth period, another one of the third light sources lights the third pixel in the first period, another one of the first light sources lights the third pixel in the second period, another one of the second light sources lights the third pixel in the third period, another one of the third light sources lights the fourth pixel in the fourth period, and another one of the second light sources lights the fifth pixel in the first period,
wherein the first period and the fourth period only partially overlap with each other,
wherein the second period and the fourth period only partially overlap with each other,
wherein the first period, the second period, and the third period do not overlap with each other,
wherein, in a second case of expressing a monochrome image, the first pixel, the second pixel, the third pixel and the fourth pixel are configured to express the monochrome image by external light reflected by the reflective pixel electrodes,
wherein, in the second case, none of the first light sources, the second light sources, and the third light sources emit light, and
wherein a period for the holding of a voltage is 10 seconds or more.

2. The liquid crystal display device according to claim 1, wherein a channel formation region of the transistor includes an oxide semiconductor.

3. The liquid crystal display device according to claim 2, wherein the oxide semiconductor is an In—Ga—Zn—O-based oxide semiconductor.

4. The liquid crystal display device according to claim 2, wherein a hydrogen concentration of the oxide semiconductor is less than or equal to $5\times10^{19}$ /cm$^3$.

5. The liquid crystal display device according to claim 1,
wherein the number of writings of first image signals to the pixel portion in a frame period is lower than that of second image signals to the pixel portion in the frame period,
wherein the first image signals are input for expressing the monochrome image, and
wherein the second image signals are input for expressing the color image.

6. A liquid crystal display device comprising;
a backlight;
a pixel portion including:
a first region comprising a first pixel and a second pixel;
a second region comprising a third pixel and a fourth pixel; and
a third region comprising a fifth pixel; and
a photometric circuit configured to measure a peripheral brightness,
wherein the second pixel is located closer to the second region than the first pixel,
wherein the third pixel is located closer to the first region than the fourth pixel,
wherein each of the first pixel, the second pixel, the third pixel, the fourth pixel and the fifth pixel includes a liquid crystal element and a transistor being configured for controlling holding of a voltage supplied to the liquid crystal element,
wherein the backlight includes first light sources configured to emit a first hue, second light sources configured to emit a second hue, and third light sources configured to emit a third hue,
wherein each of the first region and the second region comprises a plurality of pixels each including a transparent pixel electrode and a reflective pixel electrode,
wherein, in a first case of expressing a color image in a frame period, one of the first light sources lights the first pixel in a first period, one of the second light sources lights the first pixel in a second period, one of the third light sources lights the first pixel in a third period, another one of the first light sources lights the second pixel in a fourth period, another one of the third light sources lights the third pixel in the first period, another one of the first light sources lights the third pixel in the second period, another one of the second light sources lights the third pixel in the third period, another one of the third light sources lights the fourth pixel in the fourth period, and another one of the second light sources lights the fifth pixel in the first period, wherein the first period and the fourth period only partially overlap with each other, wherein the second period and the fourth period only partially overlap with each other, wherein the first period, the second period, and the third period do not overlap with each other, wherein, in a second case of expressing a monochrome image, the first pixel, the second pixel, the third pixel and the fourth pixel are configured to express the monochrome image by external light reflected by the reflective pixel electrodes, wherein, in the second case, the first light sources, the second light sources, and the third light sources are configured to emit lights in accordance with the measurement results of the photometric circuit, and wherein a period for the holding of a voltage is 10 seconds or more.

7. The liquid crystal display device according to claim 6, wherein a channel formation region of the transistor includes an oxide semiconductor.

8. The liquid crystal display device according to claim 7, wherein the oxide semiconductor is an In—Ga—Zn—O-based oxide semiconductor.

9. The liquid crystal display device according to claim 7, wherein a hydrogen concentration of the oxide semiconductor is less than or equal to $5\times10^{19}/cm^3$.

10. The liquid crystal display device according to claim 6, wherein the number of writings of first image signals to the pixel portion in a frame period is lower than that of second image signals to the pixel portion in the frame period, wherein the first image signals are input for expressing the monochrome image, and wherein the second image signals are input for expressing the color image.

11. The liquid crystal display device according to claim 4, wherein an off-state current density of the transistor is less than or equal to 100 yA/μm.

12. The liquid crystal display device according to claim 9, wherein an off-state current density of the transistor is less than or equal to 100 yA/μm.

13. An electronic device comprising the liquid crystal display device according to claim 1.

14. An electronic device comprising the liquid crystal display device according to claim 6.

15. The liquid crystal display device according to claim 1, wherein, in the first case of expressing the color image in the frame period, another one of the second light sources lights the second pixel in a fifth period, another one of the first light sources lights the fourth pixel in the fifth period, wherein the second period and the fifth period only partially overlap with each other, and wherein the third period and the fifth period only partially overlap with each other.

16. The liquid crystal display device according to claim 6, wherein, in the first case of expressing the color image in the frame period, another one of the second light sources lights the second pixel in a fifth period, another one of the first light sources lights the fourth pixel in the fifth period, wherein the second period and the fifth period only partially overlap with each other, and wherein the third period and the fifth period only partially overlap with each other.

* * * * *